United States Patent [19]

Yannone et al.

[11] 4,314,441
[45] Feb. 9, 1982

[54] GAS TURBINE POWER PLANT CONTROL APPARATUS INCLUDING AN AMBIENT TEMPERATURE RESPONSIVE CONTROL SYSTEM

[75] Inventors: Robert A. Yannone, Aldan; James J. Shields, Philadelphia, both of Pa.

[73] Assignee: Westinghouse Electric Corp., Pittsburgh, Pa.

[21] Appl. No.: 44,615

[22] Filed: Jun. 1, 1979

Related U.S. Application Data

[63] Continuation of Ser. No. 817,932, Jul. 22, 1977, abandoned.

[51] Int. Cl.³ .............................................. F02C 9/32
[52] U.S. Cl. .............................................. 60/39.28 R
[58] Field of Search ............... 60/39.28 R; 290/40 R, 290/40 A, 40 C

[56] References Cited

U.S. PATENT DOCUMENTS

| | | | |
|---|---|---|---|
| 3,098,356 | 7/1963 | Joline | 60/39.28 R |
| 3,187,504 | 6/1965 | Herbert et al. | 60/39.28 R |
| 3,243,596 | 3/1966 | Loft | 290/40 R |
| 3,488,948 | 1/1970 | Cornett et al. | 60/39.28 R |
| 3,587,230 | 6/1971 | Schmidt | 60/39.28 R |
| 3,630,023 | 12/1971 | Lazar et al. | 60/39.28 R |
| 3,686,859 | 8/1972 | White | 60/39.28 R |
| 3,844,114 | 10/1974 | Nonnenmann | 60/39.28 |
| 3,866,109 | 2/1975 | Reed et al. | 290/40 R |

OTHER PUBLICATIONS

Sobey, A.J., "Control of Aircraft Powerplants", John Wiley, 1963, pp. 103–110.

Primary Examiner—Robert E. Garrett
Attorney, Agent, or Firm—E. F. Possessky

[57] ABSTRACT

A gas turbine power plant is provided with an industrial gas turbine which drives a generator coupled to a power system through a braker. The turbine-generator plant is operated by a hybrid control system having digital function capability during sequenced startup, synchronizing, load buildup and steady state load, and shutdown operations. The control system also contains monitoring and protective subsystems which function through all stages of operation, with redundancy and permissive features which maximize turbine availability.

12 Claims, 39 Drawing Figures

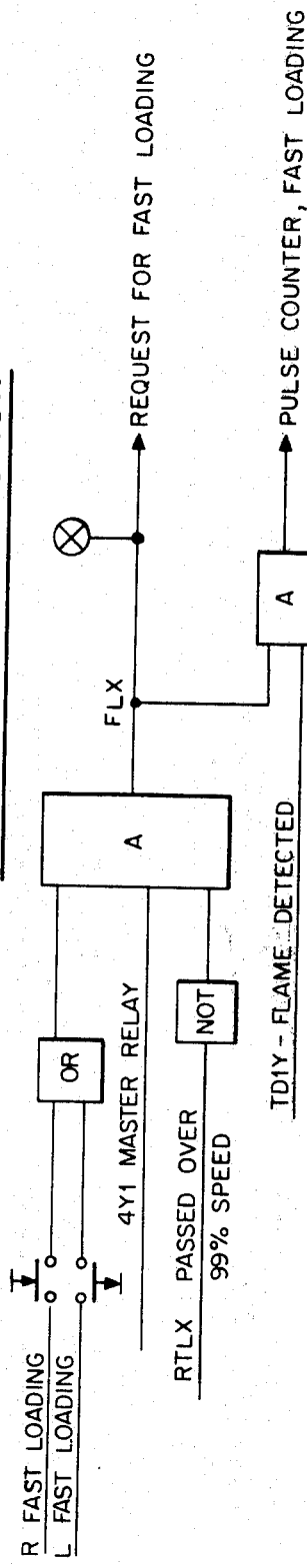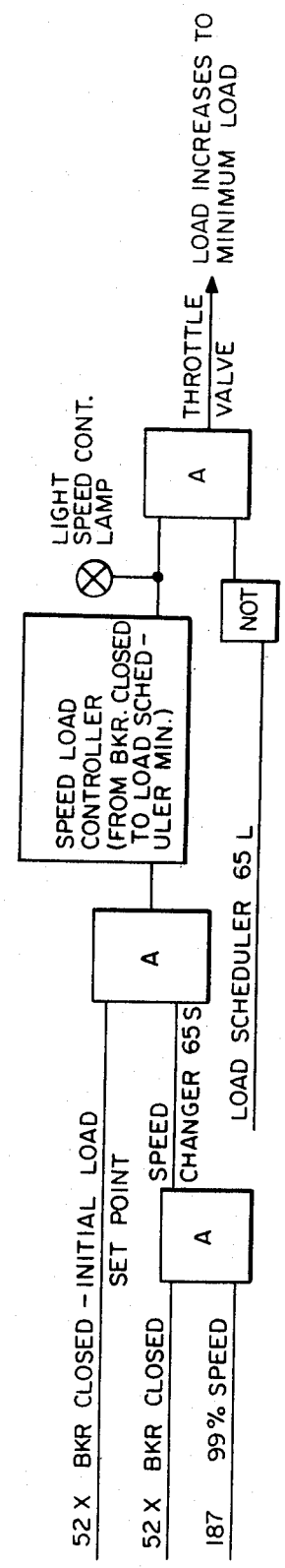

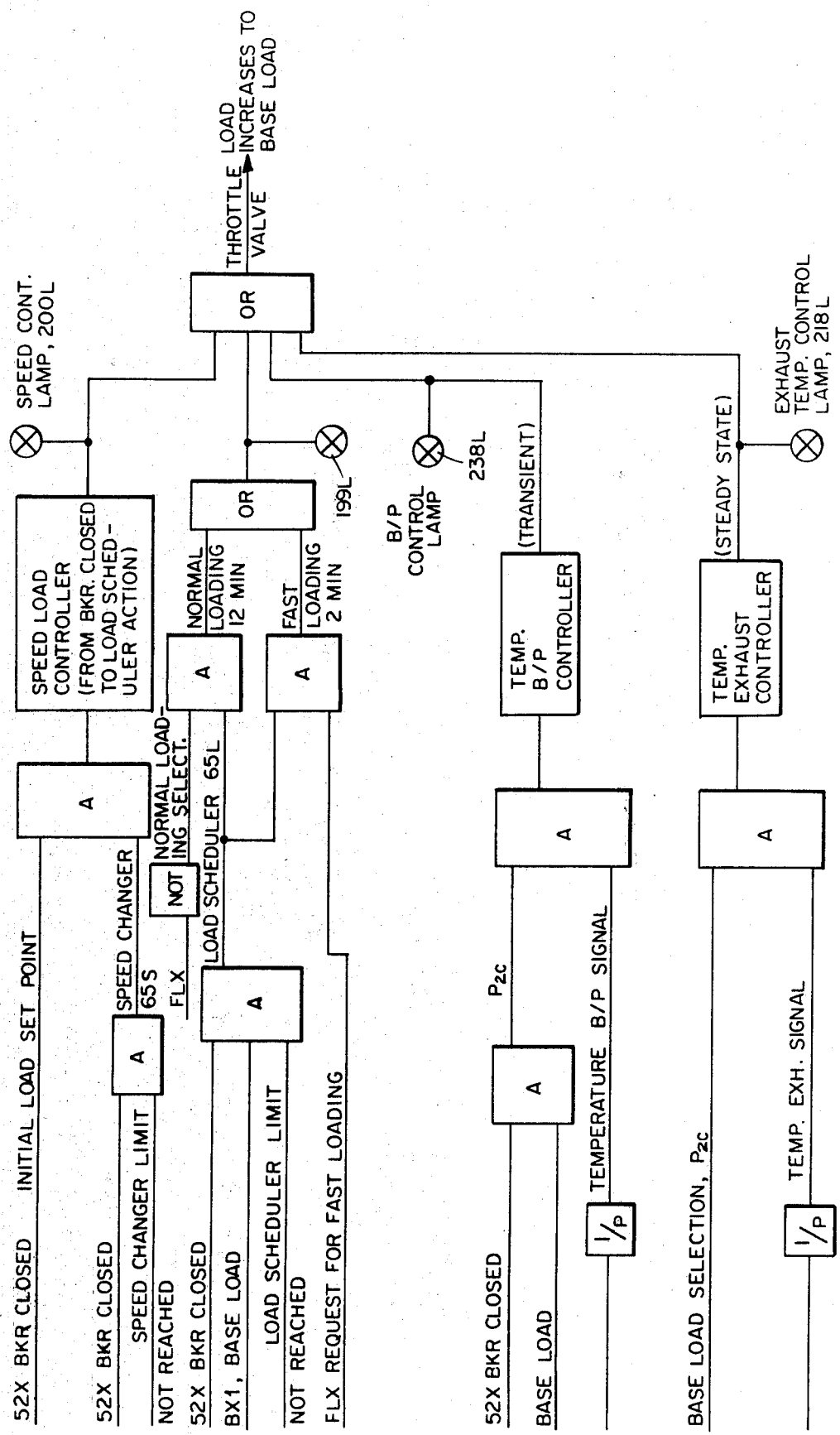

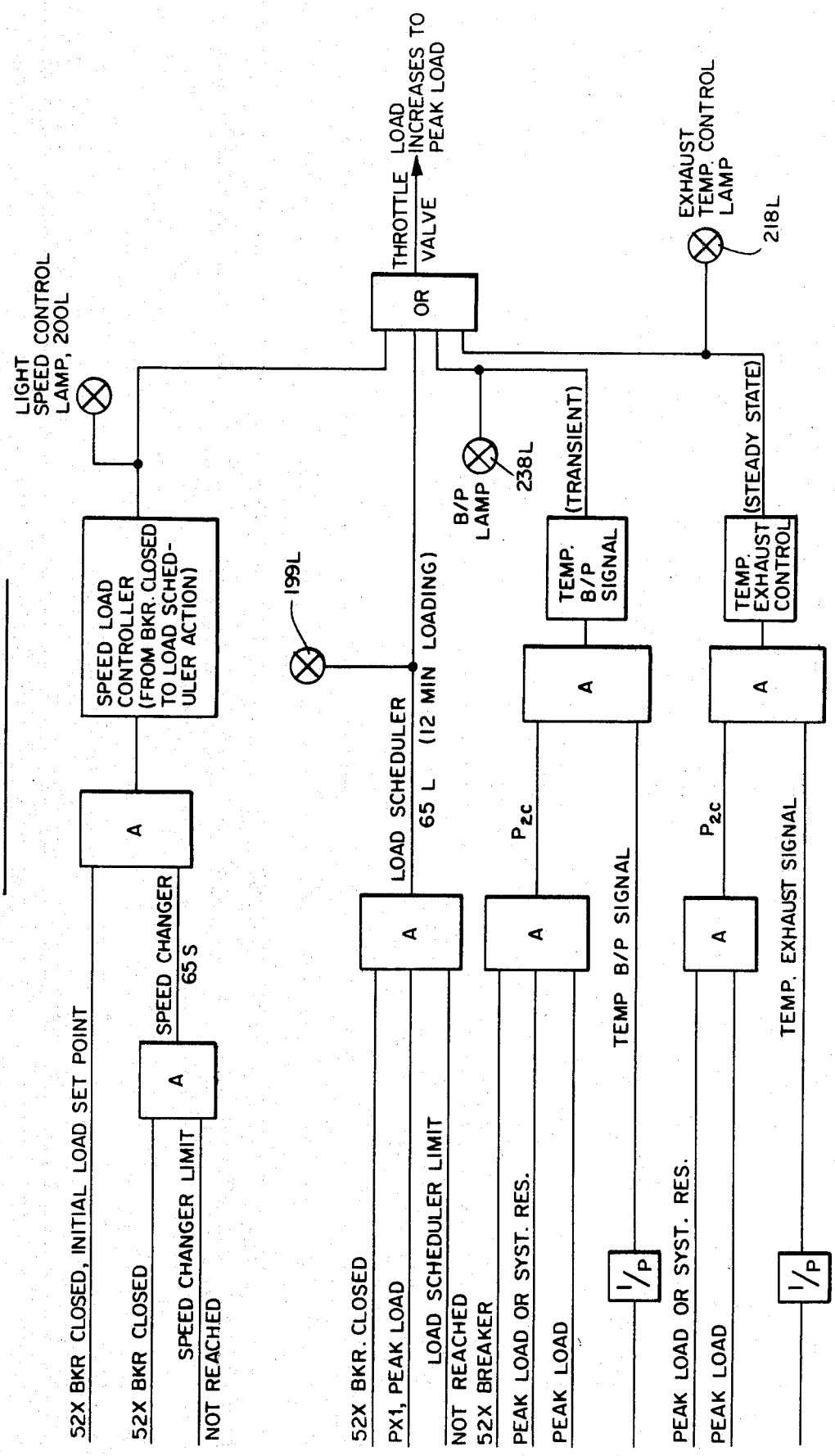
Fig. 17 PEAK LOAD CONTROL

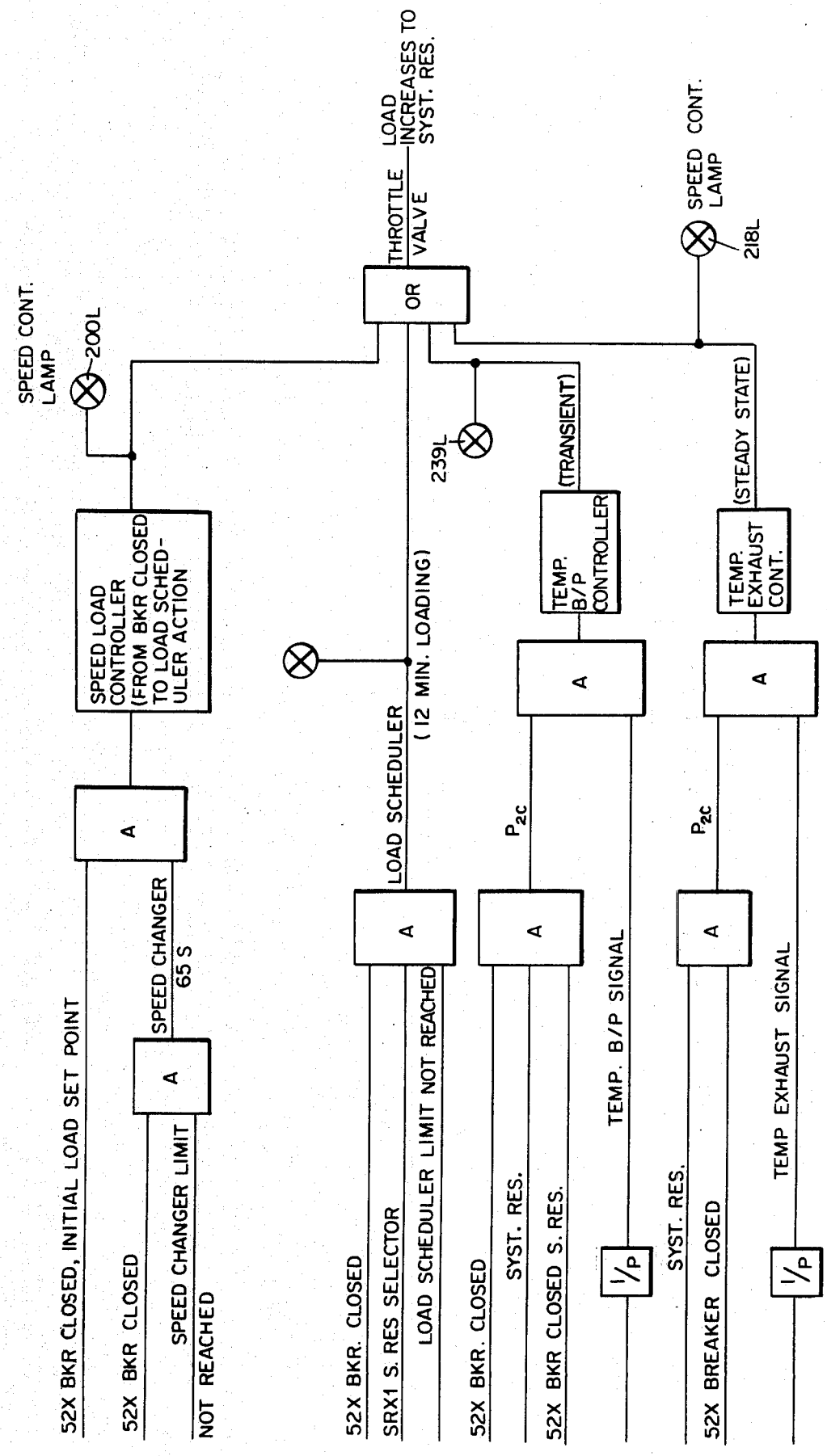

STARTING FUEL CONTROL

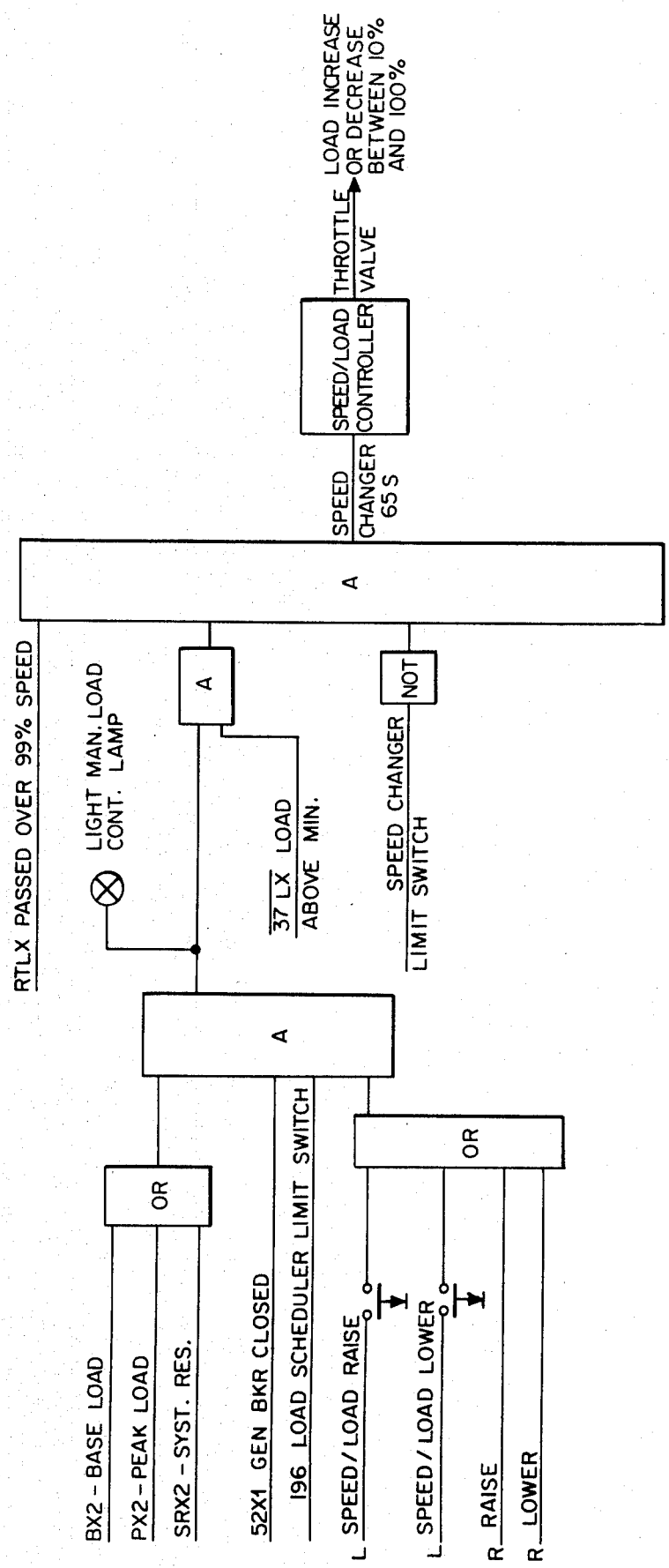

GAS TURBINE POWER PLANT CONTROL APPARATUS INCLUDING AN AMBIENT TEMPERATURE RESPONSIVE CONTROL SYSTEM

This is a continuation of application Ser. No. 817,932, filed July 22, 1977.

CROSS-REFERENCE TO RELATED APPLICATIONS

U.S. patent application Ser. No. 319,114 filed by J. Reuther and T. Giras on Dec. 29, 1972 as a continuation of U.S. patent application Ser. No. 082,470 filed on Oct. 20, 1970 and now abandoned, entitled IMPROVED SYSTEM AND METHOD FOR OPERATING INDUSTRIAL GAS TURBINE APPARATUS AND GAS TURBINE ELECTRIC POWER PLANTS PREFERABLY WITH A DIGITAL COMPUTER CONTROL SYSTEM, and assigned to the present assignee.

U.S. patent application Ser. No. 323,593 now U.S. Pat. No. 3,891,915 filed by R. Yannone and R. Kiscaden on Jan. 15, 1973 as a continuation of U.S. patent application Ser. No. 189,632 filed on Oct. 15, 1971 and now abandoned, entitled IMPROVED DIGITAL COMPUTER CONTROL SYSTEM AND METHOD FOR MONITORING AND CONTROLLING OPERATION OF INDUSTRIAL GAS TURBINE APPARATUS TO DRIVE SIMULTANEOUSLY AN ELECTRIC POWER PLANT GENERATOR AND PROVIDE EXHAUST GASES TO AN INDUSTRIAL PROCESS, and assigned to the present assignee.

Reference is also made to the following co-filed and commonly assigned applications, all filed by R. A. Yannone and J. J. Shields on June 20, 1973:

U.S. patent application Ser. No. 371,625 now U.S. Pat. No. 3,911,285 entitled GAS TURBINE POWER PLANT CONTROL APPARATUS HAVING A MULTIPLE BACKUP CONTROL SYSTEM;

U.S. patent application Ser. No. 371,626 now U.S. Pat. No. 3,943,373 entitled GAS TURBINE POWER PLANT CONTROL APPARATUS INCLUDING A SPEED/LOAD HOLD AND LOCK SYSTEM;

U.S. patent application Ser. No. 371,621 now U.S. Pat. No. 3,943,371 entitled GAS TURBINE POWER PLANT CONTROL APPARATUS INCLUDING AUTOMATIC LOAD PICKUP;

U.S. patent application Ser. No. 371,627 now U.S. Pat. No. 3,924,141 entitled GAS TURBINE POWER PLANT CONTROL APPARATUS INCLUDING A TWO-SHOT SHUTDOWN SYSTEM;

U.S. patent application Ser. No. 371,623 now U.S. Pat. No. 4,019,315 entitled GAS TURBINE POWER PLANT CONTROL APPARATUS INCLUDING A TEMPERATURE RESET STARTING CONTROL SYSTEM AND AN IGNITION PRESSURE CONTROL SYSTEM;

U.S. patent application Ser. No. 371,630 now U.S. Pat. No. 3,892,975 entitled GAS TURBINE POWER PLANT CONTROL APPARATUS HAVING IMPROVED MONITORING AND ALARM ELEMENTS;

U.S. patent application Ser. No. 371,629 now U.S. Pat. No. 4,208,591 entitled GAS TURBINE POWER PLANT CONTROL APPARATUS INCLUDING A LOAD CONTROL SYSTEM; and U.S. patent application Ser. No. 371,624 now U.S. Pat. No. 3,955,359 entitled BEARING TEMPERATURE SYSTEM FAILURE DETECTION APPARATUS SUITABLE FOR USE IN POWER PLANTS AND LIKE APPARATUS.

BACKGROUND OF THE INVENTION

The present invention relates to gas or combustion turbine apparatus, gas turbine electric power plants and control systems and operating methods therefor.

Industrial gas turbines may have varied cycle, structural and aerodynamic designs for a wide variety of uses. For example, gas turbines may employ the simple, regenerative, steam injection or combined cycle in driving an electric generator to produce electric power. Further, in these varied uses, the gas turbine may have one or more shafts and many other rotor, casing, support and combustion system structural features which can vary relatively widely among differently designed units. They may be aviation jet engines adapted for industrial service as described for example in an ASME paper entitled "The Pratt and Whitney Aircraft Jet Powered 121 MW Electrical Peaking Unit" presented at the New York Meeting in November-December, 1964.

Other gas turbine uses include drive applications for pipeline or process industry compressors and surface transportation units. An additional application of gas turbines is that which involves recovery of turbine exhaust heat energy in other apparatus such as electric power or industrial boilers or other heat transfer apparatus. More generally, the gas turbine air flow path may form a part of an overall process system in which the gas turbine is used as an energy source in the flow path.

Gas turbine electric power plants are usable in base load, mid-range load and peak load power system applications. Combined cycle plants are normally usable for the base or mid-range applications while the power plant which employs a gas turbine only as a generator drive typically is highly useful for peak load generation because of its relatively low investment cost. Although the heat rate for gas turbines is relatively high in relation to steam turbines, the investment savings for peak load application typically offsets the higher fuel cost factor. Another economic advantage for gas turbines is that power generation capacity can be added in relatively small blocks such as 25 MW or 50 MW as needed for expected system growth thereby avoiding excessive capital expenditure and excessive system reserve requirements. Further background on peaking generation can be obtained in articles such as "Peaking Generation", a Special Report of Electric Light and Power dated November, 1966.

Startup availability and low forced outage rates are particularly important for peak load power plant applications of gas turbines. Thus, reliable gas turbine startup and standby operations are particularly important for power system security and reliability.

In the operation of gas turbine apparatus and electric power plants, various kinds of controls have been employed. Relay-pneumatic type systems form a large part of the prior art, but have heretofore not provided the flexibility desired, particularly in terms of decision making. Furthermore, such prior art systems have been characterized by being specially designed for a given turbine plant, and accordingly are not adaptable to provide different optional features for the user. More recently, electronic controls of the analog type have been employed as perhaps represented by U.S. Pat. No. 3,520,133 entitled Gas Turbine Control System and issued on July 14, 1970 to A. Loft or by the control referred to in an article entitled "Speedtronic Control, Protection and Sequential System" and designated as Ger-2461 in the General Electric Gas Turbine Reference Library. See also U.S. Pat. No. 3,662,545, which discloses a particular type of analog acceleration control circuit for a gas turbine and U.S. Pat. No. 3,340,883, relating to an analog acceleration, speed and load control system for a gas turbine. A wide variety of controls have been employed for aviation jet engines including electronic and computer controls as described for example in a March, 1968 ASME Paper presented by J. E. Bayati and R. M. Frazzini and entitled "Digatec (Digital Gas Turbine Engine Control)", an April 1967 paper in the Journal of the Royal Aeronautical Society authored by E. S. Eccles and entitled "The Use of a Digital Computer for On-Line Control of a Jet Engine", or a July, 1965 paper entitled "The Electronic Control of Gas Turbine Engines" by A. Sadler, S. Tweedy and P. J. Colburn in the July, 1967 Journal of the Royal Aeronautical Society. However, the operational and control environment for jet engine operation differs considerably from that for industrial gas turbines.

The aforereferenced U.S. application Ser. No. 319,114, assigned to the present assignee, presents an improved system and method for operating a gas turbine with a digital computer control system. In this system, one or more turbine-generator plants are operated by a hybrid digital computer control system, wherein logic macro instructions are employed in programming the computer for logic operations of the control system.

In referencing prior art publications or patents as background herein, no representation is made that the cited subject matter in the best prior art.

While industrial gas turbine apparatus and gas turbine power plants have attained a great sophistication, there remain certain operational limitations in flexibility, response speed, accuracy and reliability. Further limits have been in the depth of operational control and in the efficiency or economy with which single or multiple units are placed under operational control and management. Limits have existed on the economics of industrial gas turbine application and in particular on how close industrial gas turbines can operate to the turbine design limits over various speed and/or load ranges.

In gas turbine power plants, operational shortcomings have existed with respect to plant availability and load control operations. Compressor surge control response has been limited, particularly during startup. Temperature limit control has been less protective and less responsive than otherwise desirable.

Generally, overall control loop arrangements and control system embodiments of such arrangements for industrial gas turbines have been less effective in operations control and systems protection than is desirable. Performance shortcomings have also persisted in the interfacing of control loop arrangements with sequencing controls.

With respect to industrial gas turbine startup, turbine operating life has been unnecessarily limited by conventional startup schemes. Sequencing systems have typically interacted with startup controls less effectively than desirable from the standpoint of turbine and power plant availability. More generally, sequencing systems have provided for systematic and protective advance of the industrial gas turbine operations through startup, run and shutdown, but in doing so have been less efficient and effective from a protection and performance standpoint than is desirable.

Restrictions have been placed on operations and apparatus management particularly in gas turbine power plants in the areas of maintenance and plant information acquisition. Further management limits have existed with respect to plant interfacing with other power system points, operator panel functionality, and the ability to determine plant operations through control system calibration and parameter changes.

The computerized gas turbine control as disclosed in U.S. application Ser. No. 319,114 has been highly successful in providing control capability and flexibility of control options that had not previously been incorporated into an all hardware type system. However, while the computerized, or software control system provides substantial advantages due to its logic performing capability, historical data storage and diagnostic programs, it also has a number of shortcomings. The interface between the turbine and its associated analog signals and the computer controller presents areas for future development and improvement. The analog input system is a complex multiplexing arrangement requiring sharing of the scan time by the variables which must be scanned or read "independently". In the system disclosed, there is a scanning rate of 30 per second, meaning that 30 input variables per second can be read, imposing a limitation on the ability of the system to respond rapidly to a given input variable when program running time is also added to the delay. In addition, the computer system itself incorporates elaborate techniques of self-diagnosis of failure, which can result in turbine shutdowns when the computer has determined that something has failed within the central processor, input-output, or peripheral hardware. It is most difficult for the computer to determine whether the failure is of a sufficiently critical nature to require shutdown. In fact, it has been found that failures in the analog input-output system may not be readily differentiated, leaving the computer no choice but to shut down the entire turbine system for a failure which may not justify loss of load availability. Since all monitoring and protection paths are channeled through a central processor, a self-determination of failure in the central processor, analog input multiplexing or output system by the computer controller necessitates blocking off all channels, such that complete system shutdown is required. Furthermore, even during normal operation, the computerized system provides low visibility with respect to the health of the control system. The essential intermixing of the control paths through the central processor makes it difficult for the operator to obtain information as to the mode of control at any moment, or to obtain quantitative information as to the relative magnitudes of the different control signals. In short, the increased flexibility of the software system is achieved at the expense of operator visibility such as permits optimum maintenance procedures. Accordingly, there is a great need in the art for a turbine system having a control with the logic capability of a digital system, but retaining the advantages which are inherent in simpler designs.

The gas turbine control system as disclosed herein incorporates novel features which are specifically designed to meet the above general requirements, and which go further in providing operating capability not heretofore available in any turbine control system. The control system of this invention includes a plurality of continuously closed control loops, each of which continuously generates a control signal adapted to control the turbine fuel system, and thereby control available fuel to the turbine, thereby controlling turbine operation itself. Each of the control loops contains logic capability, is adaptable to be constructed in different hardware forms, and provides continuous visual indication for the operator and continuous monitoring for alarm or turbine shutdown. In this manner, should failure, or even a lesser malfunction, occur in any of the control paths, a backup control signal is available to take over turbine control, without the failure causing loss of turbine availability. Furthermore, means are provided by which the operator can immediately determine the source and, in many instances, the nature of the malfunction, so that corrective maintenance can be quickly and efficiently undertaken.

Another specific improvement is the provision of adapting the turbine control for changes in ambient temperature, such as occur between summer and winter operation. In prior art systems, which are dependent solely on monitoring of internal turbine conditions, unwanted operating limitations are imposed by changes in ambient temperature. Such limitations have been reduced substantially by the novel adaptive control means disclosed herein.

Another area of great importance in gas turbine control is that of immediately meeting load demand upon generator breaker closing. Past controls have generally provided for a continuous buildup of load, starting from zero load at generator breaker closing and proceeding roughly linearly to a desired load level. However, there are a number of applications where it is required, or at least highly desirable, to provide an essentially instantaneous pickup of load. Accordingly, this invention provides novel means for controlling the turbine fuel flow so as to provide capability for such immediate load pickup.

A critical portion of the operation of any turbine involves the starting sequence, at which time the turbine undergoes severe temperature changes, with possible resulting damage due to thermal stress. The turbine control system of this invention accordingly incorporates novel features to limit turbine speed change as a function of monitored turbine termperature, and to schedule the fuel supplied to the turbine combustor element so as to minimize risk of thermal damage during the starting operation. One of the novel techniques employed in this respect is the specific means of scheduling bypass fuel flow in the turbine fuel system during startup, so as to control the fuel pressure at the combustor nozzles. A bypass temperature limiter valve suitable in this operation, with which desired combustor nozzle fuel pressure is obtained during ignition, is disclosed in co-pending U.S. patent application Ser. No. 261,192, assigned to the same assignee. The technique disclosed herein involves novel means of utilizing apparatus such as is disclosed in Ser. No. 261,192.

One of the greatest needs in any turbine control system is that of providing operator flexibility, and in particular providing the operator with the capability of efficiently changing load as desired. Most prior art turbine control systems are quite limited in the degree of flexibility available to the operator, e.g., only discrete operating load levels are available, or the available means of changing the load level to a desired level is cumbersome and/or cannot be achieved at a desired rate. Accordingly, the control system of this invention provides novel means having essentially unlimited flexibility for operator change of the load level, rate of change of such load level, the ability to hold load at any desired level, and the ability to return to any predetermined load level. This capability is constantly backed up by temperature control capability, such that no matter what the operator attempts to do, operational limits are automatically imposed as a function of sensed turbine temperatures.

A yet further need in a turbine control system is that of providing a reliable and workable monitoring system. As pointed out hereinabove, in computerized turbine control systems all monitoring and protection paths are channeled through a central processor, which frequently results in the computer requiring complete shutdown when, in fact, the turbine is being operated within safe limits. Also, even during normal operation, the computerized system frequently does not permit the degree of monitoring visibility which is highly advantageous for providing the operator with optimum ability to oversee the turbine operation. In order to overcome these difficulties and provide improved visibility and reliability, while maintaining maximum turbine availability, there is a need for a control system designed so as to provide continuous visual indication as to the current mode of turbine control, so that the operator can determine the health of the control system. This may be achieved by providing discrete modularized control paths which are in constant communication with the turbine and which generate independent control signals, and means for determining and displaying which of said independent signals is at any given moment in control of the turbine operation.

Turbine availability may also be greatly enhanced by providing means for automatically restarting the turbine after an automatic shutdown, and upon a determination that safe conditions exist for such restarting. In many cases, the condition which caused the turbine to be placed in shutdown is corrected, or corrects itself, shortly after shutdown is initiated. However, in conventional turbine control systems the turbine must be brought substantially completely to the shutdown state, and then restarted all over again. It is clear that this results in avoidable loss of turbine availability, and that there is a need to minimize the loss of availability by restarting as soon as turbine conditions permit. The gas turbine monitoring system as disclosed herein provides a shutdown subsystem having a novel arrangement for automatically restarting the turbine after correction of the malfunction which caused shutdown.

The monitoring system of this invention also incorporates a unique system and method for optimizing load availability while providing an alarm or other means to alert the operator to the existence of a control malfunction which must be corrected but which does not merit immediate turbine shutdown. This unique system avoids the inflexibility of currently used monitoring circuits which are designed either to be fail-safe (in which case load availability is sacrificed to ensure shutdown), or which are designed to fail in a designated direction, (thus always providing continuing availability, but at the cost of not shutting down in instances where shutdown might be required).

SUMMARY OF THE INVENTION

An industrial gas turbine or gas turbine-generator power plant is operated by a hybrid control system which is particularly adapted to optimize interfacing of control loops, sequencing controls and monitoring functions, so as to maximize turbine availability. The control system operates in a gas turbine control loop arrangement to control fuel flow and thereby provide speed, load and loading rate control over the turbine, and also to provide backup temperature limit control. The control paths have independent input interfaces with the turbine, and further provide, along with the monitoring subsystem, high reliability through redundancy and multiplicity features.

Specifically, there is provided a control system for controlling the operation of a gas turbine electric power plant which controls turbine operation during starting within a predetermined range of operating limits, which range is automatically adapted to be a function of turbine ambient temperature, so as to maintain the turbine operating limits within substantially the same range throughout all reasonable variations in ambient temperature. The control system includes a plurality of control paths each of which produces a respective control path signal, one of which is selected to control turbine fuel, and thus turbine operation. The plurality includes at least one backup temperature control path which provides a limiting temperature control signal, which temperature signal is a function of turbine ambient temperature. By thus making turbine starting operation subject to a limit signal which is a function of ambient temperature, substantial uniform starting operation is obtained during all seasons.

BRIEF DESCRIPTION OF THE DRAWINGS

FIG. 15 shows a block diagram of a portion of the control system for operating the turbine in the minimum load mode.

FIG. 16 shows a block diagram of the control system for operating the turbine in the base load mode.

FIG. 17 shows a block diagram of a portion of the control system for operating the turbine in the peak load mode.

FIG. 18 shows a block diagram of the control system for operating the turbine in the system reserve mode.

FIG. 19 shows a block diagram of a portion of the control system for operating the turbine in the fast load mode.

FIG. 21 shows a block diagram of a portion of the control system for operating the turbine in the manual load mode.

DESCRIPTION OF THE PREFERRED EMBODIMENTS

A. POWER PLANT

1. General Structure

Figure 1:
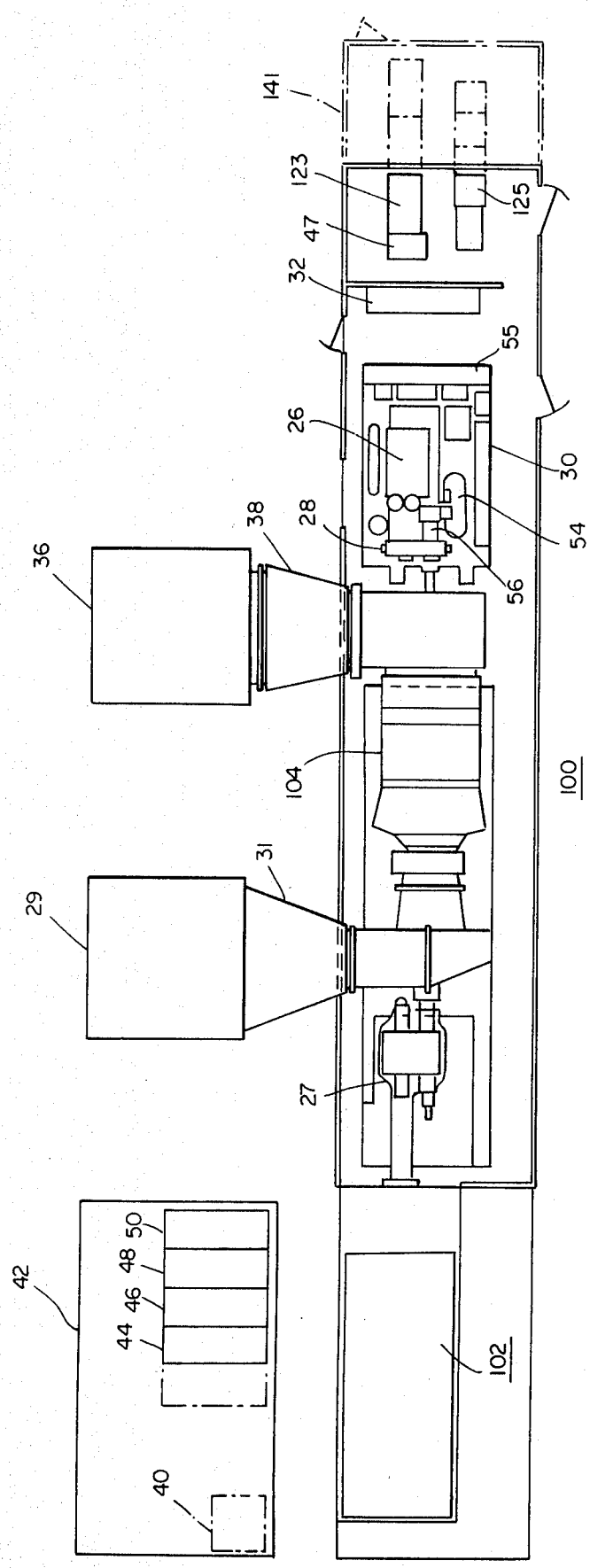
FIG. 1 shows a top plan view of a gas turbine power plant arranged to operate in accordance with the principles of the invention.

Referring now to FIG. 1, there is shown a gas turbine electric power plant 100 which includes an AC generator 102 driven by a combustion or gas turbine 104 through a reduction gear unit 27. In this application of the invention, the gas turbine 104 may be the W-251G simple cycle type manufactured by Westinghouse Electric Corporation. In other power plant generator applications, other industrial drive applications, and combined steam and gas cycle applications of various aspects of the invention, industrial gas turbines having larger or smaller power ratings, different cycle designs, or a different number of shafts from W-251G can be employed.

The plant 100 may be housed in an enclosure (not shown) and then placed on a foundation approximately 106 to 115 feet long dependent upon the number of optional additional plant units to be accommodated thereon. Three or more additional units may be provided. Exhaust silencers 29 and 36 coupled respectively to inlet and exhaust duct works 31 and 38 significantly reduce noise characteristicly associated with turbine power plants.

Startup or cranking power for the plant 100 is provided by a starting engine 26 such as a diesel engine. Starting engine 26 is mounted on an auxiliary bedplate and coupled to the drive shaft of the gas turbine 104 through a starting gear unit 28. A DC motor 54 operates through a turning gear 56 which is also coupled to the gas turbine shaft starting gear 28 to drive the gas turbine at turning gear speed.

A motor control center 30 is also mounted on the auxiliary bedplate and it includes motor starters and other devices to provide for operating the various auxiliary equipment items associated with the plant 100.

A plant battery 32 is disposed adjacent to one end of the auxiliary bedplate or skid. The battery provides power for emergency lighting, auxiliary motor loads, and other control power for a period following shutdown of the plant 100 due to a loss of AC power. The battery also supplies power for the DC lube pump, DC turning gear, DC/AC inverter, and is available for block plant starting. Also included on the auxiliary skid is pressure switch and gauge cabinet 55 which contains the pressure switches, gauges, regulators and other miscellaneous elements needed for gas turbine operation.

A switchgear pad 42 is included in the plant 100 for switchgear including the generator breaker as indicated by the reference characters 44, 46 and 48. Excitation switchgear 50 associated with the generator excitation system is also included on the switchgear pad 42.

2. Gas Turbine a. Compressor

Figure 2:
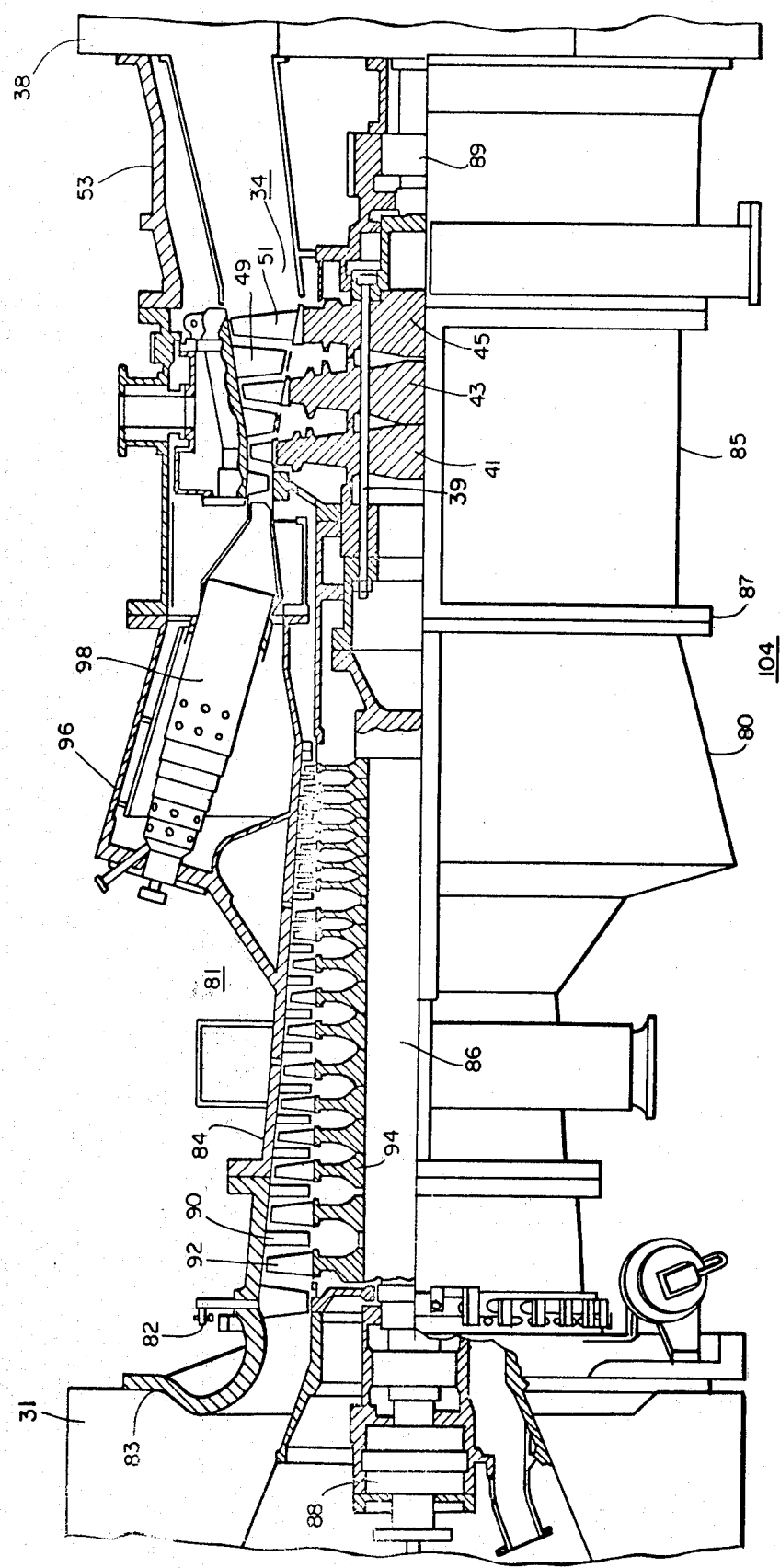
FIG. 2 shows a front elevational view of an industrial gas turbine employed in the power plant to drive a generator and it is shown with some portions thereof broken away.

The gas turbine 104 is suitably of the single shaft simple cycle type having a standard ambient pressure ratio of 9.0 to 1 and a rated speed of 4894 rpm, and is illustrated in greater detail in FIG. 2. Filtered inlet air enters a multistage axial flow compressor 81 through a flanged inlet manifold 83 from the inlet ductwork 31. An inlet guide vane assembly 82 includes vanes supported across the compressor inlet set at an optimum position for controlling machine airflow. The angle at which all of the guide vanes are disposed in relation to the gas stream is uniform and mechanically fixed by a positioning ring coupled to the vanes in the inlet guide vane assembly 82.

The compressor 81 is provided with a casing 84 which is split into base and cover parts along a horizontal plane. The turbine casing structure including the compressor casing 84 provides support for a turbine rotating element including a compressor rotor 86 through bearings 88 and 89. Vibration transducers (not shown) are provided for these two main gas turbine bearings 88 and 89.

The compressor casing 84 also supports stationary blades 90 in successive stationary blade rows along the air flow path. Further, the casing 84 operates as a pressure vessel to contain the air flow as it undergoes compression. Bleed flow is obtained under valve control from intermediate compressor stages to prevent surge during startup.

The compressor inlet air flows annularly through a total of eighteen stages in the compressor 81. Blades 92 mounted on the rotor 86 by means of wheels 94 are appropriately designed from an aerodynamic and structural standpoint for the intended service. A suitable material such as 12% chrome steel is employed for the rotor blades 92. Both the compressor inlet and output air temperatures are measured by suitably supported thermocouples.

b. Combustion System

Pressurized compressor outlet air is directed into a combustion system 96 comprising a total of eight combustor baskets 98 conically mounted within a section 80 of the casing 84 about the longitudinal axis of the gas turbine 104. Combustor shell pressure is detected by a suitable sensor (not shown) which is coupled to the compressor-combustor flow paths and is located in the pressure switch and gauge cabinet 55.

Figure 3:
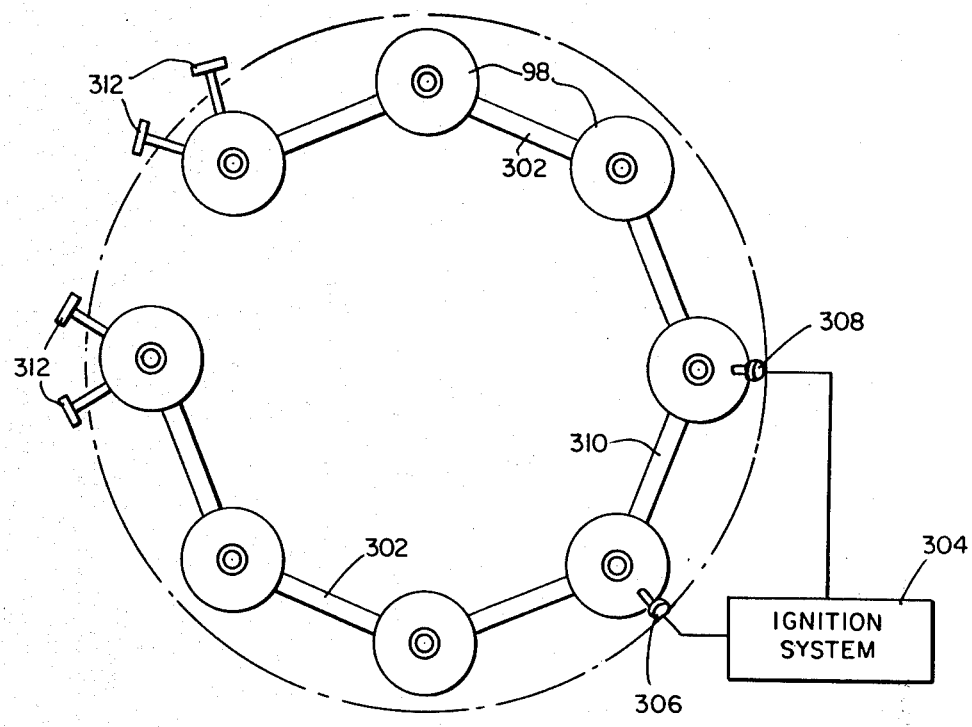
FIG. 3 shows portions of the ignition system apparatus used in the turbine of FIG. 2.

As schematically illustrated in FIG. 3, the combustor baskets 98 are cross-connected by cross-flame tubes 302 for ignition purposes. Ignition system 304 includes igniters 306 and 308 associated with respective groups of four combustor baskets 98. In each basket group, the combustor baskets 98 are series cross-connected and thed two groups are cross-connected at one end only as indicated by the reference character 310.

Generally, the ignition system 304 includes an ignition transformer and wiring to respective spark plugs which form a part of the igniters 306 and 308. The spark plugs are mounted on retractable pistons within the igniters 306 and 308 so that the plugs can be withdrawn from the combustion zone after ignition has been executed. The spark plugs wirhdraw automatically as compressor discharge pressure increases.

A pair of ultraviolet flame detectors 312 are located in each of the two end combustor baskets in the respective basket groups in order to verify ignition and continued presence of combustion in the eight combustor baskets 98. The flame detectors 312 can for example be Edison flame detectors Model 424-10433.

c. Fuel

Generally, either liquid or gaseous or both liquid and gaseous fuel flow can be used in the turbine combustion process. Various gaseous fuels can be burned including gases ranging from blast furnace gas having low BTU content to gases with high BTU content such as natural gas, butane or propane.

With respect to liquid fuels, the fuel viscosity must be less than 100 SSU at the nozzle to assure proper atomization. Most distillates meet this requirement. Heavier fuels must be heated.

A portion of the compressor outlet air flow combines with the fuel in each combustor basket 98 to produce combustion after ignition and the balance of the compressor outlet air flow combines with the combustion products for flow through the combustor basket 98 into a multistage reaction type turbine 34. The combustor casing section 80 is coupled to a turbine casing 85 through a vertical casing joint 87.

d. Turbine Element

The turbine element 34 is provided with three reaction stages through which the multiple stream combustion system outlet gas flow is directed in an annular flow pattern to transform the kinetic energy of the heated, pressurized gas into turbine rotation, i.e., to drive the compressor 81 and the generator 102. The turbine rotor is formed by a stub shaft and three disc blade assemblies 41, 43 and 45 mounted on the stub shaft by through bolts.

High temperature alloy rotor blades 51 are mounted on the discs in forming the disc assemblies 41, 43 and 45. Individual blade roots are cooled by air extracted from the outlet of the compressor 81 and passed through a coolant system in the manner previously indicated. The blade roots thus serve as a heat sink for the rotating blades 51. Cooling air also flows over each of the turbine discs to provide a relatively constant low metal temperature over the unit operating load range. Thermocouples (not shown) are supported within the cooled disc cavities to provide cavity temperature signals for the control system. The performance of the cooling air flow is detected by these thermocouples.

In addition to acting as a pressure containment vessel for the turbine element 34, turbine casing 85 supports stationary blades 49 which form three stationary blade rows interspersed between the rotor blade rows. Gas flow is discharged from the turbine element 34 substantially at atmospheric pressure through turbine cylinder 53 to exhaust manifold 38.

The generator and gas turbine vibration transducers can be conventional velocity transducers or pickups which transmit basic vibration signals to a vibration monitor for input to the control system. A pair of conventional speed detectors 78 (FIG. 4) are associated with a notched magnetic wheel supported at appropriate turbine-generator shaft locations. Signals generated by the speed detectors are employed in the control system for speed control and speed monitoring.

Further, thermocouples 180 (FIG. 4) for the blade path are supported about the inner periphery of the turbine cylinder 53 to provide a fast response indication of blade temperature for control system usage particularly during plant startup periods. Exhaust temperature detectors 57 are disposed in the exhaust manifold 38 primarily for the purpose of determining average exhaust temperature for control system usage during load operations of the power plant 100. Suitable high response shielded thermocouples for the gas turbine 104 are those which use compacted alumina insulation with a thin-wall high alloy swaged sheath or well supported by a separate heavy wall guide.

B. TURBINE FUEL CONTROL SUBSYSTEM

Figure 4:
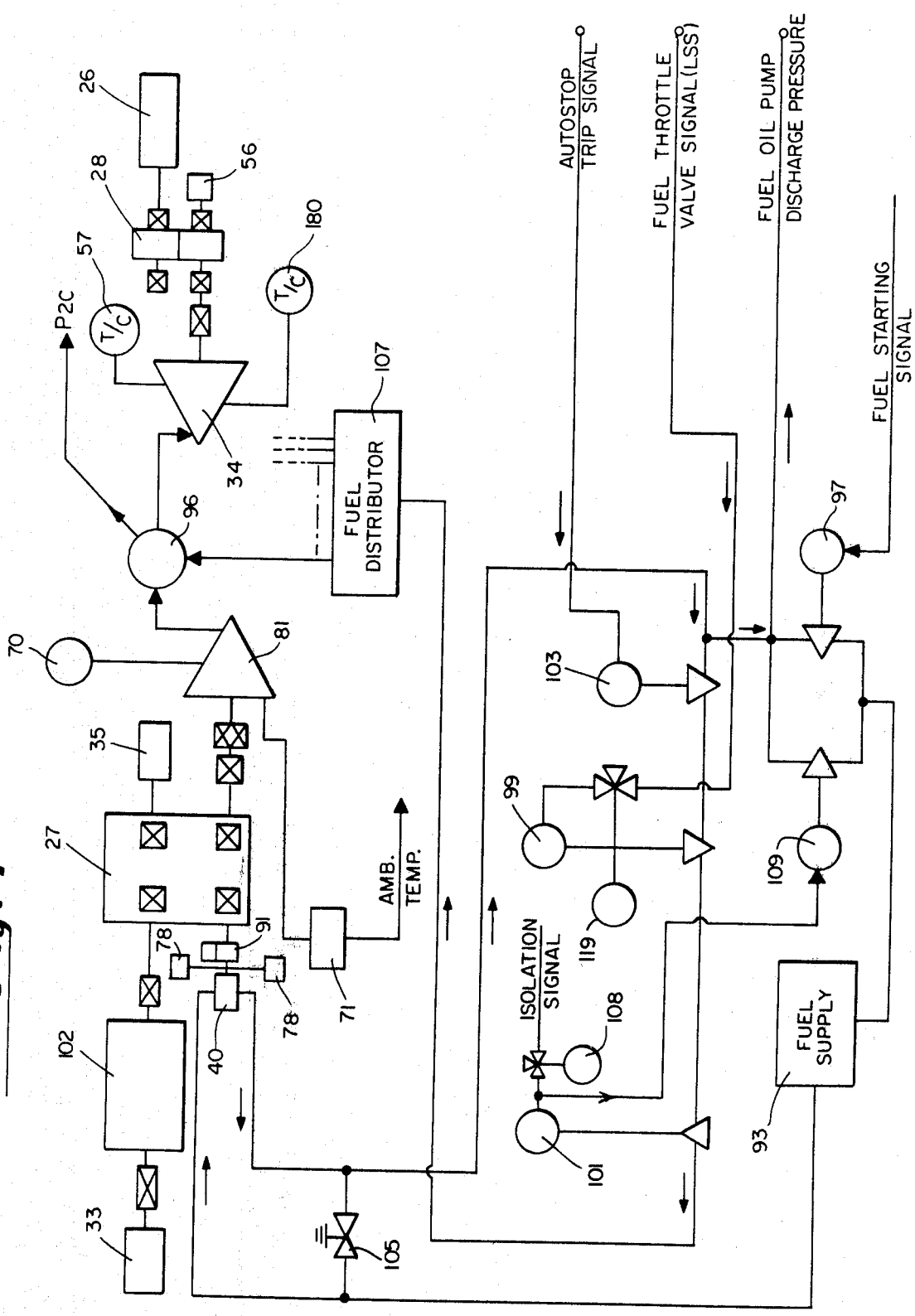
FIG. 4 shows a block diagram of the electropneumatic fuel flow system for the gas turbine of FIG. 2.

Referring now to FIG. 4, there is illustrated a detailed block diagram of the electro-pneumatic system of this invention employed to control liquid fuel flow for the gas turbine power plant of FIG. 1. As exciter 33 is shown connected to a generator 102, which is coupled to the turbine through reduction gear unit 27. A main lube pump 35 is also driven from unit 27, to provide pressure for the turbine oil system. The turbine unit is shown in diagrammatic form as comprising compressor 81, combustion system 96 (having 8 baskets) and turbine element 34. Starting engine 26 is coupled to the turbine through starting gear unit 28 as is turning gear 56. A pressure representative of the ambient temperature at compressor 81 is developed by transmitter 71. Pressure switch 70 provides a signal when ignition speed is reached in the compressor. Similarly, thermocouple sysem 180, also comprising two groups of thermocouples, is positioned in turbine element 34 to provide a signal representative of blade path temperature, and thermocouple system 57 provides a signal representative of turbine exhaust temperature.

The liquid fuel system is powered by main fuel pump 40, (driven from reduction gear unit 27) which draws fuel from supply 93. Pump 40 is operative unless deenergized by penumatic overspeed trip mechanism and valve 91, and is limited by relief valve 105 connected across pump 40. Trip valve 91 is powered by a pneumatic autostop trip signal derived from a trip pressure system (not shown) and functions to prevent fuel from reaching the combustors at overspeed. The trip valve 91 is set to trip at 1.1 times synchronous speed.

From main pump 40, the fuel flows through normally open overspeed fuel trip valve 103, throttle valve 99, and fuel oil isolation valve 101 to conventional fuel distributor 104, which distributes the fuel to the various combustion baskets 98 of combustion system 96. Trip valve 103 is normally open, permitting fuel flow to the distributor, but closes to shut off fuel flow upon sensing a drop in pressure which occurs on operation of the overspeed trip valve 91 (or upon operation of a manual trip valve, not shown). Isolation valve 101 is opened when pressure in the overspeed trip system is detected to equal at least 40 psi at which time solenoid valve 108 is energized, permitting passage of actuating air through to valve 101.

Fuel throttle valve 99 is positioned by the fuel throttle valve signal communicated thereto through throttle solenoid 119 which is energized at ignition (as described in more detail hereinbelow). The throttle valve is shunted by a pressure-temperature (PT) limiter valve 109 as well as pump discharge valve 97. The PT valve is actuated by air from the isolation valve air system, such that when isolation valve solenoid 108 is energized, the PT valve is positioned to a fixed opening providing a limiting function at ignition. Pump discharge valve 97 is positioned by a fuel starting signal as described hereinafter, such that it controls a constant fuel pump discharge pressure from 50% speed to full load after first ramping pressure from the Igniton-20% speed condition.

The turbine system of this invention also contains a parallel gas fuel system, not illustrated in detail in the drawings. The gas fuel system also similarly interposes an auto stop trip valve, a throttle valve and an isolation valve between the gas supply and the turbine combustion system. A starting valve, having a positioner actuated by the starting signal as described hereinbelow, shunts the throttle valve.

FIG. 4 also indicates a number of sensing devices which provide important inputs to the turbine control system. A pressure switch 70 is activated when compressor pressure reaches a value corresponding to ignition speed. An ambient temperature transmitter 71 produces a signal representative of the ambient temperature into the compressor inlet. Exhaust thermocouples 57 monitor the turbine exhaust temperature, and blade path (B/P) thermocouples 180 monitor the blade path temperature. Speed sensors 78 provide a signal representative of the turbine speed.

C. GAS TURBINE MULTIPLE BACKUP CONTROL SYSTEM a. General Description

The preferred form of the apparatus of this invention for gas turbine speed and load control utilizes electro-pneumatic control components arranged in a manner so as to carry out digital computer-type logic functions with the reliability of special-purpose hardware. The operational sequence is accomplished by conventional control relays, with a combination of electro-pneumatic fuel scheduling, and is combined with an all solid state protective monitoring system. The control system features permissable manual local control, while being designed for completely automatic fully remote control. Areas of critical control operation such as starting temperature control, loading temperature control and speed control are supplied with total redundancy to permit continued operation upon failure of one section, and generous indication of fuel control modes is provided by light indication for ease of operation and maintenance.

Six control channels are used, namely load, speed-load, acceleration (surge), load-rate, exhaust temperature and blade path temperature. Speed control is effectuated through a pneumatic speed changer with backup control from both the acceleration channel and the blade path channel. Primary load control is achieved through a pneumatic load scheduler with backup temperature control from the blade path channel (for transient control) and from the exhaust temperature channel (for steady state control). When acting as a backup to speed control, the blade path channel produces a signal which is a function both of compressor discharge pressure and ambient temperature. During loading, the signals of both the blade path and exhaust temperature channels are referenced to a common compressor discharge pressure signal biased in accordance with the chosen load mode.

The output signals generated in each of the six control channels are provided as inputs to a low pressure selector, a pneumatic device which gates through to its output the lowest of its pneumatic inputs. The output of the low pressure selector (LPS) is supplied to a fuel gas valve servo control or to a fuel oil valve servo control, depending upon the selection of fuel. The lift of the fuel throttle valve (either oil or gas) is proportional to the output pressure of the LPS. When such output pressure is 3 PSI (or 1 volt, for analog system), or less, the throttle valve is at minimum lift position, and the turbine is under control of the PT or Pump Discharge Pressure Control Valves. When the LPS output exceeds about 3 PSI or 1 volt (about 50% speed) the throttle valves begin to open, and open proportionately up to a maximum lift position, corresponding to a signal of about 15 PSI (or 10 volts analog).

The exhaust temperature control is the normal controlling mode under load conditions. In the exhaust temperature control loop, the setpoint is obtained from a signal proportional to the compressor discharge pressure (a function of ambient temperature and compressor performance), and biased variously for either base load operation, peak load operation, or system reserve operation. Thus, these three modes of load operation are temperature-control modes. Each of these modes requires a specific fuel flow for a definite average temperature at the turbine inlet. Due to the high level of this temperature, it is not practical to measure a representative turbine inlet temperature, and therefore the exhaust temperature is measured and is used to calculate the inlet temperature. The exhaust temperature loop utilizes a PID (proportional, integral and derivative action) controller to generate the control signal (a function of both exhaust temperature and compressor discharge pressure). The exhaust temperature is sensed by 16 thermocouples, averaged in two groups of eight thermocouples each. The electrical signals from these two groups are transduced to pneumatic signals (or amplified in the analog embodiment), and a high (pressure) selector is utilized to select the higher value to prevent shutdown when pressure failure occurs at the output of one of the transducers. This multiplicity feature is exemplary of the manner in which this system provides improved reliability and load availability. The high (pressure) selector output is connected to a direct derivative device which functions to speed up the exhaust temperature control system. The exhaust thermocouples react slower to turbine temperature changes due to their downstream location, and the derivative compensates for this slower response.

The blade path temperature control is used as backup for the exhaust control. For this reason, the blade path pneumatic controller is biased slightly higher than that of the exhaust temperature controller, while receiving the same setpoint pressure under load control operations. During starting, the blade path controller receives its reference signal from a compressor discharge pressure signal which is biased by an ambient temperature signal, to provide a blade path control signal usable as backup control during the starting sequence.

Another unique feature of the reliability by multiplicity is demonstrated in the event of the unlikely loss of the total redundant exhaust measuring system, the blade path starting temperature control is rebiased to pick up this function while alarming and continuing to supply power in the run position.

Besides the fuel scheduling system, reliability by multiplicity is likewise inherent in the turbine protective system. The speed control, exhaust and blade path temperature system, disc cavity and bearing protection, as well as the ignition, flame, and vibration systems, all, by the way they are designed, embody "load availability". If components or portions of systems fail, the design criteria embodied in the system of this invention provides that the turbine continue producing power by alarming the condition, but selectively auctioneering the need to cause turbine shutdown. This is in marked contrast to computer-controlled systems, as well as prior art analog controlled systems.

Although some redundancy, where feasible and effective, is used to accomplish the Perpetual Power Production ("PPP") objective, duplication of components is not the only means for accomplishing this goal. The bearing monitoring system employs a unique means of detecting open thermocouples while the machine is running, and at the same time, causing a shutdown if a hot bearing warrants this action. The disc cavity monitoring system requires 2 alarms in the same cavity to produce a shutdown, based upon the premise that 2 open thermocouples in the same cavity at the same time are unlikely. Since the turbine system will shut down on a high exhaust or blade path temperature average, open thermocouples can do little more than change the non-controlling average. Also, failure of one side of the loop results in an automatic shift to the other side and an alarm display to notify the operator. This is likewise a feature of the vibration systems, where a pickup failure is alarmed while the turbine continues to run.

The speed system is unique in that dual pick-ups, dual channels, and auctioneering circuits are provided to alarm outage greater than 5%. The speed system continues running by selecting the higher of two inputs—once again based on the design premise that high readings under failure are unlikely.

In addition, as is discussed hereinbelow in relation to the specific embodiments, the system of this invention utilizes a modularity concept for functions and hardware employed to obtain reliability by multiplicity. Each control function, and each corresponding hardware portion, may be either pneumatic, analog or digital, or a hybrid combination. In contrast to prior art systems where hardware is multiplexed to accomplish functions, each control loop is independent and not time shared. The failure of one function or component in the system does not cause starting to abort or turbine to shut down. As a result, no local additional maintenance control system is necessary since the system has self-contained back-up control.

In the detailed description of the electropneumatic embodiment which follows, only those elements important for an understanding of the system are illustrated. However, it is recognized that the total system comprises a number of additional elements which are necessary components of the entire system. The following is a partial list of such backup elements, which are not illustrated in the drawings:

a. Turbine cooling air system. This system provides cooling air to the turbine blading and disc cavities and for the rotor cooling.

b. Atomizing air system. When oil fuel is used an atomizing device is required to break up and atomize the fuel oil into minute particles to obtain maximum combustion of the fuel mixture during the ignition period.

c. Instrument air system. This system consists of an independent compressor, reservoir filters and several control devices. The independent compressor functions only during initial starting, and at a lower capacity after shutdown. When the turbine compressor pressure is sufficient, the independent compressor is shut off and the turbine compressor supplies the instrument air. The instrument air system provides the required air supply for all of the pneumatic devices illustrated as components of the control system. In the discussion to follow, air pressures are recited as being PSI, although such pressures are in fact gauge pressures.

The specific pneumatic devices which are discussed in detail hereinbelow are all commercially available devices, and no claim is made as to the novelty of any such pneumatic devices. The controllers, transmitters, pilot relays, reducing relays, amplifying relays, direct derivative units, low pressure selector, high pressure selectors, high limit relays, bias relays, and totalizing relays are all available from Moore Products Co., Springhouse, Pa. See, for example, the Moore publication titled "Nullmatic Controllers", Bulletin 5018, which describes in detail the pneumatic controllers as specified hereinbelow.

b. Detailed Description

Figure 5:
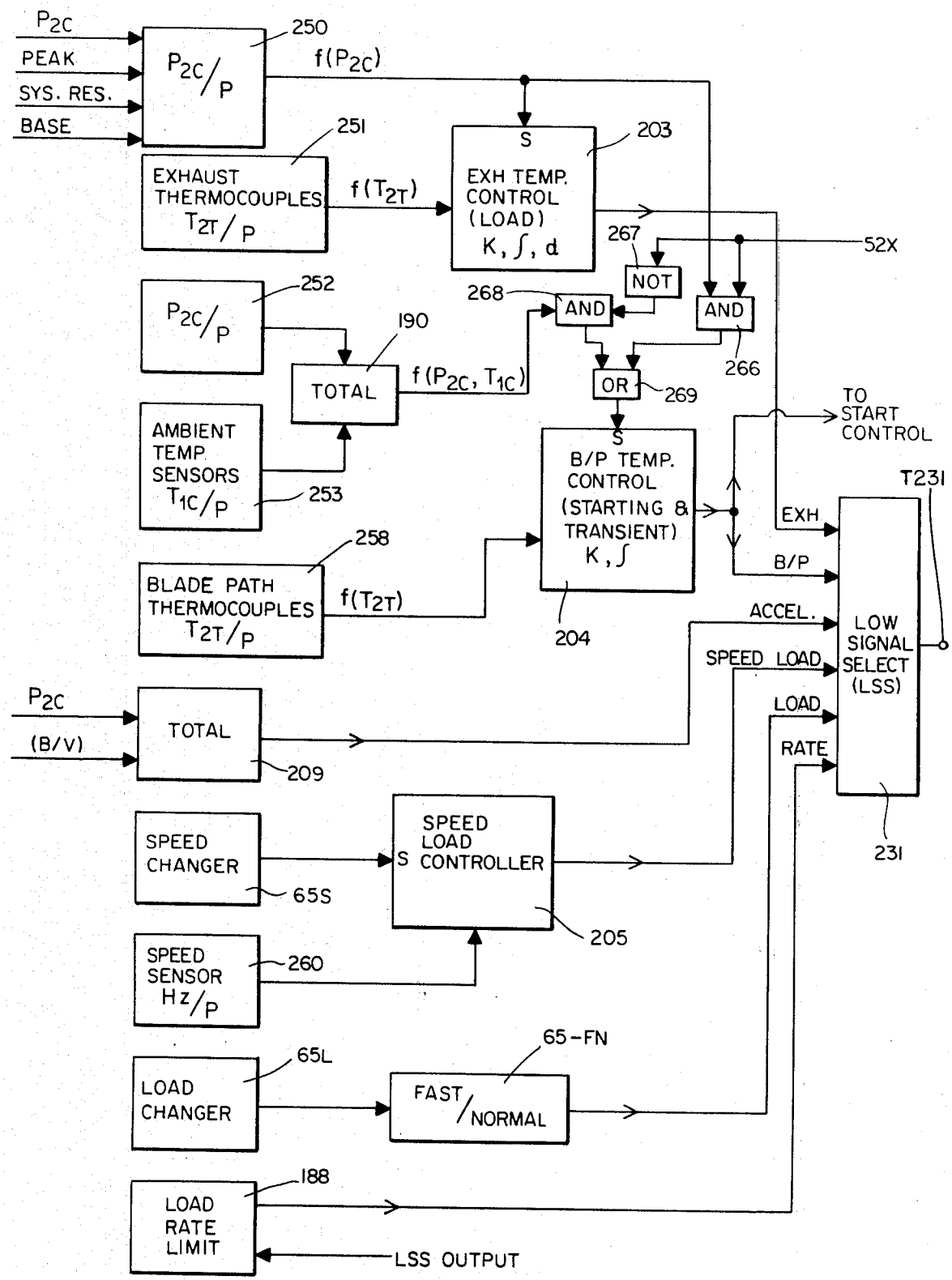
FIG. 5 shows a block diagram of the control paths for generating the primary control signal for controlling speed and load of the turbine of FIG. 2.

Referring now to FIG. 5, there is shown a block diagram of the control paths for generating, from different inputs, control signals suitable for control of turbine fuel flow, and consequently of turbine speed and load. In the embodiment as illustrated by this block diagram, each control path develops a pneumatic signal, and the plurality of pneumatic signals thus developed are connected to a low pressure select element 231, which selects that signal having the lowest pressure and produces it as the output control signal. While the system as thus illustrated in FIG. 4 is primarily pneumatic, it is to be understood that the same functions may be performed with equivalent analog or digital means.

The turbine combustor shell pressure (compressor discharge pressure) $P_{2C}$ is communicated from the turbine combustion system 96 and is operated upon, as shown in block 250, to produce a pneumatic pressure which is a function of $P_{2C}$. Also communicated to block 250 is information concerning whether the turbine is being operated in the base, peak or system reserve load mode, and the operation at block 250 produces an output which is a different function of $P_{2C}$ depending upon the chosen mode. As seen in FIG. 6B, the $T_{2T}-P_{2C}$ curve varies as a function of the load level carried by the turbine, where $T_{2T}$ represents B/P or EXH temperature. The output from 250 is connected to block 203. Also connected to block 203 is a pressure signal representing a function of the exhaust temperature as measured by thermocouples positioned at the turbine exhaust location. The operation at block 203 comprises proportional, integral and derivative action to produce an output signal which is a function of the measured exhaust temperature as compared to the setpoint as produced by the output of block 250. The signal from block 203 thus represents a constraint on exhaust temperature as a function of shell pressure, in accordance with the known relationship between these two variables (as illustrated in FIG. 6B). The output of block 203, designated EXH, is connected to the input of the low pressure select block 231.

A second control path is employed to derive a control signal which is a function of the blade path temperature. As shown at block 258, the blade path temperature is determined from thermocouples placed in the blade path, and such determined temperature is converted into an appropriate pressure which is a function of blade path temperature, $T_{2T}$. In addition, the combustor shell pressure $P_{2C}$ is converted into a corresponding pressure at block 252 and the ambient temperature is sensed and converted to a respective corresponding pressure at block 253. These two pressures are totaled at block 190, to give an output pressure representative of the algebraic sum of such two input pressures. The signal from block 258 is connected to block 204 as an input variable signal, and the signal from block 190 is connected as a setpoint signal, and are operated on at block 204 by proportional and integral action to develop the blade path (B/P) signal, comprising the second input to block 231.

The third control path comprises totaling, at 209, the $P_{2C}$ signal as well as a bleed path (B/V) signal representative of turbine surge. The output of this totaling step produces an acceleration limit signal.

A fourth control path, designated speed load, produces a signal which is a function of sensed speed as compared to a variable speed setpoint. As shown at block 260, speed is sensed by appropriate sensors, and converted to a pressure signal representative of such speed, which pressure signal is introduced at block 205 as a variable input. A variable speed setpoint is produced by a speed changer 65S, which in the preferred embodiment is a pneumatic generator. The speed changer output, designed to accelerate the turbine from 50% speed to 100% speed, is introduced to block 205 as the setpoint. A signal is developed at block 205 proportional to the difference between the setpoint and the variable, and is communicated to block 231 as the speed load signal.

A fifth control path produces a load signal, and comprises generating a programable signal at load changer block 65L, the output of which may be modified at block 65-FN to produce a fast changing or normal changing load signal, the output block 65-FN in turn being connected to the select block 231. In addition, a sixth variable control signal is generated at block 188, which has as its input the output of the low signal select block 231, and produces an output which limits the limit or rate of change of the control signal.

At block 231, the six inputs are compared and the low value is chosen and gated through to the output at terminal T231. This signal is employed to control the throttle valve, or valves, which in turn control the amount of fuel being delivered to the turbine combustors. For normal operation, the exhaust and B/P signals, which are temperature control signals, are biased higher than the speed and load signals, so that during normal trouble-free operation, they do not control. However, these control signals are present as backup control, and in the preferred embodiment of the invention at all times during operation of the turbine system temperature backup control is available.

Figure 6A:
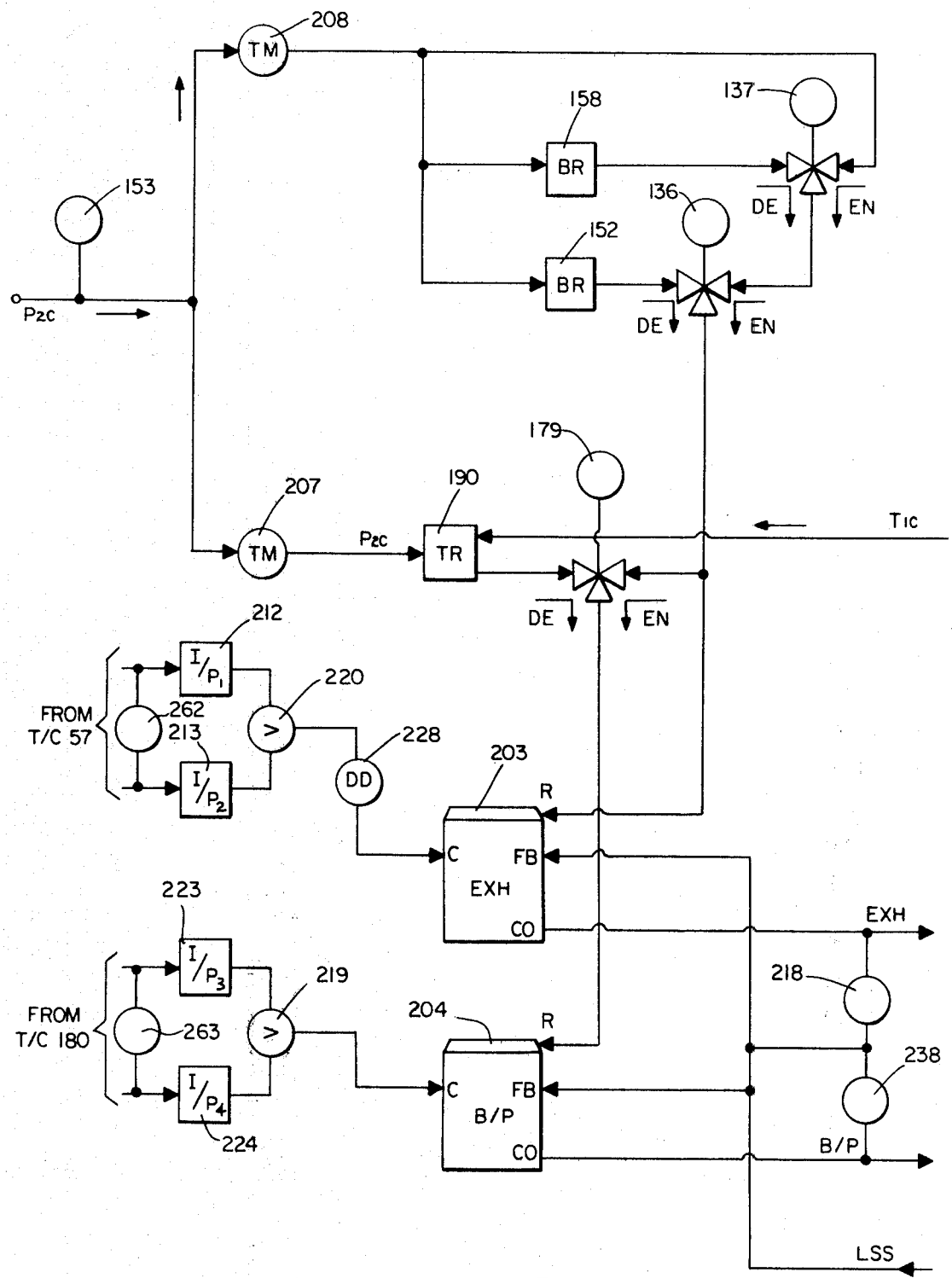
FIG. 6A shows a schematic diagram of the temperature control paths of the electro-pneumatic control system for the turbine of FIG. 2.

Referring now to FIG. 6A, there is illustrated a schematic diagram of the temperature control paths of the control system of this invention. As discussed with respect to the basic control block diagram of FIG. 5, the backup temperature control signals are generated as a function of compressor discharge pressure $P_{2C}$ and the corresponding measured control temperature. $P_{2C}$, obtained at the combustor as illustrated in FIG. 4, is connected to the pressure switch 153, and thence to transmitters 207 and 208, each of which provide pneumatic signals representative of $P_{2C}$. The signal from transmitter 208 is in the range of 3 to 15 PSI and is coupled to the inputs of bias relays 158 and 152 respectively, as well as a first input to solenoid valve 137. Bias relay 152 biases the signal from 208 with about 2 PSI which signal is then connected to a first input of solenoid operated valve 136. Bias relay 158 biases the signal from transmitter 208 with about 1 PSI, which signal is then connected to a second input to valve 137. The output of valve 137 is connected to a second input to valve 136, and the output of valve 136 is communicated to input R of exhaust controller 203. The exhaust temperature controller 203 is a proportional, integral and derivative action controller having direct controller action such that the output at CO varies directly with the input at C. The input signal to controller 203 is derived from 16 thermocouples, averaged in two groups of 8 thermocouples each, indicated at 57 in FIG. 4.

Thermocouples 57 monitor turbine exhaust temperature, which is representative of the turbine inlet temperature. Due to the high level of turbine inlet temperature, it is not possible to directly measure a representative turbine inlet temperature. As seen in FIG. 6B, each mode of power generation has a limiting temperature-$P_{2C}$ curve, and hence requires a certain fuel flow for a definite average temperature at the turbine inlet.

The two temperature channels are each fed by eight type J (iron-constandan) thermocouples which are paralleled using a swamping network, so that each channel provides an average temperature. The thermocouples have a range of 550° F.–1150° F. for each channel and are used with analog transmitters of the Bell & Howell 18111A type having an output of 4 to 20 ma with reverse action (i.e., 4 ma at 1150° F. and 20 ma at 550° F.) and current going to zero upon a channel's thermocouples failing open. Both channels are set to give a temperature alarm at 1050° F. The parallel thermocouple paths carry current signals representative of the two averaged temperatures, and between the paths there is connected a differential alarm circuit 262, designating a differential current detector and appropriate alarm circuitry. The alarm circuit 262 indicates thermocouple signal differences greater than a fixed percentage, e.g., 5%, providing a visual or audible signal to the operator when one path diverges from the other. In this manner, the thermocouple circuits are monitored without causing shutdown. In addition, the signals from the thermocouple channels may be directly monitored (by meters not shown) to provide a continuous indication of their condition.

The thermocouple inputs are connected to I/P transducers 212 and 213, which convert the analog input in the range of 4–20 ma to a pneumatic output in the range of 3–15 PSI. Thus, the output pressures of the transducers are proportional to the current input which in turn is inversely proportional to the sensed temperature. The outputs of transducers 212 and 213 are connected to high pressure selector 220, which selects the higher value to prevent shutdown when pressure failure occurs at the output of one of the transducers (the current goes to zero upon a channel's thermocouples failing open). The output of selector 220 (3.15 PSI) is connected to a direct derivative device 228, which produces a pneumatic output proportional to the derivative of the input, and which functions to speed up the exhaust temperature control system to compensate for the fact that the thermocouples react slowly to turbine temperature changes because of their downstream location with accompanied low gas velocities. The output of direct derivative device 228 is connected to the input variable connection of exhaust controller 203.

The blade path control path commences with two channels each fed by four paralleled thermocouples ranged similar to the exhaust temperature channel, and indicated at 180 in FIG. 4. The inputs from such channels, at 4 to 20 ma reverse action, representing a temperature differential between 1300° F. and 700° F. respectively, are connected to I/P transducers 223 and 224 respectively. Differential alarm circuit 263 acts in the same manner as does 262. The transducer outputs, at 3–15 PSI, are similarly connected to a high pressure selector 219, which transmits the high pressure to input C of controller 204. The output of transmitter 207 provides a pneumatic signal proportional to $P_{2C}$ in the range of 3–15 PSI. This signal is transmitted to totalizing relay 190, which also receives a pneumatic signal proportional to ambient temperature $T_{IC}$ (from 71), and produces an output proportional to the algebraic sum of such two inputs. The output of totalizing relay 190 is connected to a first input of solenoid valve 179, while the output of solenoid valve 136 is connected to a second input of valve 179. The output of valve 179 is connected to the reset input (designated R) of controller 204. Controller 204 provides direct proportional and integral action, the same as exhaust controller 203. Because of the thermocouple locations in the blade path, controller 204 gives a better response than the exhaust controller, and accordingly no derivative device is needed to operate on the input. The output of the low signal selector (LSS) from T231 is used as a feedback signal to both the exhaust and B/P controllers. This prevents the phenomenon known as "RESET WINDUP".

Comparing FIG. 6A with FIG. 5, the energization of valve 179 (due to the breaker closing, i.e., 52X) corresponds to gating the $P_{2C}$ signal through AND circuit 266. When the breaker is not closed, valve 179 is deenergized, corresponding to passing a signal through NOT circuit 267 and AND circuit 268. In either case, the B/P setpoint signal comes out of the output of valve 179, corresponding to OR circuit 269.

Connected between the LSS output (terminal T231) and the output of controller 203 is a pressure switch 218 which operates a control light 218L (FIG. 16) to indicate when the exhaust controller output is the low signal, and thus is controlling. Switch 218 operates when its two pressure inputs are equal, or within a fixed limit, and thereby signals when the LSS signal is in fact the exhaust loop signal. In a similar manner, pressure switch 238 provides for an indication at 238L (FIG. 16) when the blade path loop is producing the controlling signal.

In operation, when the base load mode is selected, valve 136 is de-energized, such that the signal from transmitter 208, biased with about 2 PSI at relay 152, is communicated to the setpoint input of exhaust controller 203, thus providing it with its highest setpoint. The highest setpoint for controller 203 yields the lowest output (around 14 PSI) upon stabilization of turbine temperature. For peak load operation, valve 136 is energized and valve 137 is de-energized, such that the output of valve 136 is biased lower, producing a lower setpoint for the exhaust temperature controller, which lower setpoint in turn makes possible a higher temperature in the combustors by permitting a higher throttle valve signal for higher fuel admission.

In system reserve load mode, both valves 136 and 137 are energized such that there is no biasing of the $P_{2C}$ signal transmitted from transmitter 208. In this instance, the setpoint for controller 203 is the lowest of the three modes of operation, such that the exhaust controller output (CO) is accordingly higher for given sensed exhaust temperatures. This permits a still higher controlled temperature in the combustors via a higher fuel flow. It is to be noted that for exhaust controller 203, higher sensed exhaust temperatures produce lower inputs at the input variable C, while the greater the load called for, the lower the setpoint input (since setpoint is inverse to load demand). Consequently a higher sensed exhaust temperature results in a lower control signal, while higher load demand, as set by selection of the load mode, results in a higher control signal.

The blade path temperature control is used as a backup for the exhaust control. For this reason, the biasing of the blade path controller 204 is set slightly higher than its normal setting while solenoid valve 179 is energized, during which time both the exhaust controller and blade path controller receive the same changing setpoint derived from the $P_{2C}$ signal. During starting, the blade path control acts as a backup to the speed-load controller, and valve 179 is de-energized such that the blade path setpoint is biased higher due to the action of totalizing relay 190, which biases the $P_{2C}$ signal in accordance with sensed ambient temperature. It is to be noted that quick temperature changes are detected and controlled by the blade path control while the exhaust control detects and controls the relatively slow, or steady state changes.

Figure 6C:
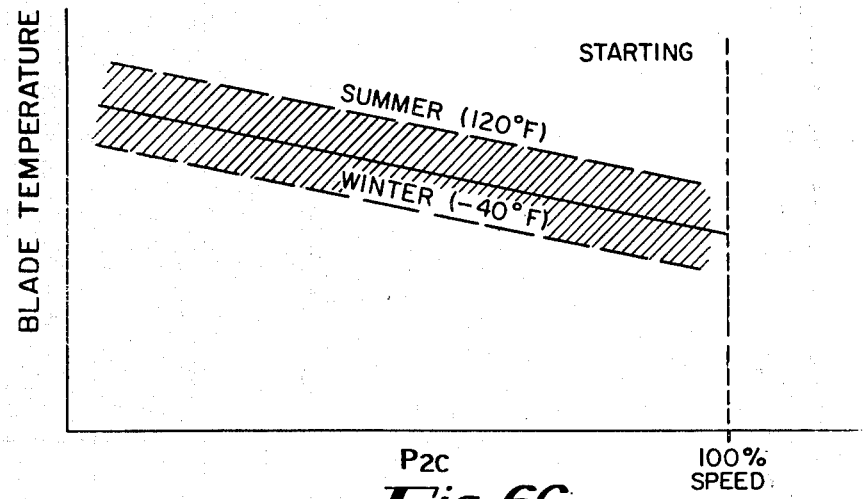
FIG. 6C shows a diagram of the manner in which the operating parameters of the turbine are modified as a function of ambient temperature.
Figure 6B:
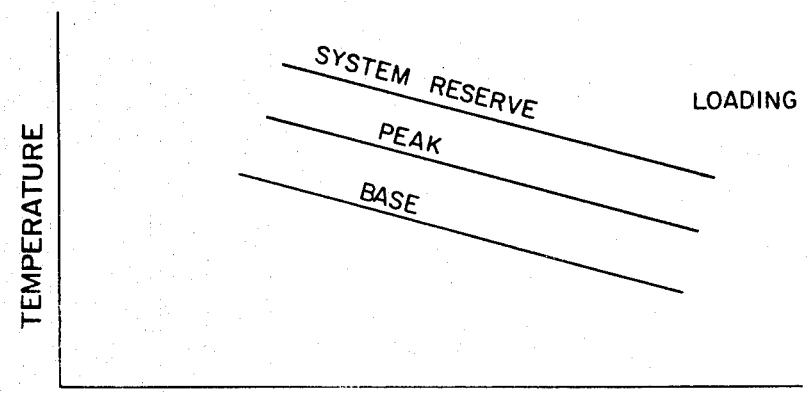
FIG. 6B shows temperature-$P_{2C}$ curves for different load modes for the turbine of FIG. 2.

The means of generating the blade path controller setpoint during starting provides the control system with the capacity to vary the temperature backup control as a function of ambient temperature. A "floating" temperature control line, as illustrated in FIG. 6C, is effectively achieved to provide changing blade path control between the ambient limits of −40° F. and +120° F. The shaded area between the −40° F. and 120° F. lines represents the range of ambient temperature throughout which adaptive control is provided. By combining both the $T_{IC}$ and $P_{2C}$ signals in the totalizing relay 190, the setpoint for B/P controller 204 is caused to vary as a function of the ambient temperature. For a given compressor discharge pressure $P_{2C}$, as the ambient temperature goes up (corresponding to normally less available starting torque) the setpoint goes up, and as the ambient temperature goes down (corresponding to normally higher available starting torque) the setpoint is lowered. Thus, the blade path channel adapts to limit starting temperatures to a lower than normal level at low ambient temperatures and to permit higher starting temperatures at higher ambient temperatures, thereby compensating for changes in available starting torque which result from changes in ambient temperature. As seen in FIG. 6C, during summer a higher than normal blade path temperature is automatically permitted, while during winter the turbine is constrained to a lower than normal blade path temperature. The uniqueness of the "summer-winter" control is that, for the first time, a turbine system is provided which not only provides temperature backup control during starting, but which provides an adaptive temperature control which compensates for performance changes which otherwise occur with changes in the ambient temperature. While this feature has been illustrated with a pneumatic embodiment, it is noted that equivalent analog and digital means are also embraced.

In an electrical analog embodiment, the speed changer signal previously described is provided by a conventional ramp generator. At the breaker closing, an additional DC signal (of a value according to the desired stepup in load) is gated with the ramp to provide the stepup in signal. The load changer signal, provided by another ramp generator, is adjusted to provide a ramp which starts from a level equal to the speed signal immediately after the DC signal has been gated to it. In a similar manner, the load pickup can be accomplished with a wholly digital embodiment, the speed control signal having a programmed step up at the moment that the breaker closing is communicated to the control computer. Thus, the technique is equally adaptable to both hardware and software embodiments.

Figure 7B:
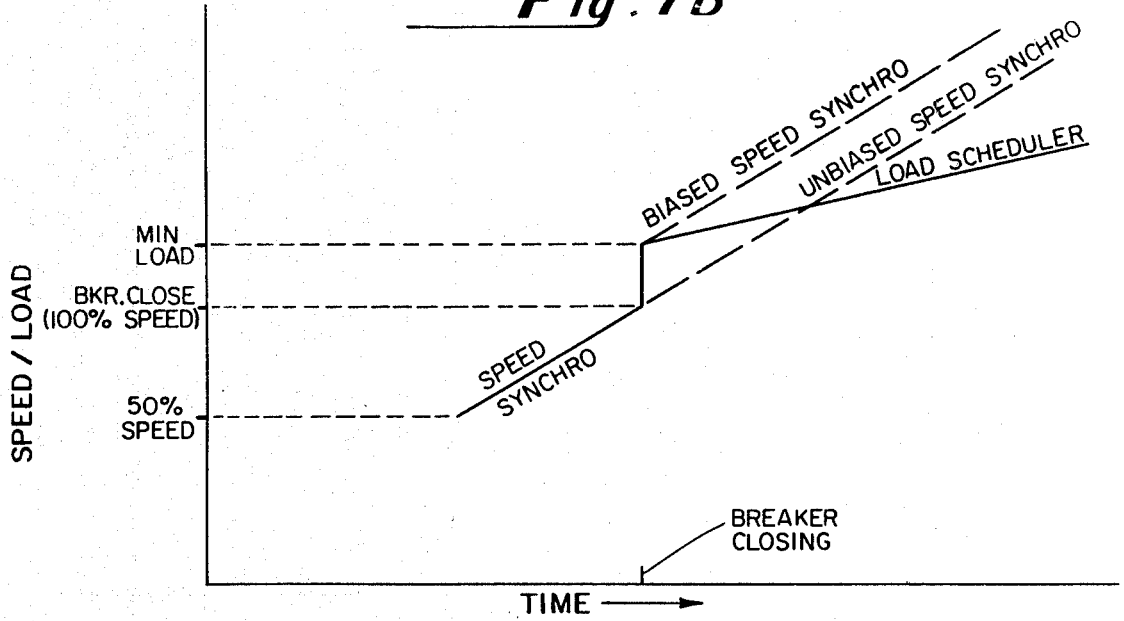
FIG. 7B illustrates the manner in which the control system of this invention enables a step load pickup at generator closing.
Figure 7A:
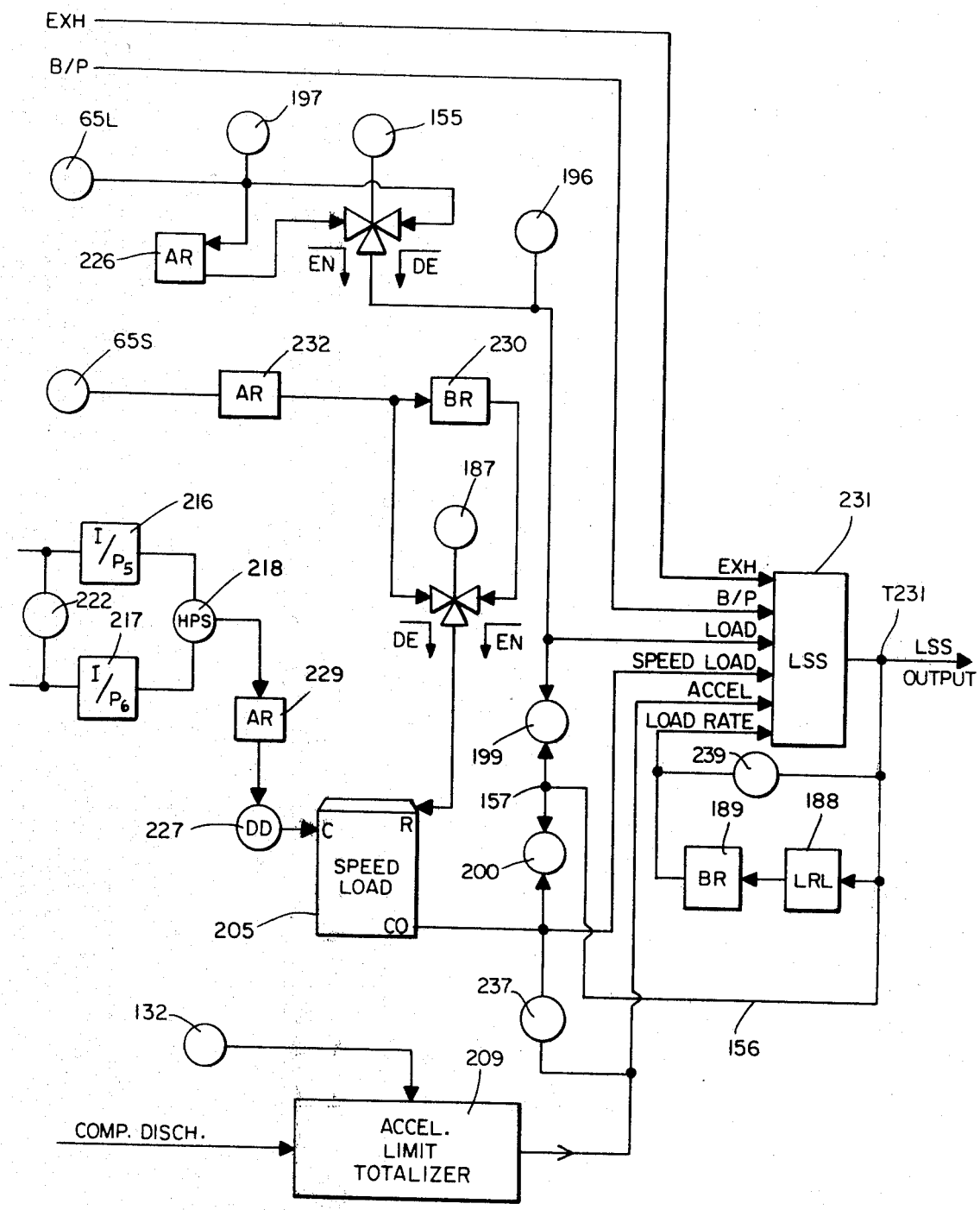
FIG. 7A shows a schematic diagram of the speed and load control paths of the electro-pneumatic control system for the turbine of FIG. 2.

Referring now to FIG. 7A, there is shown a block diagram with details of the speed and load control paths, and the manner in which the control signals derived therefrom are inputted along with the temperature control signals to the low signal (low pressure) select element 231. The primary elements utilized in generating the load and speed control signals are motorized regulators, designated load changer 65L and speed changer 65S respectively. The preferred load changer used in this electro-pneumatic embodiment is a synchro-regulator, as manufactured by Moore Products Co., having an AC motor drive and providing a 3-15 PSI output. The motor is timed to provide a ramp output from 7 PSI to 16 PSI in 12 minutes. Similarly, the speed changer 65S is suitably a Moore synchro-regulator providing a 3-15 PSI output, and having an AC motor drive, the motor having a timer set to provide a ramp output from 3 PSI to 15 PSI in 6 minutes. It is understood, of course, that these operating characteristics are exemplary only, and may be varied according to the application. The electric control of the load changer and speed changer are discussed in more detail hereinbelow in connection with the description of FIGS. 11 and 13. As is noted further hereinbelow, the functions of 65L and 65S may be performed by electronic function generators in an alternate embodiment.

Pressure switch 197, for providing load scheduler wind back, is connected to the output of load changer 65L. The output is also connected through a first path to amplifying relay 226, and through a second path to a first input of load scheduler solenoid valve 155. The output of amplifying relay 226 provides the other input to the valve 155. When valve 155 is de-energized, corresponding to normal rate of loading, the unamplified output of load changer 65L is connected through to one of the six inputs of low pressure select element 231. When fast loading is called for, valve 155 is energized, such that the amplified output from 226, corresponding to 2 minute loading, is connected through to 231.

The output of speed changer 65S is amplified through amplifying relay 232, the output of which is connected to a first input of solenoid valve 187. The output of 232 is also connected through bias relay 230, used for establishing a higher initial load setpoint, the output of which is connected to the other input of valve 187. The output of valve 187 is coupled to the speed load controller 205 as the reference, or setpoint signal.

The inputs to speed transducers 286 and 217 come from separate speed sensors 78, which provide an input in the range of 10-50 ma. Between the inputs there is connected a differential alarm circuit 222 which provides an output when the difference between the inputs exceeds a given amount, e.g., 5%. The outputs of transducers 216, 217 (3-27 PSI) are compared in high pressure select element 218, which selects the higher pressure and communicates it to amplifying relay 229, and thence to direct derivative element 227, the output of which is communicated to speed load controller 205 as the input variable (C). The use of high pressure select element 218 prevents the loss of speed signal and maximum fuel to the turbine when pressure failure occurs at the output of one of the transducers. The direct derivative device 227 improves the response of the speed control system. Controller 205 is a proportional action pneumatic controller, suitably Moore Products Co. model 55A, where the measured variable (C) and the output (CO) are inversely proportional. The output signal, CO, thus increases with the increasing setpoint provided from speed changer 65S, and is inversely proportional to the sensed speed. The output of controller 205 is directly connected to one of the inputs of the low pressure select element 231. A feedback path 156 from T231 provides the LSS output at point 157. Speed load control pressure switch 200 is connected between the output of speed load controller 205 and point 157, and activates a panel light 200L (FIG. 16) when the pressure differential thereacross is nominally zero, indicating that the LSS output is the speed output. Similarly, load control pressure switch 199 is connected between point 157 and the load control input to LSS element 231, and activates a load control panel light 199L (FIG. 16) when the pressure thereacross becomes nominally zero. Switches 237 and 239 provide similar indications for the load rate path and acceleration path respectively. By this arrangement, the operator has a clear indication of how the turbine is being controlled, and when control is passed from one path to another. The outputs of switches 199, 200, 218, 237, 238 and 239 may be connected to a recorder (not shown) to provide a record of how the turbine has been controlled. It is to be noted that where the signals to the LSS are electrical in form, the corresponding switches are electronic differential detectors.

Acceleration limit totalizer 209 is employed for surge control protection and as a maximum fuel limiter. The output pressure of totalizer 209 is limited by the surge line pressure and thus limits the opening of the throttle valve. The acceleration limit control is designed to control fuel flow before the speed control system comes into operation at 50% speed. After this portion of the starting operation, the acceleration limit control functions only as a backup control. The surge maximum fuel line is measured from the compressor discharge pressure which constitutes a first input to totalizer 209. The surge maximum fuel line is changed when closing the bleed valves such that the acceleration limiter is reset at such moment. This reset is provided by a second input derived from compressor bleed solenoid valve 132, which provides a signal when the bleed valves are closed. The totalizer thus provides an algebraic addition of signals representing compressor discharge pressure and the bleed valve position. This output is connected to and provides one of the six inputs, designated acceleration, to low pressure select element 231.

The sixth control path which provides an input to LPS 231 is the load rate limit loop. The LPS output from element 231 is connected to a pneumatic load rate limiter 188, which introduces a time delay of approximately 2 minutes, such that the output thereof represents the delayed LPS signal. This output is connected to a bias relay 189, which functions to inhibit the action of limiter 188 during starting and permit control only during loading. Limiter 188 begins controlling when its output exceeds the setting of relay 189 at about 25% load. Above this point the output of 189 equals the output of 188 and the time delay function becomes active.

Making reference to FIG. 7B, the method by which the control system of this invention picks up load at the time the circuit breaker is closed connecting the generator to the load, can be understood. During startup, the speed control channel controls turbine operation. Speed synchro 65S takes the turbine linearly from about 50% speed up to idle speed where synchronization is achieved and the generator breaker is closed. At breaker closing, load changer 65L in the load control channel is energized and produces an increasing ramp output which starts at a minimum load somewhere within the range of 10% to 25%. The load changer produces a linearly rising signal which increases at a slower rate than the speed control signal, such that it takes over control. It is seen that at the time of breaker closing, the speed control signal is automatically stepped up through energization of solenoid 187 which valves the speed control signal through bias relay 230 so as to add an increment to the setpoint signal corresponding to the initial step load requirement. The amount of this increment can be varied by fixing the bias introduced at relay 230. In this manner, at breaker closing, the speed control signal is stepped up to the starting level of the load control signal, which then assumes control due to its lower rate of increase. Loading may, of course, then be accomplished in a shorter time than that programmed by load changer 65L by valving the load changer output through amplifying relay 226. There is thus incorporated into the system the capability of immediately providing capacity to pick up dead load, such as occurs after power brownouts and blackouts. This capability is combined with continuous temperature backup control from starting through load pickup and continuously after steady state load is achieved.

Figure 23A:
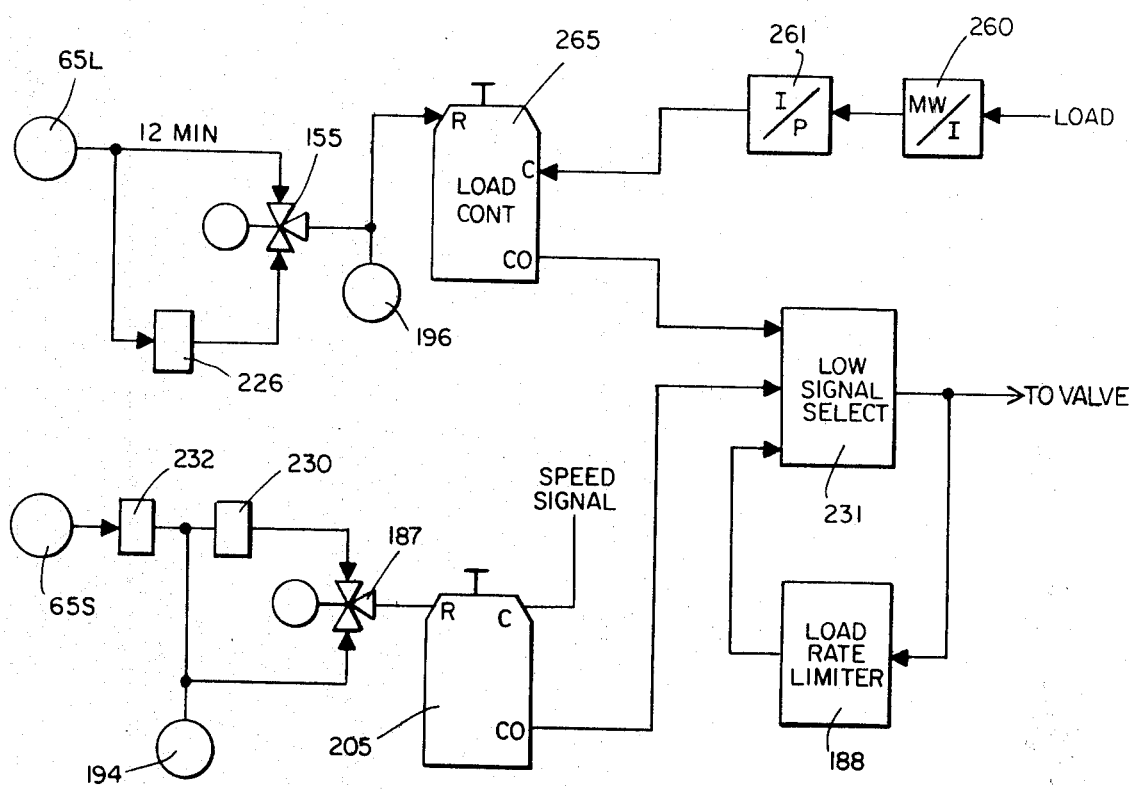
FIG. 23A shows a schematic diagram of an embodiment of the turbine control system of this invention having both closed loop "load" control and closed loop "speed" control.

Referring to FIG. 23A, there is shown a modification of the control system of FIG. 7A, wherein the load path is closed loop, providing closed loop load control. A detector 260 produces an electrical signal representative of load delivered by the turbine-driven generator, and the load signal is transduced at transducer 261 to provide an appropriate pressure signal. The pressure signal, representing load, is provided as the input signal to load controller 265, the load controller taking its setpoint signal from load synchro 65L. The output of the load controller, in this embodiment, constitutes the low signal which is connected to one of the inputs of the low signal select device 231.

The closed loop load (kilowatt) control functions to maintain a constant load regardless of frequency, compressor efficiency, or ambient temperature changes. This feature is useful on small systems and in locations where the day and evening temperatures vary considerably. Normally, as evening approaches the ambient temperature drops and the gas turbine power output increases, or vice versa. This may be undesirable where the load is fixed and, therefore, the operator will be required to manually compensate for these ambient temperature changes. However, this is not necessary in the closed loop load control system.

The open loop kilowatt control is simpler than closed loop control, due to providing a fixed fuel input. Load is controlled within a defined tolerance band and the variation is normally acceptable in larger systems. It is also acceptable for "spinning reserve" applications where the turbine is being controlled by the loading synchro (65L) at or slightly above minimum load in preparation for an eventual dispatcher call for base load.

It is seen that the turbine load control system, as described above, provides an expanded capability for load control, with the specific capabilities of varying load setpoint while on speed control or on load control, with three temperature limiting control curves as a function of compressor discharge pressure (i.e., base, peak, system reserve). Either open loop fixed fuel control or closed loop power control with megawatt reset capability is available, depending upon the system or user preference. Means is provided for either normal or fast loading rates. Loading can be accomplished by means of the speed path or load path, by either open loop load setpoint or closed loop load setpoint. In addition, the load can be scheduled as a function of ambient temperature. Thus, there are provided a plurality of alternative methods, available to the operator, for obtaining load control. These are particularly useful on different types of electrical systems and are employed for different reasons.

Manual load selection via the speed controller (as discussed hereinbelow) is also available, and is most effective on isolated systems where the frequency varies and sudden load increases are probable. Under these conditions, the speed control responds to pick up 25% load (normal) instantaneously, plus additional load, at the rate limited by the load rate limiter. The load rate limiter functions to protect the gas turbine from accepting excessive instantaneous load.

D. STARTING CONTROL SUBSYSTEMS

1. Temperature Reset Starting Control

Turbine operation is controlled during a portion of the startup as a function of both compressor discharge pressure and blade path temperature. The turbine is brought up from turning gear speed by a diesel starter to about 20% (Ignition) speed. At this point the admission of fuel is controlled by the combination of the pressure-temperature (PT) valve 109 and pump discharge control valve 97 (FIG. 4). From 20% speed to about 50% speed, the turbine operation is under control of a fuel (either oil or gas) starting signal derived as a function of $P_{2C}$ and the B/P signal derived from the blade path controller. There is disclosed, in the next portion of this specification, a method of controlling the PT valve to implement a fuel schedule which controls ignition fuel nozzle pressure in a manner so as to improve turbine vane life.

Figure 8A:
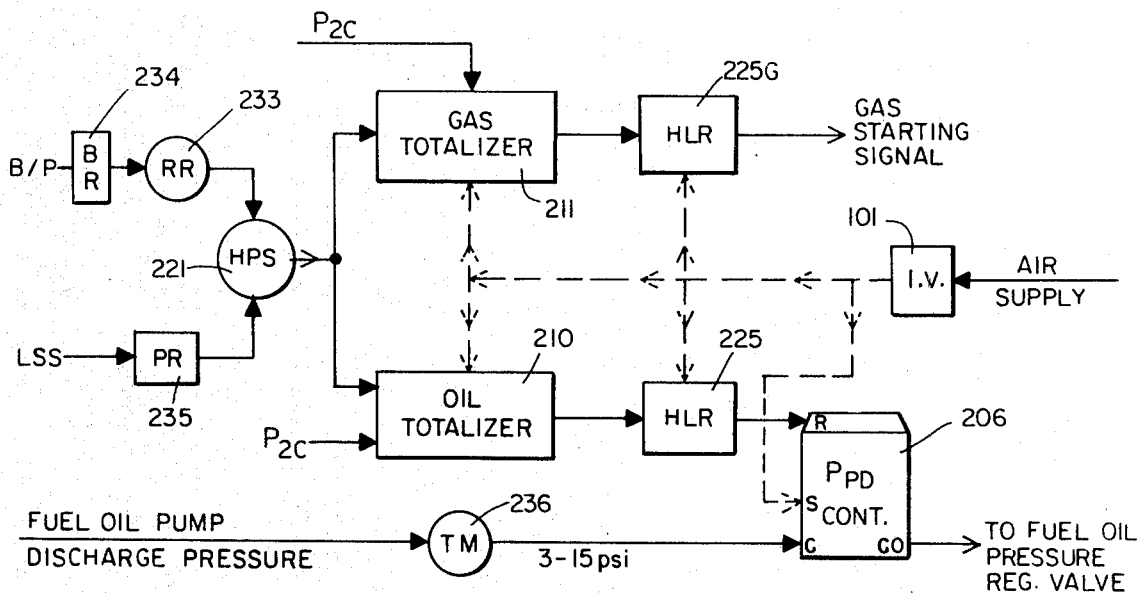
FIG. 8A shows a block diagram of the fuel starter control system employed to generate starting signals for the turbine of FIG. 2.

Referring to FIG. 8A, the output of the blade path controller (which is inversely proportional to the detected blade path temperature) is connected through a bias relay 234 and reduced by a reducing relay 233 (reduces the blade path signal to a range of about 0–4 PSI), the output of the reducing relay being one of the inputs to a high pressure selector 221. The output of the low pressure selector is connected to pilot relay 235. This relay connects supply pressure (not shown) to its output when the LSS input (which is also the fuel throttle valve signal) reaches the preset value of about 5 PSI. This value corresponds to just above the point of lifting of the throttle valve from minimum position. The output of relay 235 is connected as a second input to the HPS 221. Thus, until the throttle valve signal rises to about 5 PSI (at about 75% speed) the only input to the HPS is the blade path input. At speeds above about 75% speed, the blade path signal (reduced at 233) becomes ineffective because it is overridden by the LSS signal through the high pressure selector.

The output of high pressure selector 221 (being the B/P signal for about 20% speed to about 75% speed) is connected to one chamber of fuel pressure control totalizer 210. Totalizer 210 is supplied with air when isolation valve 101 is open. Another chamber of 210 receives the compressor discharge pressure, $P_{2C}$. The totalizer 210 provides an output directly proportional to the algebraic sum of the two inputs. Thus, as $P_{2C}$ rises, the totalizer output rises. Also, it is noted that up to about 75% speed, if blade path temperature rises, the B/P signal drops, thereby dropping the totalizer output and providing adjustment of the controller reset signal. Above 55% speed, this control function is passed to the LPS signal. The output of totalizer 210 is supplied to a high limit relay 225 which limits the reset signal at 10 PSI. This high limit relay functions to limit the maximum oil fuel pressure of the main fuel pump outlet at 950 PSI. The HLR output is connected to the controller 206 as the reset signal.

The fuel oil pump discharge pressure is converted to a pneumatic pressure by transmitter 236, providing a variable output signal of about 3–15 PSI. This signal is connected to the measured variable input (c) of controller 206. Controller 206 is a PI controller (proportional and integral action) and is reverse acting to produce an output signal proportional to the difference between the variable setpoint signal from 225 (introduced at R) and the discharge pressure signal from 236.

The output of HPS 221 is also connected to a gas totalizer 211, which has as a second input the $P_{2C}$ signal. Totalizer 211 functions in the same manner as fuel oil pressure totalizer 210, and produces an output which is limited at 225G. As with the path for developing the oil signal, it is seen that the signal is limited by blade path temperature up to about 75% speed, and thereafter is limited by the LPS signal.

The two totalizers 210, 211, the two high limit relays 224, 225 and the controller 206 are all supplied with air through isolation valve 101 which opens when the machine begins the starting process.

Figure 8B:
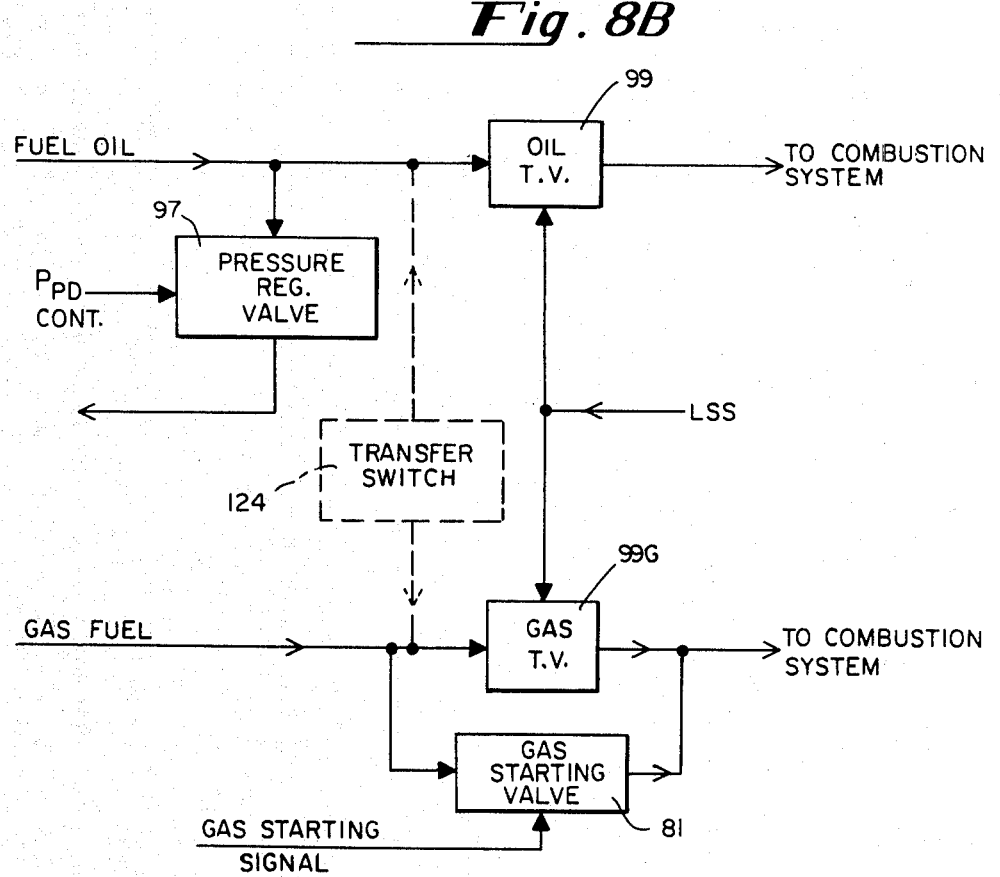
FIG. 8B shows a block diagram of the manner in which the starting signals are used to control fuel flow to the turbine of FIG. 2.

Referring now to FIG. 8B, there is illustrated the manner in which the starting signals and the throttle valve signal (from LPS 231) coordinate the controlled starting of the turbine. Fuel oil, from a supply not shown, is connected through the oil throttle valve 99 to the combustion system. Similarly, gas fuel may be connected through gas throttle valve 99G to the combustion system. When fuel oil is being used, the control signal from controller 206 is connected to the pump discharge valve 97, which regulates the pump discharge pressure and which is open at startup. Valve 97 closes partially in conjunction with the PT limiter valve 109 (FIG. 4) to maintain 200 PSI fuel oil pump discharge pressure. After reaching 20% speed, as the $P_{PD}$ controller signal increases due to increasing $P_{2C}$, regulating valve 97 is closed as a function of such increasing $P_{2C}$, such that fuel oil pump discharge pressure rises to about 950 PSI at about 50% speed. At 50% speed, the LPS signal rises from a minimum of 3 PSI, at which point throttle valve 98 begins to open, and thereafter the system is controlled through the action of the LPS signal on the throttle valve.

If gas fuel is used, the gas starter signal opens gas starter valve 81, to provide increase of gas fuel to the combustion system between the speeds of about 20% to 55%. The LPS signal also begins to open the gas throttle valve 85 at about 50% speed, after which the system is under control of the LPS signal. As shown by the dashed lines, a transfer switch 124 may be employed to transfer operation between fuel oil and gas fuel, or to proportion amounts of respective fuels fed to the combustion system.

There is thus disclosed a system for temperature reset of the pump discharge pressure during starting, which additional temperature control offers a unique backup capability which improves starting reliability. In the event of a control component failure in the main control loops, or improper throttle valve setting or drift for any other reason, there exists an additional temperature backup control derived from blade path temperature, which maintains control on pump discharge pressure. Because of this unique reset capability, the number of transient temperature excursions above the absolute turbine trip level are minimized and thermal shock is avoided. After the turbine has attained a speed of approximately 75%, this temperature control loop is effectively deactivated due to the action of relay 235, and temperature control is passed to the low pressure select signal.

2. Ignition Pressure Control Subsystem

As has been set forth hereinabove, the turbine system of this invention is provided with a bypass pump pressure regulator valve 97 and a bypass limiter valve 109, which valves function together to provide stable fuel pressure operation during ignition and other turbine operating periods.

With respect to plant startup operations, a plant which has fast startup capability and high reliability is characterized as having high availability, which is a factor especially important to peaking applications of gas turbine electric power plants. Reliability in large measure results from the plant design and the quality of plant manufacture, and is enhanced by the basic design of the control. As seen above, the control design of this invention includes multiple provisions for controlling or limiting particular plant variables. Thus, plant availability is enhanced through reliability by multiplicity.

Normally, faster gas turbine plant startups cause greater temperature or thermal stress cycling damage to the turbine blades and other metal parts. Therefore, some balance must be achieved between startup speed and turbine life, i.e., the long term cost of turbine damage caused by thermal stress cycling. To improve the plant life expectation or to improve startup availability of gas turbine electric power plants by faster startup without added metal damage, it is desirable to identify avoidable causes of stress damage and determine improvement means by which such damage can be avoided compatibly with all other plant operating considerations. Added benefit is realized if the improvement means also provided reliability by multiplicity.

One cause of thermal stress damage occurs in the supply of fuel, and especially liquid fuel, to the turbine nozzles. In the turbine plant of this invention, liquid fuel is supplied to the turbine from a fuel source by a turbine driven pump. The pump develops fuel pressure as a function of the turbine speed, and the nozzle fuel pressure is typically kept within tolerances by positive regulation of the pump discharge pressure. Fuel pressure regulation is achieved by regulating the flow of bypass fuel from the fuel supply line back to the fuel source. Fuel pressure fluctuations due to transient conditions not correctable by the pressure regulator can cause excessive thermal stress cycling of the turbine metal parts during ignition and at other operating time periods, including idle operation and light load operation.

The PT limiter valve 109, which is in parallel with the bypass valve 97, is utilized to optimize the responsiveness of the bypass subsystem during ignition and other operating time periods, to prevent rapid transient fuel pressure oscillations and thermal cracking of turbine vane sections attributable to differential expansion of components. A suitable PT limiter valve is disclosed in detail in co-pending U.S. application Ser. No. 261,192, filed June 9, 1972, and assigned to this assignee. The subsystem disclosed herein provides an improved method and apparatus for aiding combustor light-off by optimally scheduling the combustor nozzle pressure.

Figure 8C:
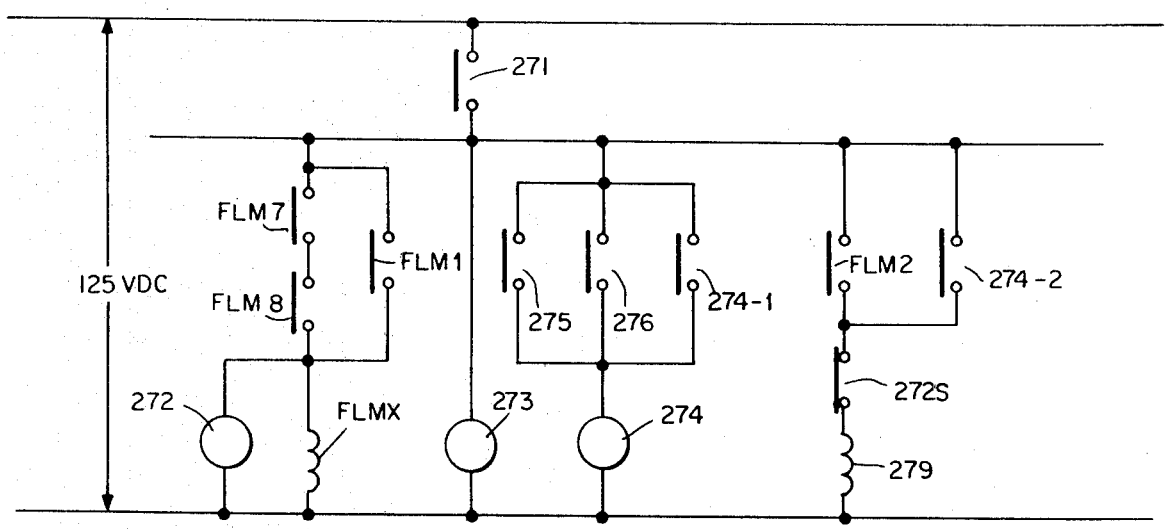
FIG. 8C shows a circuit diagram of an electronic embodiment of the sequence control portion of the novel ignition pressure control subsystem of this invention.
Figure 8D:
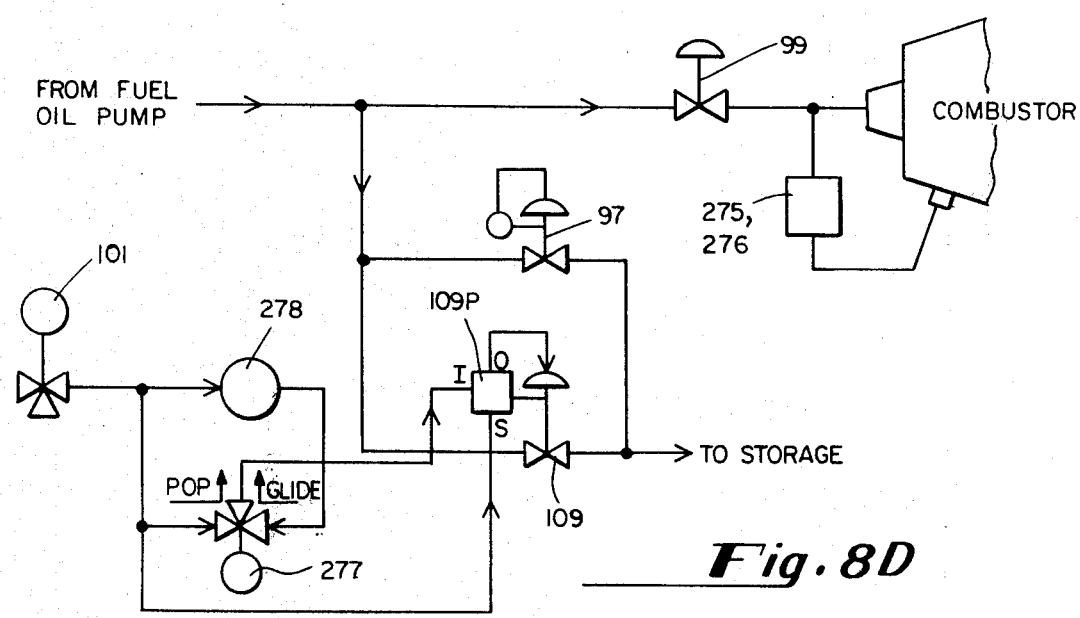
FIG. 8D shows a schematic diagram of the pneumatic embodiment of the ignition pressure control subsystem of this invention.
Figure 8E:
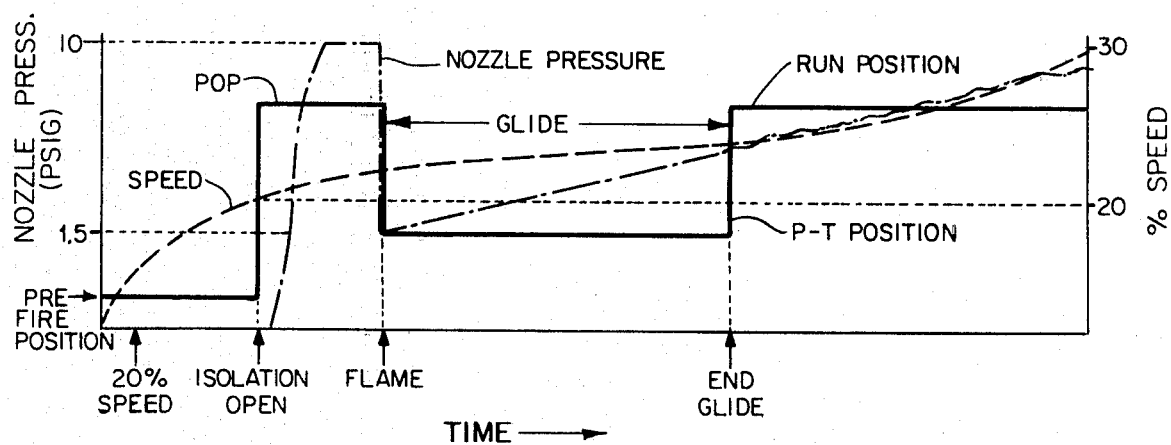
FIG. 8E shows curves depicting the operation of the ignition pressure control subsystem of this invention.

Referring to FIGS. 8C, 8D and 8E, there are shown means for controlling the PT limiter valve, and the consequent method of controlling nozzle pressure, to provide an optimum sequence of nozzle pressure during ignition and startup. Before the isolation valve is opened and ignition is commenced, the nozzle pressure is at 0 (throttle valve has not been raised) and the PT limiter valve is at a low prefire position. When ignition is commenced, light-off of the combustors is aided by raising the nozzle pressure to a high value, e.g., 10 PSI. This nozzle pressure is referred to as the "pop" pressure, and is maintained until flame is sensed. The time during which nozzle pressure is raised to and maintained at the pop pressure is referred to as the pop period.

Upon detection of flame, the PT valve is dropped to a lower position, producing a drop in nozzle pressure during a timed period which is referred to as the "glide" period. During the glide period, the nozzle pressure ramps upward, due to the action of the reset subsystem, as described immediately hereinabove. At the end of the time glide period, the PT valve returns to its full position (run position), enabling buildup of nozzle pressure under speed control. The glide period provides the turbine with a period of reduced fuel input immediately after detection of flame, so that the thermal impact upon the turbine is lessened, thus reducing thermal strain.

The pop and glide fuel schedule is accomplished by a unique method of controlling the PT limiter valve. When fuel is on, corresponding to opening of the isolation valve, switch 271 provides power through to the sequence circuitry, as shown in FIG. 8C. This immediately commences operation of ignition timer 273, which times the length of ignition. At the same time, isolation valve 101 provides air pressure through deenergized pop and glide valve 277, thereby providing an input to positioner 109P which causes setting of the PT valve 109 to its full, or pop position. When the nozzle pressure reaches its predetermined (pop) maximum, nozzle pressure switches 275, 276 cause closing of their respective contacts, thus initiating pop timer 274, which times out through self-operated contacts 274-1. Nozzle pressure is limited at the pop level by positioner 109P. When light-off occurs as sensed by the flame detectors, the popping pressure is reduced to the glide requirement. Therefore, the pre-set time period determined by the pop timer is the maximum time that the popping pressure can exist, since the pressure is automatically reduced when and if flame is established. It is to be noted that, since the pop timer is initiated by the pressure switches 275, 276, the time period during which pop pressure is maintained is limited, thus limiting the initial thermal surge.

When flame is detected, contacts FLM7 and FLM8 close, initiating glide timer 272, which times out a glide period in the range of 70 to 140 seconds. Relay FLMX is energized and maintained closed through contacts FLM1. Contacts FLM2 are also closed, thus energizing solenoid 279, which energizes pop and glide valve 277. This provides a decreased pressure transmitted through pop and glide regulator 278 to positioner 109P, resulting in changing to the lower PT valve position. As described before, this provides a corresponding drop in nozzle pressure. At the end of the timed glide period, contacts 272S are opened, thus de-energizing solenoid 279, and the PT valve returns to its full, or run position. Note that the pop and glide solenoid must be energized to glide, and consequently permits full load operation in the event of solenoid failure. Failure of the solenoid during starting results in either over temperature control or over temperature shutdown on blade path position. If failure results in continued pop pressure over the established pop time period (maximum of 15 seconds), a second time check set at 2 additional seconds actuates an alarm to indicate that the pop and glide is non-operative. Failure to light off with the pop system within the allowed ignition period results in dumping of the overspeed pressure purging in a second repeated pop and glide attempt.

While the preferred embodiment of the "pop and glide" apparatus is electro-pneumatic, it is understood that other forms are readily adapted to the turbine power plant. For example, where a digital computer is utilized, ignition start, pressure switch and flame detect signals are imputted to the computer, and PT value position signals are outputted, with the sequencing and logic functions being provided by the computer.

Figure 9:
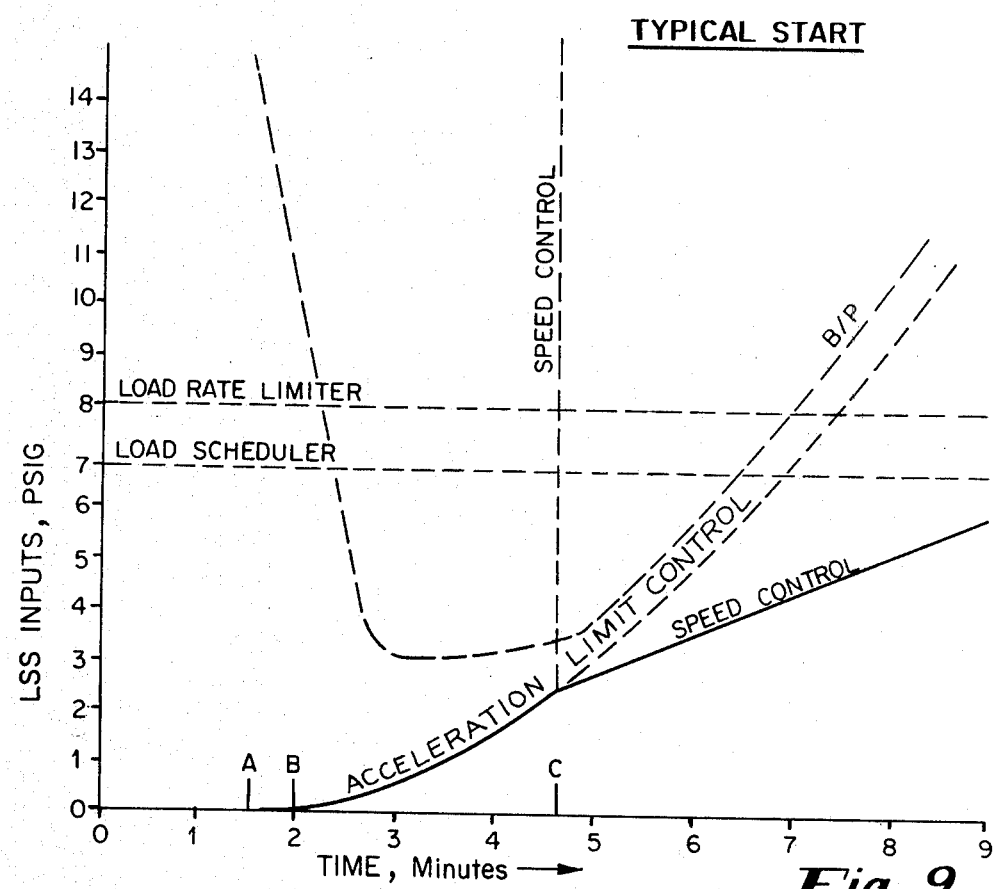
FIG. 9 shows typical start curves for the turbine.
Figure 10:
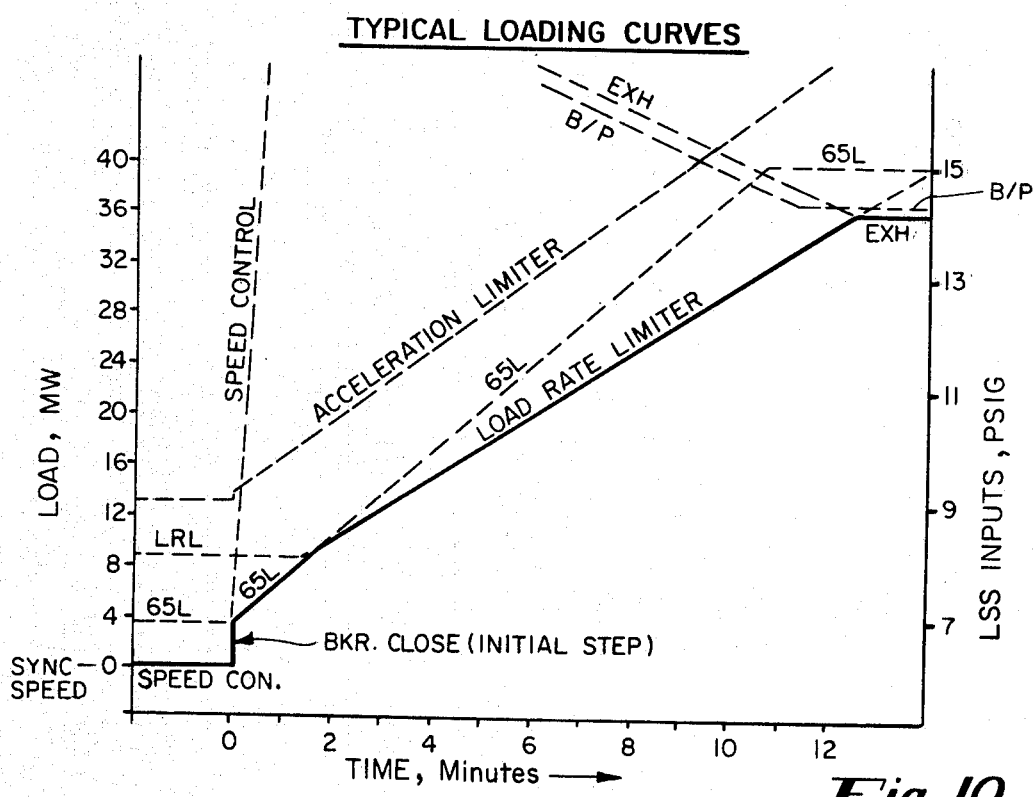
FIG. 10 shows typical loading curves for the turbine

Referring now to FIGS. 9 and 10, there are shown curves representing a typical start and a typical loading, respectively. These curves illustrate the operation of the control system as has been described to this point. Referring first to FIG. 9, there are plotted curves of LPS inputs against time, for a typical start. Those inputs which are lowest, and therefore controlling, are shown as solid curves, while the non-controlling inputs are represented by dashed line curves. From the time of startup until the time designated as A, the turbine is brought up to speed under the action of the diesel starter. At time A, and extending to time B, the turbine is under control of the PT valve. At time B, control is switched to the fuel pump discharge pressure control, as illustrated in FIGS. 8A and 8B. At time C, the turbine is placed under speed control, and thereafter is under throttle valve control, the throttle valve being controlled by the LPS output signal.

In FIG. 9, the solid line represents the minimum input to the LPS, and thus the LPS output. The dashed lines represent other LPS inputs. The load scheduler and load rate limiter signals are shown as constants throughout the typical start procedure. The acceleration signal is seen to be the low input, and thus the LPS output, up to the point where control is passed to speed control, corresponding to about 50% speed. However, during this time the acceleration signal does not control the turbine since its value is less than 3 PSI. It is to be remembered that the throttle valve does not commence lifting until the LPS signal exceeds 3 PSI. From 50% speed on, the speed control signal, generated from unit 65S, is the controlling signal. It is noted that at relatively low speeds, the blade path input signal is quite high, but is reduced in magnitude to a minimum value roughly corresponding to the point where the speed changer starts to produce the ramp output for speed control. For higher speeds, the blade path signal again increases. This reflects the fact that at lower and higher speeds, the blade path temperature is generally lower, and that the blade path temperature generally maximizes at or near 50% speed. Of course, it is to be understood that if, for any reason, the blade path temperature were to become sufficiently great such that the blade path curve were to dip below the speed control curve, then the B/P signal would take over control of turbine operation, thus limiting speeds.

Referring now to FIG. 10, there are shown typical loading curves representing LPS inputs as a function of time, during a normal loading procedure. Also indicated is the load, in MW, corresponding to the limiting load control signal. The heavy continuous line represents the lowest of the inputs to the LPS unit, and consequently the LPS output which controls the throttle valve. Time is designated as starting at the point when the breaker is closed, the turbine being at synchronous speed and being presumed to be maintained at synchronous speed throughout loading. At time of breaker close, there is an immediate stepup in power (to approximately 3.5 MW), as accomplished by the load pickup means discussed elsewhere in this specification. At that time, the load signal generated by unit 65L starts to ramp upward, and for a period of time is the controlling signal. The load rate limiter output takes control after breaker close, and controls the loading operation until the exhaust temperature control signal drops to a lower level, at which time the turbine is in temperature control.

As explained elsewhere in the specification, immediately after the stepup of the speed control signal, to provide the initial stepup in load, the speed changer 65S ramps upward at a high rate, and, except for manual operation described hereinafter, is not a control signal during loading. The load output from unit 65L ramps at a constant rate to 15 PSI. The load rate limiter signal is time delayed with respect to the 65L output, and rises at a slower rate of increase, such that it takes over control from the load signal shortly after breaker close (approximately two minutes after breaker close). The acceleration limiter output does not participate in control of loading. It is shown as rising, due to the fact that its output goes up as $P_{2C}$ goes up. The exhaust temperature and blade path temperature control curves are seen to drop down at a substantially constant rate with increased loading of the turbine, reflecting the fact that as the temperature goes up from turbine loading, the temperature control signals go down. The blade path control signal, during most of the starting period, is the lower signal, due to its quicker temperature response. During loading both the exhaust temperature controller and blade path temperature controller receive the same reset signal, since solenoid valve 179 is energized. However, during steady state operation the blade path temperature control is used as a backup for exhaust control, and therefore the biasing of blade path controller 204 is put slightly higher while valve 179 is energized, such that the blade path controller output is slightly higher. This is seen from the curves, it being noted that each controller reaches its setpoint corresponding to an output of approximately 14 PSI, with the exhaust controller output being slightly lower, and accordingly being the controlling output.

E. SPEED AND LOAD CONTROL CIRCUITS

Figure 11:
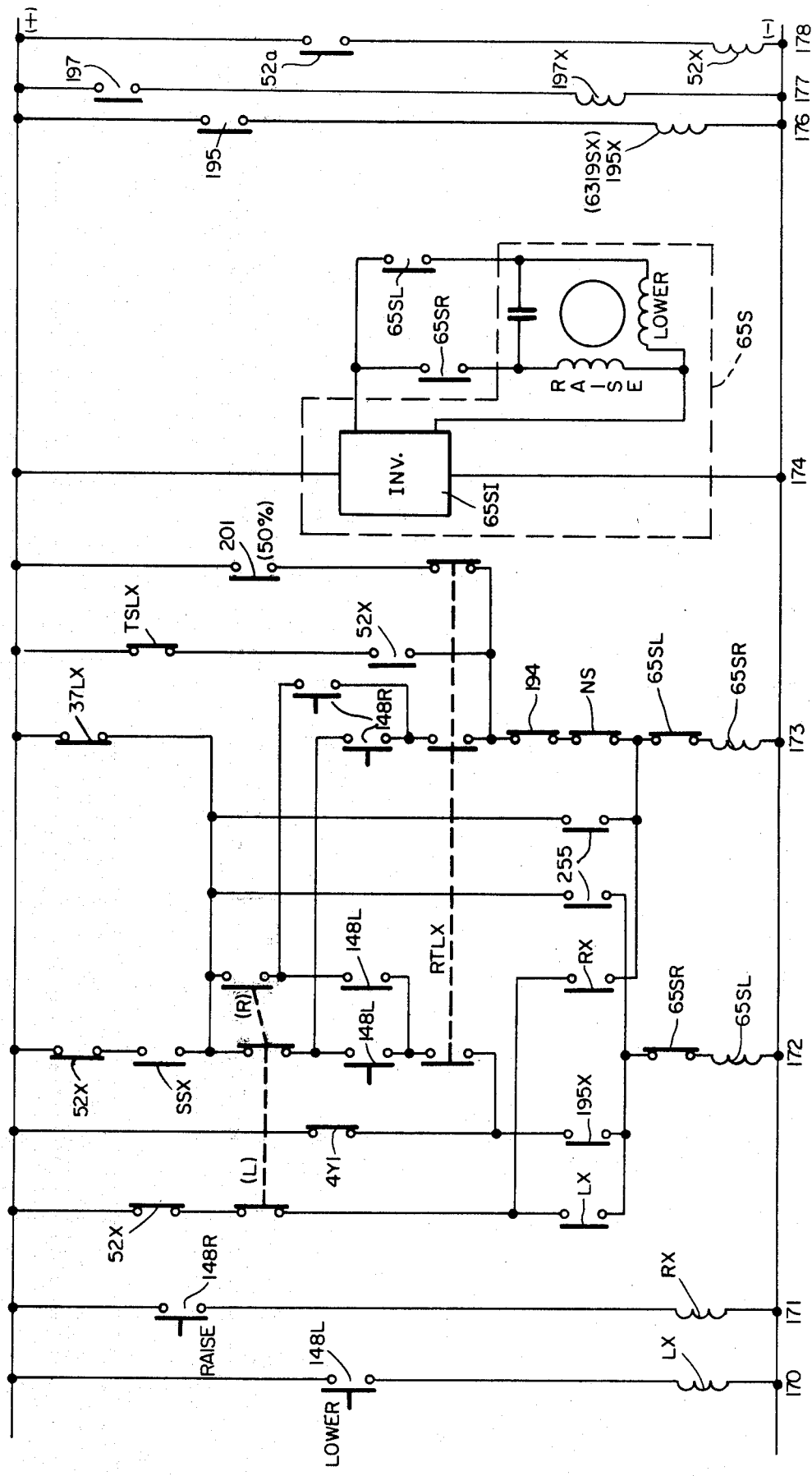
FIG. 11 shows a schematic diagram of a portion of the speed control circuitry of the control system for the turbine.

Referring now to FIG. 11, there is shown a schematic diagram of a portion of the speed mode control circuits used in the control system. The circuit diagram of FIG. 11, like that of the other circuit diagram figures, has bus bars marked (+) and (−) respectively. Unless otherwise indicated, the voltage across such bars is 130 volts DC. It is, of course, understood that other voltage values may be utilized according to particular designs. Respective parallel paths between the two bus bars are numbered, and reference will be made throughout the following discussion to different circuits by their respective circuit numbers.

A "lower" push button 148L and "raise" push button 148R are connected in series with relay coils LX and RX respectively, at circuits 170 and 171. Energization of LX permits lowering of speed or, in certain modes, load, and energization of relay RX permits raising of speed or load. The choice of controlling either speed or load is made at other points in the control circuitry. The circuits for lowering the output of speed changer 65S are shown at circuit 172, while the circuits for raising the output of speed changer 65S are shown at circuit 173. When the generator breaker is open, relay 52X (circuit 178) is unenergized and contacts 52X remain closed. If control is local (see FIG. 24, circuits 242, 243) relay LX is energized, and contacts 52X are closed, speed changer lower relay 65SL may be energized by operator push button through the action of the closed LX contacts, upon the condition that relay 65SR is not energized. When master switch 4Y1 contacts are closed (circuit 244) and the speed changer wind back relay 195X (6319SX) is energized (circuit 176), relay 65SL is energized and the speed changer output is lowered. Likewise, for manual control, the synchro switch SSX in the synchro circuitry is closed, and the breaker is open so that contacts 52X are closed. When switch 148L is closed and the ready to load contacts RTLX are closed (this occurs when certain permissive conditions are met), 65SL is energized through the closed wind back contacts 195X. Finally, 65SL is also energized when synchro switch SSX is closed and the auto synchronizing relay (not shown) is energized, closing contacts 255.

Speed changer 65S is raised by energization of relay 65SR, under similar conditions. Energization of relay RX causes energization of relay 65SR through closed contacts RX when in local operation and before the generator breaker is closed. Closing of synchro switch SSX and field breaker contacts 255 also causes energization. When raise button 148R is closed, 65SR is energized (circuit 173) through the synchronizing circuit as long as the normal stop contacts NS1 are not opened, the speed changer has not reached its maximum output (194 remained closed), and the ready to load contacts RTLX are closed. 65SR can also be energized through normally closed contacts TSLX (closed as long as the turbine is not in the base, peak or system reserve load mode) upon closing of the generator breaker contacts 52X, or when the 50% speed switch contacts 201 are closed and the turbine is not ready to load (RTLX contacts closed). Closing of contacts 201 at 50% speed provides normal automatic energization of speed changer 65S, to produce an upward ramp, during the normal starting procedure, and before ready to load.

Referring to circuit 174, there is a schematic diagram of the components of speed changer 65S. It is seen that an inverter 65SI provides AC power, which is connected across the RAISE coil when contacts 65SR are closed, and across the LOWER coil when contacts 65SL are closed, corresponding to energization of relays 65SL and 65SR respectively.

Figure 12:
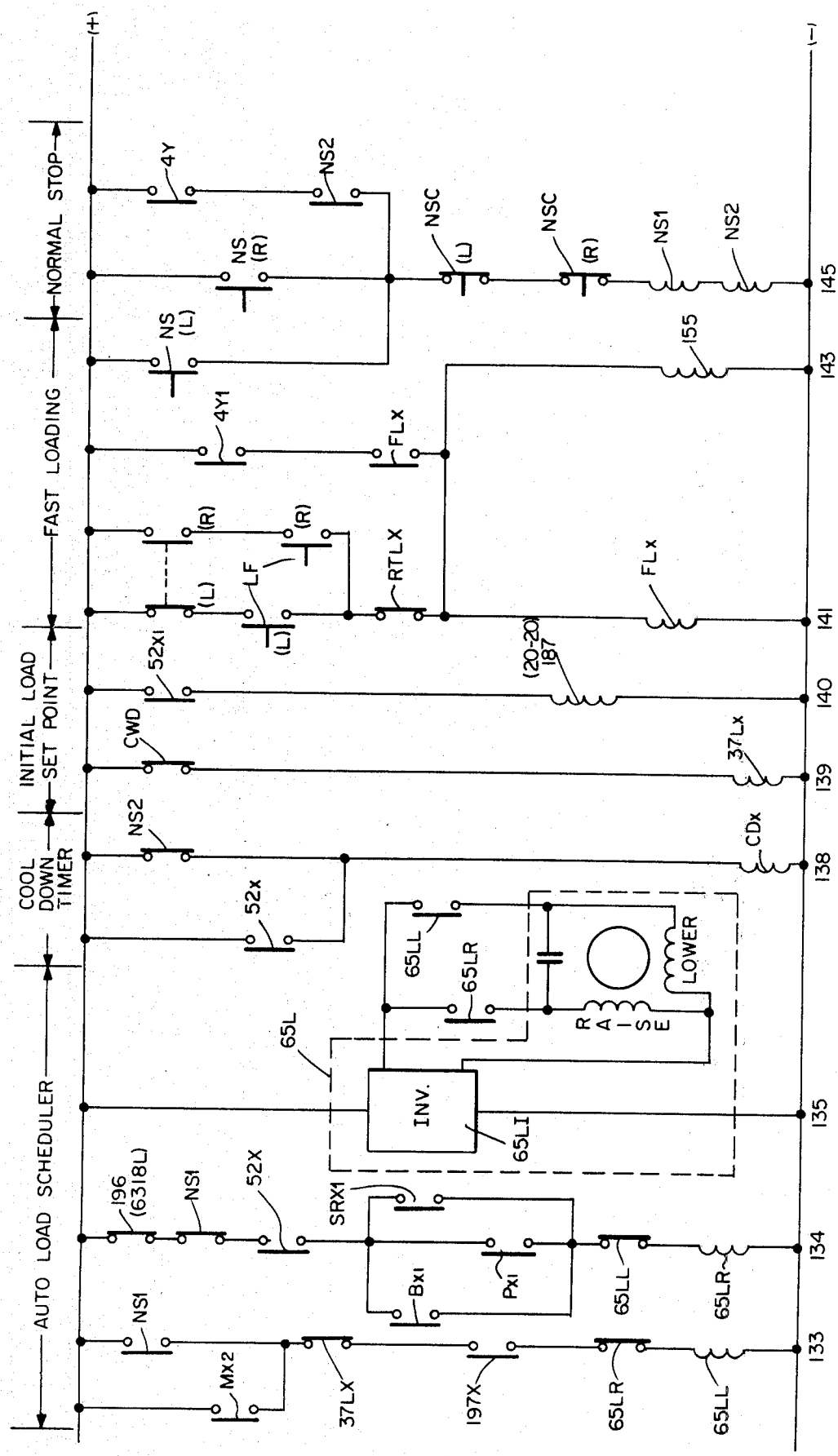
FIG. 12 shows a schematic diagram of a portion of the load control circuitry of the control system for the turbine.

Referring now to FIG. 12, there are illustrated circuit diagrams of the load control circuits. The auto load scheduler 65L is shown at circuit 135 and, like the speed scheduler 65S, has an inverter 65LI and RAISE and LOWER operating coils, energized through contacts 65LR and 65LL respectively. At circuit 133, it is seen that relay 65LL is energized, thereby closing contacts 65LL and causing the output of the auto load scheduler to be lowered, when the load scheduler wind back pressure switch 197 (circuit 177) causes closing of contacts 197X (6319LX), the 37LX contacts are closed (they open above 10% load, see circuit 139), and either minimum load has been called for (thus closing contacts MX2) or a normal stop has been called for, thus closing contacts NS1 (circuit 145). Referring to circuit 134, it is seen that 65LR is energized under the conditions where the generator breaker has been closed, thus closing contacts 52X, normal stop is not called for, the load scheduler has not reached its maximum position (such that contacts 196 (6318L) remain closed), and the turbine is in either base, peak, or system reserve operation. At circuit 140, solenoid 187 (20-20) is energized at breaker closing to give the initial load setpoint, as discussed with respect to FIG. 7B.

The fast loading controls are illustrated at circuits 141 and 143. A fast loading push button LF is provided at both a local (L) and remote (R) location, and when depressed causes energization of coil FLX, upon the condition that contacts RTLX are closed. Upon energization of coil FLX, contacts FLX are closed, thus holding coil FLX energized after button LF released, under the condition that master switch 4Y1 is energized (thus closing contacts 4Y1). As long as coil FLX is energized, load scheduler solenoid valve 155 (20-19) is energized (see FIG. 7A), thus causing an increase in the rate of increase of the output of load changer 65L.

Circuit 145 shows the normal stop control circuitry. A push button NS is provided at both local and remote locations, and when depressed causes energization of coils NS1 and NS2. These coils are self-locking through contacts NS2 as long as master relay 4Y is energized, closing contacts 4Y. Coils NS1 and NS2 can be de-energized, thus holding the normal stop control, by pressing the NSC cancel button at either the local or remote location.

Figure 13:
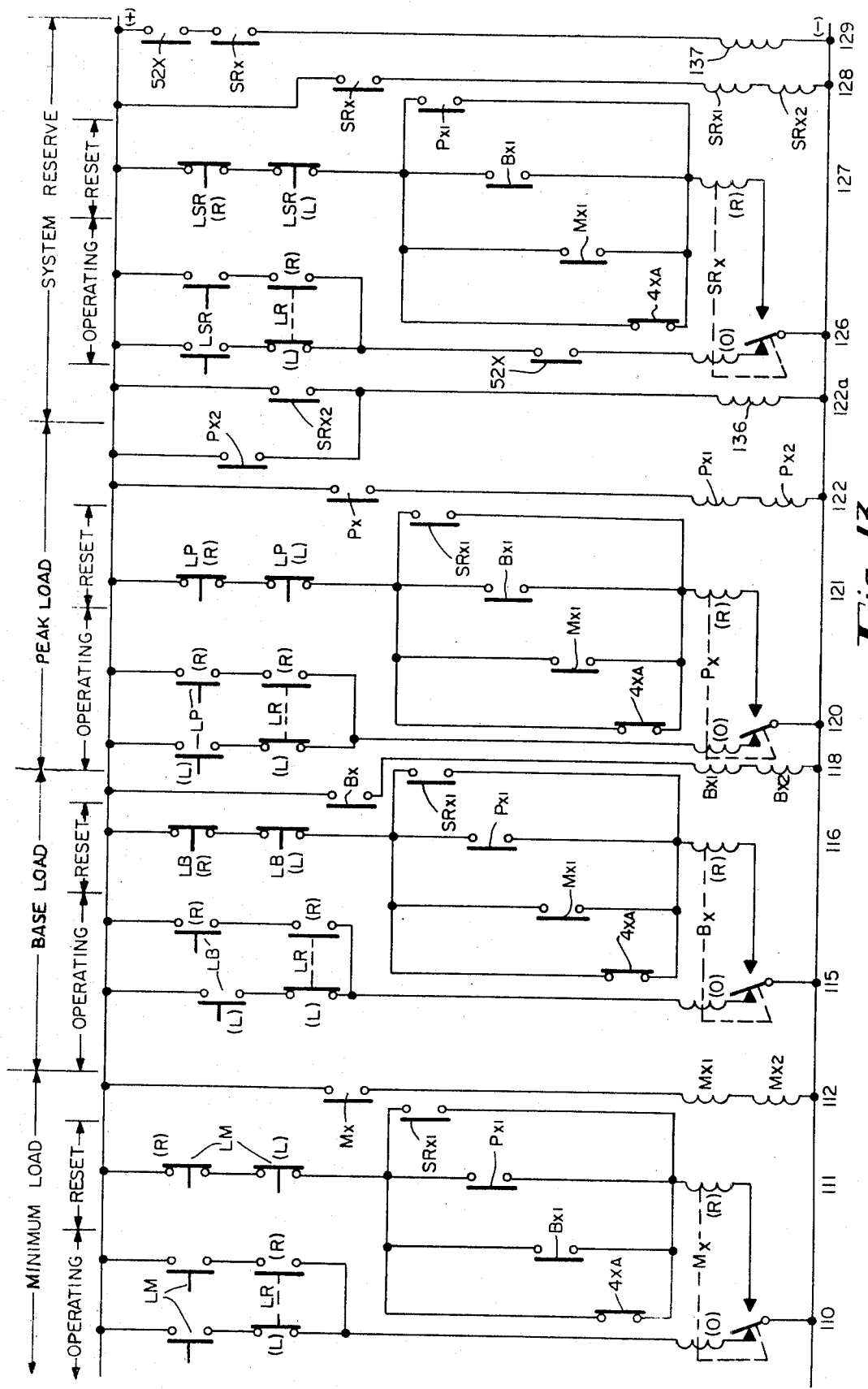
FIG. 13 shows a schematic diagram of the electrical circuitry for selection of the mode of load control.

Referring now to FIG. 13, there are illustrated circuit diagrams of the loading mode control circuits used in the control system of this invention. The circuits are designated as those which control the minimum load mode, base load mode, peak load mode and system reserve mode respectively. Corresponding to each mode, circuits are designated which control operating and reset functions.

The operating circuit for the minimum load control is at 110, and the reset circuit at 111. Minimum load control is obtained by temporarily closing the LM contacts, in either local or remote control. Closing the LM contacts causes energization of the operation (O) coil of relay $M_x$, and switching of the $M_x$ switch to the reset (R) circuit. This causes closing of the $M_x$ contacts at circuit 112, and energization of relays MX1 and MX2. Upon energization of relay MX2, contacts 4XA (circuit 245) are opened, such that the reset portion of $M_x$ is not energized after the LM button is released and the LM contacts in circuit 111 have been closed. However, upon deenergization of relay 4XA, or operator placement of control into either the base mode load, peak load mode or system reserve mode, contacts BX1, PX1 or SRX1 are closed, causing reset of the $M_x$ switch to contact the operating $M_x$ coil, whereupon the $M_x$ contacts are opened and control is taken out of the minimum load mode.

The base load and peak load control circuitry is identical in configuration and operation to that of the minimum load circuitry.

The system reserve circuitry, circuits 126–129, is identical to the minimum load circuitry, with the exception of contacts 52X in circuit 126, providing that the generator breaker need be closed before the turbine can be put in system reserve control. In addition, at circuit 122a, coil 131 is energized when the system is either in peak load or system reserve control, thereby energizing solenoid valve 136 (FIG. 6A). Also, at circuit 129, when the turbine is placed in the system reserve mode, contacts $SR_x$ are closed, thus energizing solenoid valve 137 (also discussed in FIG. 6A).

Figure 24:
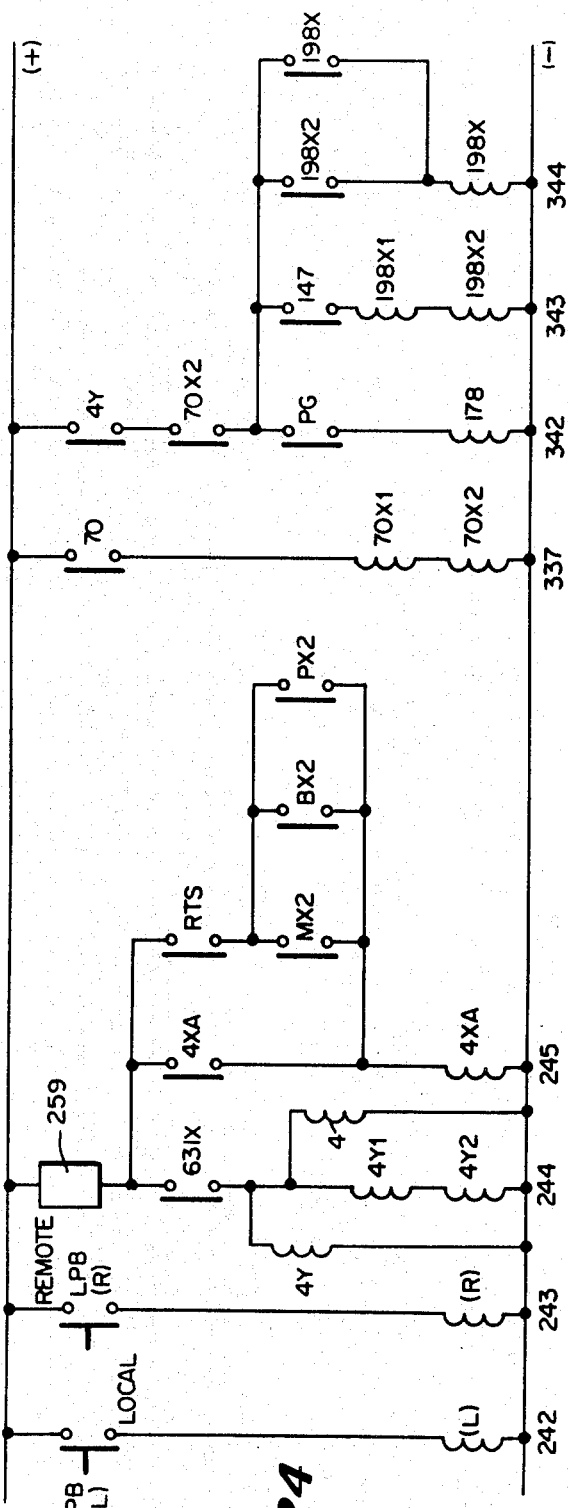
FIG. 24 shows a schematic diagram of the master relay portion of the protection portion of the electrohydraulic control system of this invention, and a first portion of the circuitry for controlling the ignition sequence.

Referring now to FIG. 24, the master relays are shown at circuits 244 and 245. The trip reset contacts 259 comprise a series of contacts which, when closed, energize relay 4Y. These contacts are set forth hereinbelow in Table B. The RTS contacts are closed when all the permissives set forth in Table B are met. Upon closing of the trip reset contacts and the RTS contacts, and placement of the turbine system in minimum, base or peak mode, master relay 4XA is energized, which is self locking through contacts 4XA. Closure of contacts 4XA, along with closure of contacts 257 (the lube oil pressure switch) energizes timer TD2 which times out 20 seconds, and then through closure of contacts TD2 energizes master relays 4, 4Y1 and 4Y2.

Figure 25:
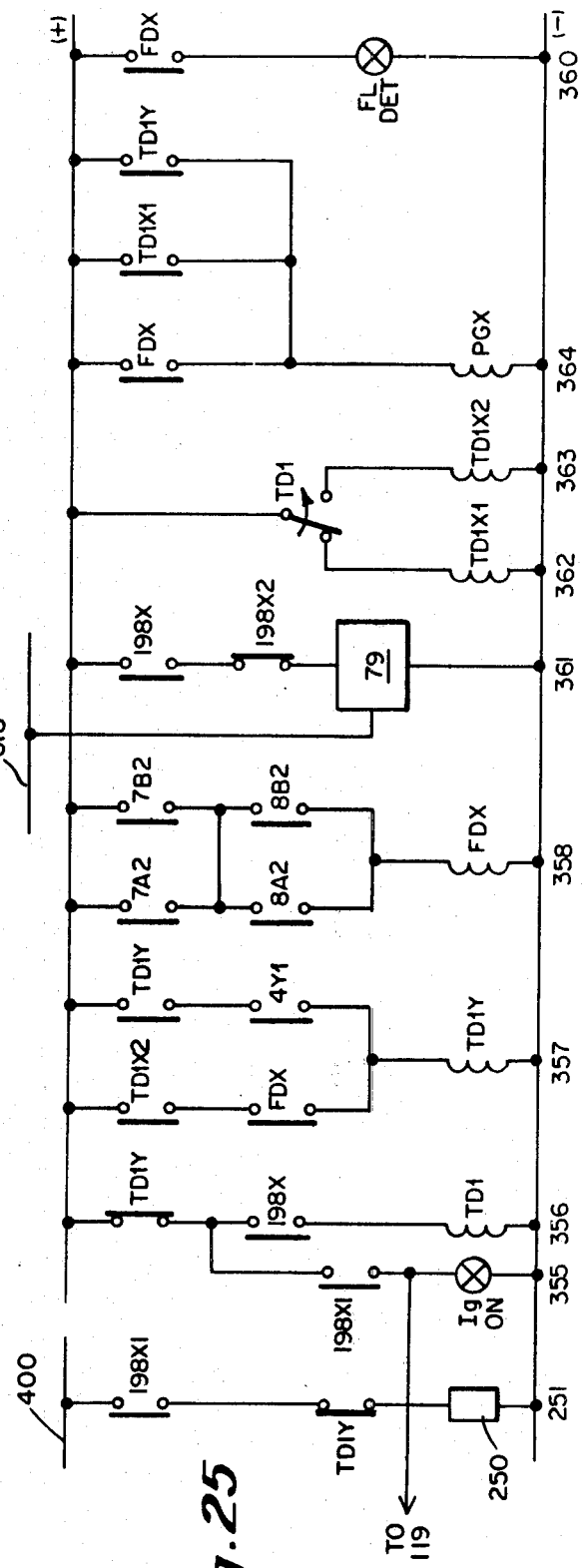
FIG. 25 shows a schematic diagram of a further portion of the ignition sequence circuitry.

Referring to circuits 337, 342-344 (FIG. 24) and 251, 355-58, 360-64 (FIG. 25), there is illustrated the circuitry for controlling the ignition sequence. When the turbine reaches ignition speed, pressure switch 70 closes, energizing coils 70X1 and 70X2. Closure of contacts 70X2 energizes solenoid 178, the purge relay PGX having been initially energized (circuit 364) to close contacts PG. Energization of solenoid 178 causes a buildup of overspeed trip air pressure, closing contacts 147, which remain closed as long as the air pressure is maintained above a predetermined limit. This causes energization of relays 198X1 and 198X2, in turn energizing relay 198X. Energization of relay 198X1 allows ignition (circuit 355) by energizing solenoid valve 119 (see FIG. 4). Additionally, energization of 198X1 energizes the ignition transformer 250 (circuit 251). As seen at circuit 356, energization of 198X initiates timer TD1, which times out 35 seconds for establishing flame on both detectors. After 35 seconds, timer TD1 pulls in. If flame is established in all combustor baskets, contacts 7A2 or 7B2 and 8A2 or 8B2 of the flame detection monitors are actuated, whereupon flame detection relay FDX is energized. After the 35 seconds timed out by TD1, relay TD1X2 is energized (circuit 363), energizing relay TD1Y (circuit 357), which causes de-energization of the ignition transformer. The purge relay PGX (circuit 364) remains energized, and the flame detect light is lit (circuit 360).

However, if both flame detectors of basket 7 or 8 sense loss of flame after the 35 second ignition period, neither relay FDX nor TD1Y are energized, and the purge relay PGX is de-energized. This causes deenergization of the overspeed solenoid 178, and consequently the overspeed pressure disappears. As a result, contacts 147 open and relays 198X1 and 198X2 are de-energized, the ignition transformer being switched off as a consequence. As seen at circuit 361, de-energization of 198X2 also closes the circuit to counter 79, causing it to count down. Counter 79 may be reset from 2 shot line 618, and thus a second startup is permitted automatically. Similar logic circuitry, not shown, provides for shutdown in case of "outfire" or loss of flame, during running. If flame is lost at both sensors of either basket, immediate shutdown is effected and an alarm is set. At the same time, the detection of flame loss at any one of the four detectors is signaled by a respective outfire lamp, to indicate the condition to the operator. If only one sensor of either basket indicates outfire (in which case the sensor or related circuitry is at fault), system operation is maintained.

F. TWO SHOT SHUTDOWN

A two-shot shutdown control is provided in the system of this invention whereby an automatic procedure permits multiple restarting remotely, under selective malfunction, without jeopardizing turbine life. When a turbine malfunction occurs causing shutdown, the control system is automatically reset when the condition is corrected after the first shutdown. If a second shutdown signal occurs within a preset time (adjustable) of the first shutdown while the unit is starting or running, the control is locked out of automatic restart. The system can then only be started by manual control (at the turbine, not at the remote control) by the local maintenance operator. However, if a second shutdown does not occur within an hour, the control is automatically reset to a two-shot condition, such that restart is again available following the next shutdown.

In accordance with the above, the control system provides differentiation and proper response for the following three conditions:
1. Alarm only—Multiple restarts unlimited.
2. shot shutdown—Malfunction implies possible damage if restarting is permitted.
3. 2 shot shutdown or multiple—Permits multiple limited restarting attempts after abort and within a prescribed time period.

Figure 14B:
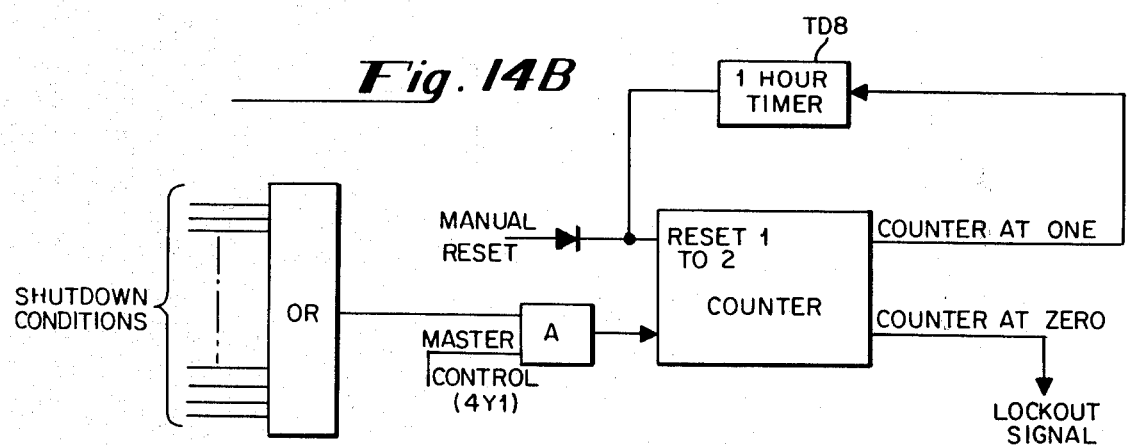
FIG. 14B shows a first block diagram of the logic functions of the 2-shot protective system.

Referring to FIG. 14B, there is shown an OR gate having a plurality of inputs, each connected so as to transmit a signal representing the failure of a condition requiring shutdown. Examples of such conditions are de-energization of the exhaust temperature relay, blade path relay, and vibration relay (due to fail-open of a respective switch). The output of the OR gate is connected to an AND gate, having a second input from master control (4Y1). Thus, whenever the master control relay is energized and any one of the two-shot shutdown conditions exist, an output is passed to the shutdown counter. The counter is normally set at 2, and counts down in increments to 1 and 0. The counter has two output terminals, for transmitting signals when the counter has counted down to 1 and 0 respectively, and an automatic reset terminal for introducing a signal to reset the counter from 1 to 2.

In operation, upon the first shutdown, the counter counts down to 1, causing a trigger signal to be connected to the one hour timer (TDS). At the end of one hour, an output signal is generated by the timer which is coupled to the reset terminal of the counter. If the counter is still at 1, it is reset to 2. If it is at 0, it cannot be reset by this signal. As shown, the counter may also be reset to 2 through a manual reset circuit located locally at the turbine. If two shutdowns occur within an hour, a lockout signal appears at the 0 count terminal, and the counter cannot be automatically reset.

Figure 14D:
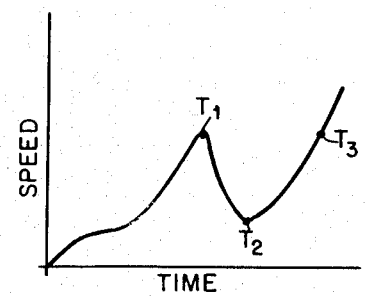
FIG. 14D illustrates a start-up sequence utilizing the 2-shot protective system.
Figure 14C:
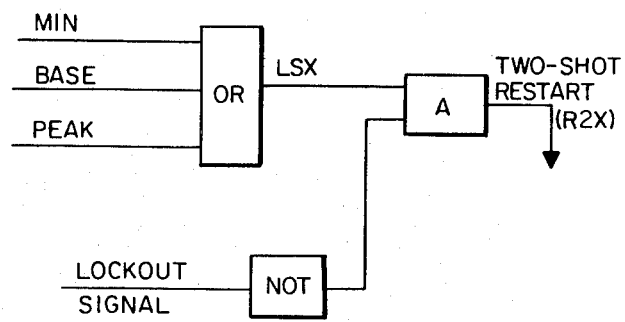
FIG. 14C shows a second block diagram of the logic functions of the 2-shot protective system.

Referring now to FIG. 14C, there are shown the conditions which must be met for automatic restart. Three inputs are connected to an OR circuit, carrying signals designating that the system is in either the minimum, base, or peak load state. When the system is in any one of such conditions, the OR circuit produces an output signal, designated the LSX (load select) signal. When this signal is present, and the lockout signal is not present, the two-shot restart signal R2X is generated, which permits automatic restart when the shutdown condition is corrected.

Figure 14A:
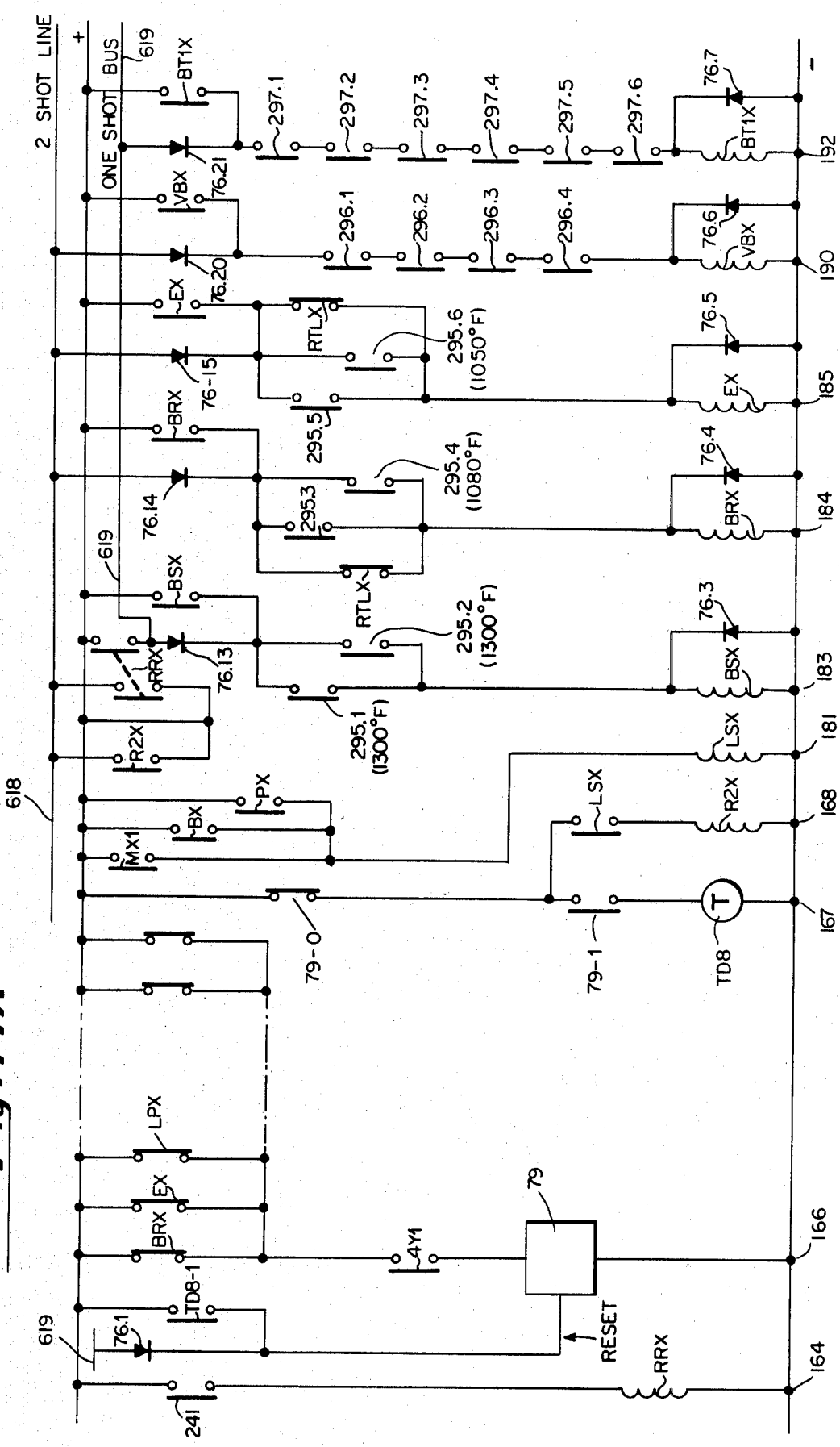
FIG. 14A shows a schematic diagram of the "2-shot" circuitry associated with the turbine protective portion for protecting the turbine.

As seen in FIG. 14A, there is shown at 164 a manual push button 241 in series with reset relay RRX. The counter (designated 79) is shown at circuit 166, in series with switch 4Y1 (closed when the master relay is energized), and in series with a plurality of switches connected in parallel. These switches constitute the OR circuit, as shown in the upper block diagram, and are normally open when conditions are satisfactory. When a malfunction occurs for which a second try is permitted, the corresponding switch in circuit 166 is closed, thus triggering counter 79. The reset terminal of counter 79 is connected through switch TDS-1 to the positive bus line, and through diode 76.1 to the manual reset line 619.

At circuit 167, the timer TDS is shown in series with normally open switch 79-1 (which closes when the counter counts to 1) and normally closed switch 79-0 (which opens when the counter counts to zero). Also in series with switch 79-0 is switch LSX and relay R2X. At circuit 181, parallel switches MX1, BX, and PX form the OR circuit shown in the lower block diagram, and are in series with relay LSX. Switch R2X, closed when relay R2X is energized, is connected between the plus line and line 618 (two-shot line). Switch RRX, closed when reset relay RRX is energized, connects the plus line with both line 618 and the one shot bus reset line 619.

Circuit 183, the blade path temperature start circuit, contains blade path switches 295.1 and 295.2 in parallel, which switches are normally closed when the temperature is below 1300° F. These switches are in series with relay BSX. It is seen that when only one of the two thermocouple switches fails open, the circuit is not affected. However, when both fail open (both sense temperature exceeding 1300° F.) relay BSX is de-energized. This in turn causes the opening of a switch (not shown) in the shutdown circuit, causing system shutdown. The two temperature switches are connected through seal contact BSX to the plus line, and through blocking diode 76.13 to one-shot line 619.

In a similar fashion, shutdown relays BRX (circuit 184) and EX (circuit 185) are de-energized upon fail open of both of a pair of thermocouple switches. These circuits are connected through diode 76.14 and 76.15 respectively to two-shot line 618. At circuits 190 and 192, the vibrations and bearing temperature circuits respectively, the normally energized relays VBX and BT1X respectively are de-energized upon fail open of any one of the series contacts. The vibration circuit is connected through diode 76.20 to the two-shot line 618, and the bearing temperature circuit is connected through diode 76.21 to the one-shot reset line 619.

The operation of the two-shot control can be illustrated by examination of malfunctions of one of the turbine functions. For purposes of examination, it is assumed that the malfunction occurs in the turbine exhaust temperature limit circuit 185. When both switches 295.5 and 295.6 open, representing detection of exhaust temperature greater than 1050° F., relay EX is de-energized and contact EX at circuit 166 is closed, setting counter 79 from 2 to 1. At the same time, another EX contact in the shutdown circuit (not shown) is open, causing shutdown of the turbine system. Under these circumstances, switch 79-1 in circuit 167 closes, initiating timing of a one hour period at timer TD8. Assuming selection of either manual, base, or peak operation at circuit 181, contact LSX is closed, causing energization of relay R2X and closing of switch R2X, such that the positive line is connected through to the two-shot line. Under these circumstances, it is seen that as soon as either one or both of the switches 295.5, 295.6 closes again, representing correction of the shutdown condition, relay EX is re-energized through diode 76.15. The shutdown circuit is then reset, permitting system restart. Assuming no further shutdown, timer TD8 times out one hour, at which the switch TD8-1 closes, transmitting a reset signal to counter 79, resetting it to a 2 count.

If, after automatic restart, a second shutdown occurs before the one hour period terminates, counter 79 is counted to 0. Switch 79-0 at circuit 167 then opens, causing de-energization of relay R2X and opening of contact R2X, such that two-shot line 618 is not energized. Under these circumstances, the shutdown relay (e.g., EX) cannot be energized from the two-shot line even when the condition is corrected (or corrects itself). When the one hour is up, the signal through switch TD8-1 does not reset the timer, as this reset signal cannot reset it from a count of 0. The system can be re-started, and the counter reset only by the local operator by depressing push button 241. This causes closing of relay contact RRX (circuit 183) which connects positive voltage to the two-shot line 618.

The operation of the automatic turbine control restart circuitry is illustrated in FIG. 14D. At time $T_1$, the malfunction occurs, causing a first abort. At time $T_2$, the malfunction is corrected or corrects itself, and turbine restart is automatically enabled. At time $T_3$, at the speed where the malfunction occurred during the first start, the malfunction does not re-occur, permitting continuation of a successful start. This action provides safe automatic turbine control restart, without a second command during the time the unit is decelerating. This option enhances the turbine starting reliability by permitting the starting control to automatically re-sequence for those type of malfunctions that may not occur on the second try. It is to be noted that more than two "shots" may be programmed for different malfunctions, the number of shots allocated to each condition being a matter of design choice.

Referring now to FIGS. 15-21, there are shown block diagrams of the speed and load control functions performed by the apparatus of this invention. The functions described are carried out by the apparatus as hereinabove described. However, it is to be understood that where such functions have been described as being carried out by pneumatic hardware, they can also be carried out by equivalent solid state hardware. For example, the speed changer and load changer functions may be performed by equivalent electronic function generators. In a similar manner the pneumatic controllers, totalizers, limiters, etc. may be replaced with equivalent solid state devices.

Referring now to FIG. 15, there are shown the conditions for achieving minimum load control. When the breaker has been closed and 99% speed attained, the output of the speed changer is adjusted upward according to the initial load setpoint. This upward adjustment brings the speed changer output directly up to the load scheduler minimum output (see FIG. 10). Under the conditions where the load scheduler is not energized, the speed load controller output produces the minimum signal which is communicated to the throttle valve, causing the load to increase to minimum load. As soon as the load scheduler begins to produce a ramp output, it takes over control and the turbine passes from minimum load control.

Referring now to FIG. 16, there is shown a block diagram of the base load control apparatus of this invention. The turbine, when ascending to base load, may be under control of the speed load controller, the load scheduler, the blade path controller, or the temperature exhaust controller, depending upon which of these is producing the lowest output signal. Note that, for any given day, base load is only a load point controlled by temperature control. The ramp generators are used to ascend to "base" and descend from "base", but it is the temperature control which maintains the turbine at base load. See FIG. 10, where after the 12 minute ramp, the exhaust temperature signal is controlling. When the generator breaker has been closed but the speed changer limit has not been reached, the speed changer produces an output which, when modified by the initial setpoint step up, forms an input to the speed load controller which provides an output during the time period from the closing of the generator breaker to initial load scheduler action. A load scheduler output is produced when the base load mode has been selected and as long as the load scheduler limit has not been reached. If the fast load mode has not been selected, the load scheduler output produces an output for normal loading, nominally in 12 minutes. If the operator has made a request for fast loading, the load scheduler output is modified to produce a fast loading signal, causing loading of the turbine in approximately 2 minutes.

Still under base load control, when the generator breaker has been closed and base load has been selected, the $P_{2C}$ signal is combined with the blade path temperature signal to produce an input to the temperature controller, which provides a transient backup signal which, if lower than either the speed load controller or load scheduler signals, provides control of the throttle valve through an OR gate (the low pressure select device 231). Similarly, when base load has been selected, the $P_{2C}$ signal is combined with the temperature exhaust signal and forms the input to the temperature exhaust controller, producing a steady state backup signal, as a second temperature backup throttle valve control. Thus, under base load control, after the generator breaker has been closed the speed load controller signal controls the throttle valve for the short period of time until the load scheduler signal assumes control and ramps the turbine up to base load. During the increase of load, both the blade path and exhaust signals are available as backup control signals. When the exhaust temperature signal becomes the smallest signal, it maintains the turbine at base load (see FIG. 10).

Referring now to FIG. 17, there is illustrated a block diagram of the means for providing control in the peak load mode. As with the base load mode, the load control signal which controls the throttle valve operation during ascent to "peak" may be derived either from the speed load controller or from the load scheduler. Again, when the generator breaker has been closed and the speed changer limit has not been reached, the speed changer provides an output which, adjusted by the initial load setpoint, provides an input to the speed load controller. It is to be noted that as soon as the speed changer limit is reached switch 194 opens to stop the synchro ramp. The load scheduler continues to produce an output as long as the load scheduler limit has not been reached (switch 196 not open). However, as with the base mode, when the exhaust temperature setpoint is reached, the exhaust control takes over. The choice of load control determines the setpoint, and accordingly the steady state load level.

Referring to the blade path loop, it is seen that a signal representing $P_{2C}$ is produced when the generator breaker is closed, and is a function of whether the turbine system has been placed in peak load and/or system reserve load mode. This relates to the energization or de-energization of solenoids 136 and 137 respectively, which alter the biasing of the $P_{2C}$ signal which acts as a setpoint signal to the blade path controller. Similarly, the choice of load mode control affects the $P_{2C}$ signal which combines with the temperature exhaust signal to provide the inputs to the temperature exhaust control.

FIG. 18 illustrates the control when in the system reserve mode. This control is similar to that as described hereinabove for peak mode control, with the choice of system reserve mode altering the setpoint $P_{2C}$ signal for the blade path controller and exhaust temperature controller respectively.

Referring now to FIG. 19, there is shown the block diagram for fast loading selection. Fast loading may be selected either remotely (R) or locally (L). When such selection is combined with closing of the master relay, and the turbine has not passed 99% of full speed, a request for fast loading signal (FLX) is produced. If a flame is also detected, an output is provided to the fast loading pulse counter.

Figure 20:
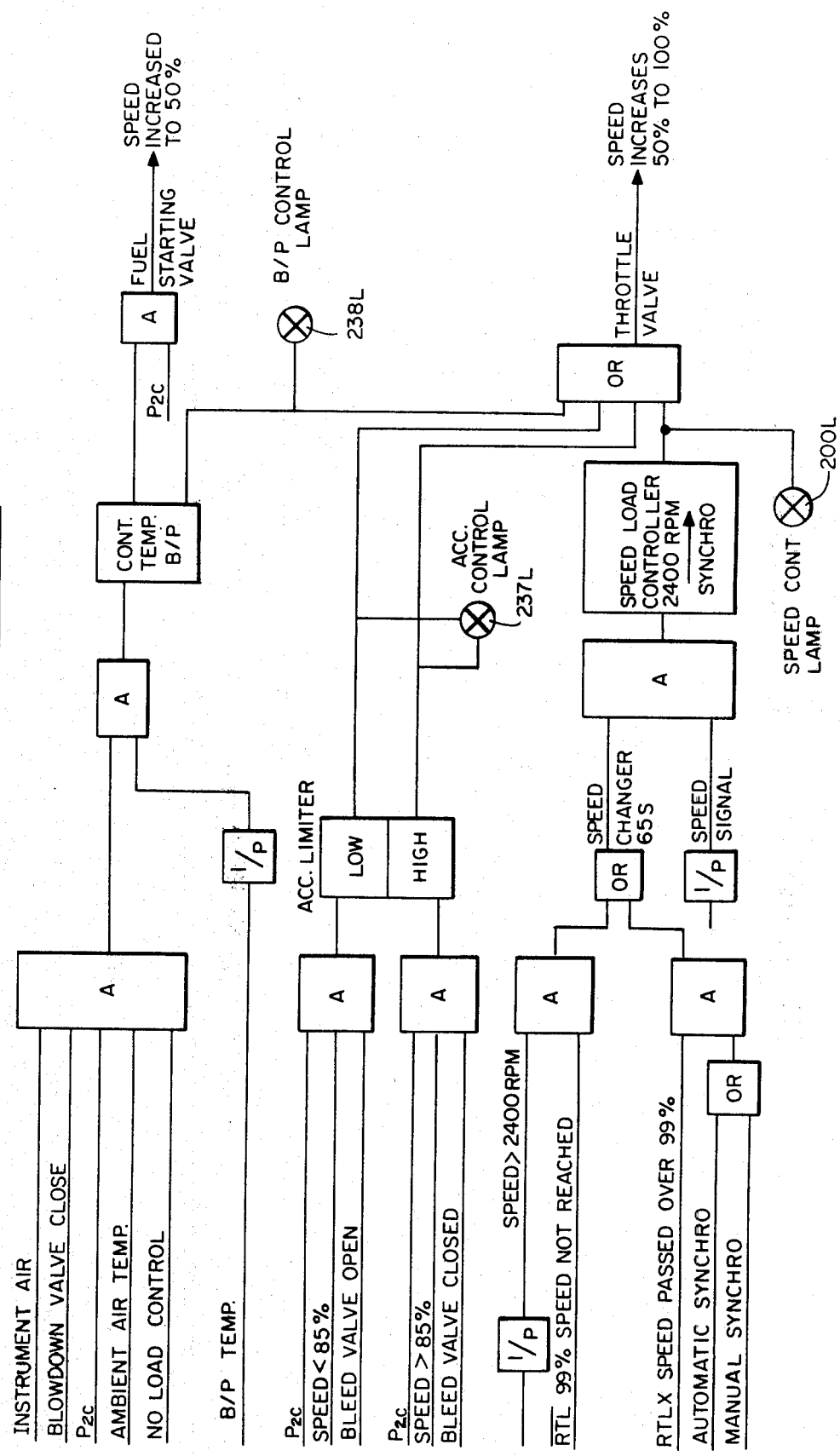
FIG. 20 shows a block diagram of a portion of the control system for operating the turbine in the starting fuel control mode.

FIG. 20 represents the functional conditions for speed control during startup, or starting fuel control. The detection of instrument air, blowdown valve close, the $P_{2C}$ signal and the ambient air temperature signal, as well as the absence of any load control, produces a signal (representative of $P_{2C}$) which is combined with a blade path temperature signal to provide the variable and setpoint inputs for the blade path controller. The output of the blade path controller can be utilized as a signal in controlling the starting valve for speeds up to about 45%. For speeds from about 45% to 100% of synchronous speed, speed control is normally effective as the main control parameter via speed load controller. For speeds less than 95% when the bleed valves are open, the acceleration limiter produces an output which is a linear function of $P_{2C}$. For speeds greater than 95%, when the bleed valves are closed, the acceleration limiter is translated downward but continues as a linear function of $P_{2C}$. The lowest selected signal among the acceleration limiter, the blade path signal, and the speed load controller signal, is delivered to the throttle valve. For speeds greater than 2100 r.p.m. (45%) and less than 99%, with the turbine not ready to load (RTL), there is produced a linear ramp speed changer output. If the system is ready to load and speed has passed over 99%, and the system is in automatic or manual synchro, the speed changer also provides an output. The speed changer output and the speed signal are combined to produce an error signal at the speed load controller which provides speed control from 2100 r.p.m. to synchronous speed.

Referring now to FIG. 21, there is shown a block diagram for the functional operations under manual load control. When the operator has placed the system in base, peak, or system reserve control (but not minimum load), and the load scheduler limit switch has been closed (indicating that the load scheduler went to maximum position) manual load control through manual operation of the speed changer may be achieved. The operator may choose to raise or lower load and may do so by manually depressing either a RAISE or LOWER manual control button, under the conditions where the load is above minimum load, and as long as the speed changer limit switch is not closed (the speed changer has not reached its maximum position). Under these conditions, manual pressing of either the RAISE or LOWER button causes corresponding increasing or decreasing output of the speed changer 65S, producing an output from the speed load controller which is lower than the output of the load scheduler, thus providing control of the throttle valve between loads of 10% and 100%. In the increase loading direction the load rate limiter imposes a time delay in the manual load mode. It is inactive in the lower direction.

G. SPEED-LOAD HOLD AND LOCK SUBSYSTEM

Figure 22A:
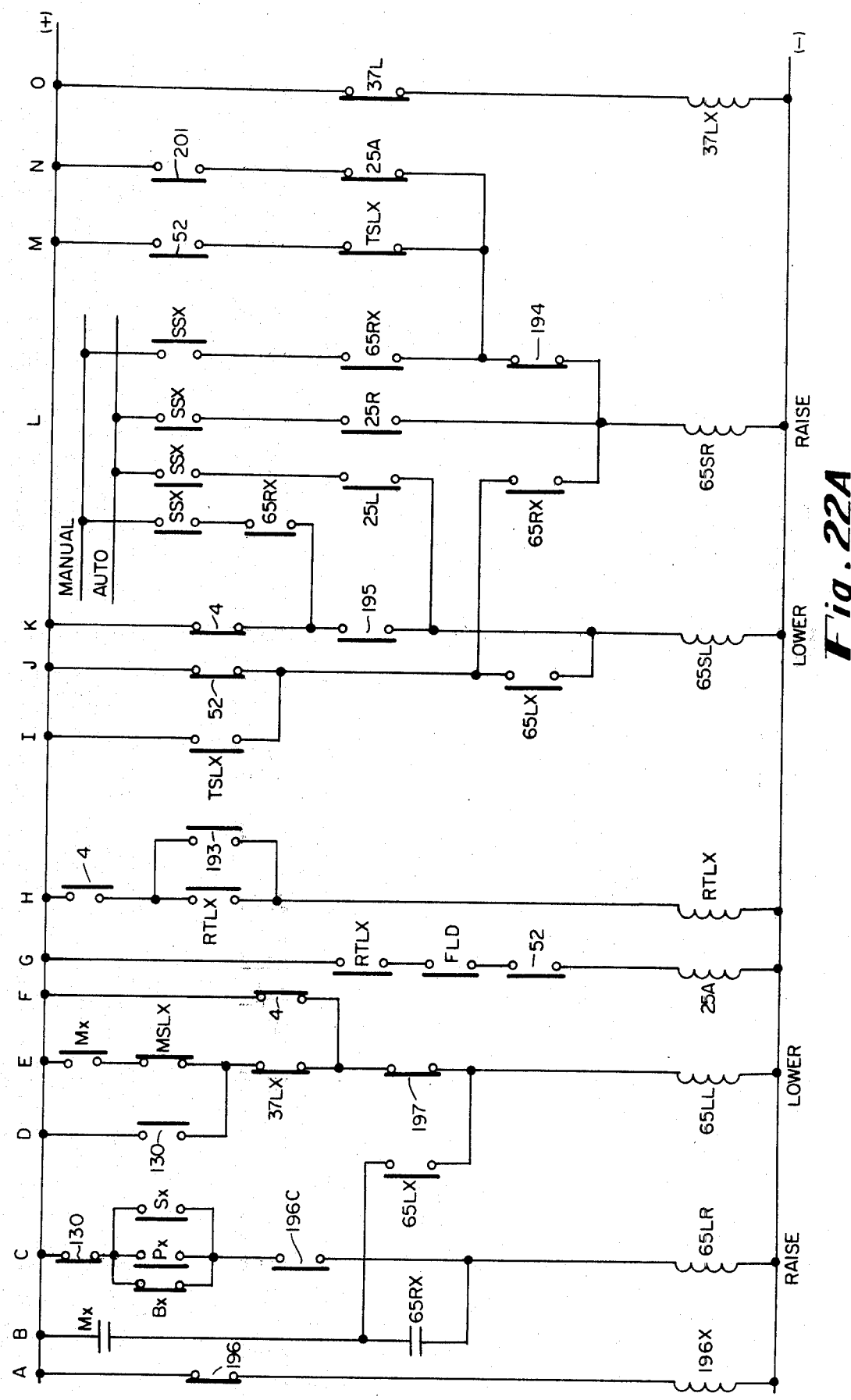
FIG. 22A shows a first portion of a schematic diagram of the circuitry for the speed/load hold and lock subsystem.
Figure 22B:
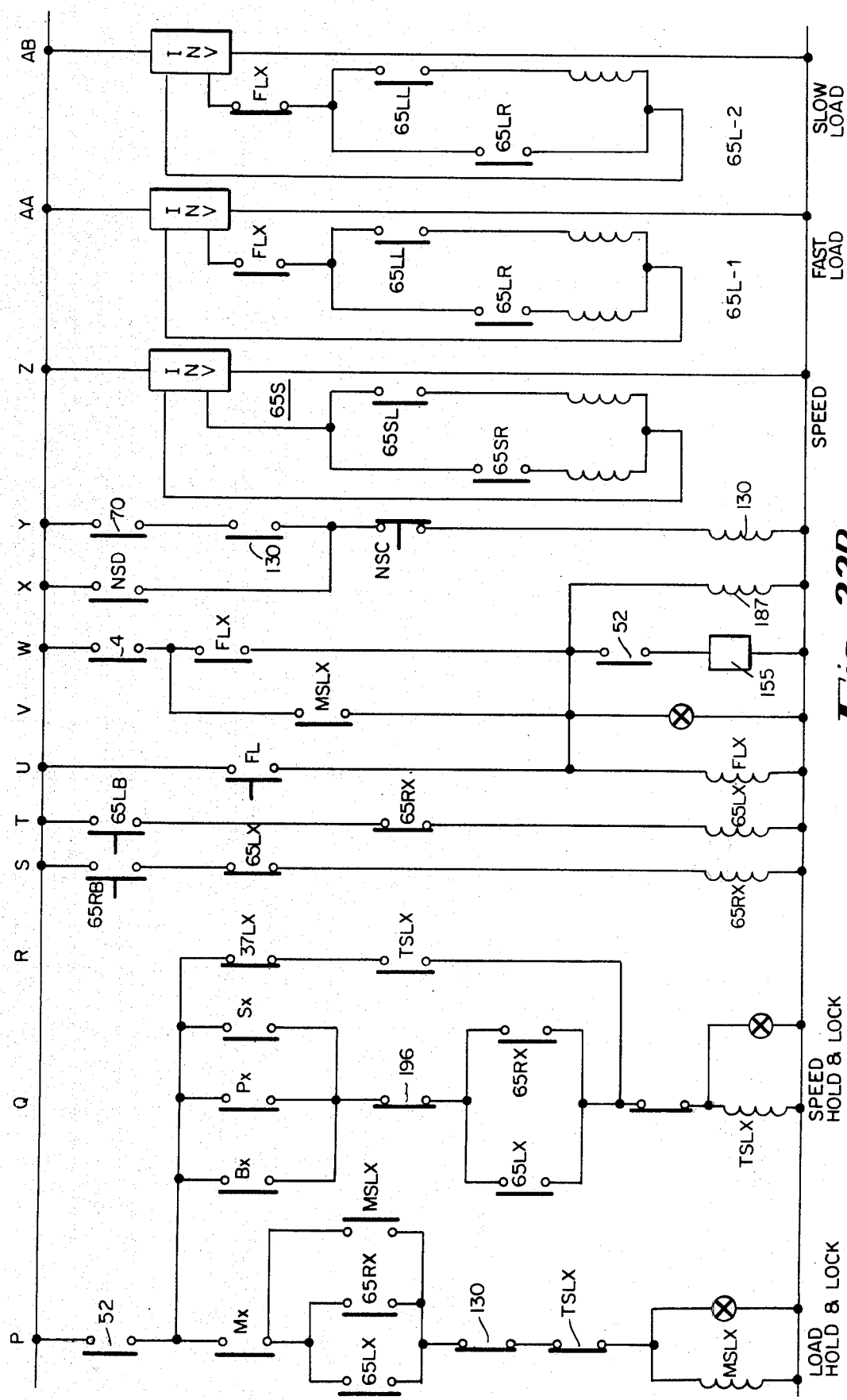
FIG. 22B shows a second portion of a schematic diagram of the circuitry for the speed/load hold and lock subsystem.

Referring now to FIGS. 22A and 22B, there is shown an alternate embodiment of the speed and load control circuits, which alternate embodiment is designed to give the operator greater flexibility and choice for holding and locking any desired load level. This embodiment provides a degree of operator flexibility not previously available in any other known analog or digital control system for a turbine. In the following discussion of FIGS. 22A and 22B, reference will be made to the individual circuits which comprise the subsystem, which are designated by capital letters.

Most of the circuit components of the subsystem of this embodiment are similar to those described hereinabove, and in such cases the same numeral identifications are utilized. The primary component difference in this embodiment is that the loading synchro is comprised of two distinct loading synchros, namely a 12 minute loading synchro designated 65L-2, which provides a linear ramp loading signal which reaches its full output in 12 minutes, and a two minute loading synchro 65L-1 which reaches its full output in 2 minutes. The two loading synchros are interconnected, with the output of each being connected as a tracking input signal to the other. The air supply to the respective loading synchros is controlled such that the selected synchro provides its normal output, while the other synchro tracks along, such that at any given time both synchros are at a position so that they provide the same output. In this manner, selection can be switched from one to the other at any time during loading or unloading. In this way a continuous load signal is maintained. Under normal operation, synchro 65L-2 (12 minute) is energized, 65L-1 being energized only when specifically selected or when a load hold or manual load point is desired.

In the discussion to follow, reference is also made to Table D hereinbelow, which sets forth the operating conditions of a number of the subsystem components.

TABLE 1

196: pressure switch; contacts open when 65L output reaches 100%.

197: pressure switch; contacts open when 65L output reaches its minimum position.

193: pressure switch; contacts close at 99% speed.

195: speed changer windback switch; contacts closed during windback, and open at minimum output.

194: pressure switch; contacts open at full 65S output, to stop 65S.

201: pressure switch; starts speed changer at 50% speed.

RTLX: contacts close at ready to load.

52: switches at generator breaker closing.

37L: pressure switch; contacts open at MIN load.

As is seen in FIG. 22B, circuits S and T, this subsystem utilizes just one RAISE button and one LOWER button, each button being utilized for raising and lowering the speed control signal as well as the load control signal. Upon closing of the RAISE button 65RB, relay 65RX is energized as long as the LOWER button 65LB is not closed. Conversely, when the LOWER 65LB button is pressed, relay 65LX is energized, on the condition that the 65RX relay is not energized.

Operation of the overall speed and load control subsystem is derived from the following operations:

1. When the MIN load button is pushed (see FIG. 13), normal start, the two 65L synchros stay at MIN position and the 65S synchro automatically goes to full position, 65SR being energized through circuit N until contacts 194 (6318S) are opened at the full speed synchro position. This automatically allows 10% load. It is noted that in this operation neither 65RX nor 65LX is energized.

2. When the base load mode is selected (FIG. 13), normal start, 65L-2 automatically goes to its full position, 65LR being energized through circuit C until contacts 196C open at full load signal (upon energization of relay 196X). Synchro 65S goes to full output, 65SR being energized through circuit M until contacts 194 open at full output. (196X opens when contacts 196 open at full synchro speed output). This permits loading to the limit of the base temperature curve.

3. After the turbine is in the MIN load position, either the RAISE or LOWER button is pushed. This gives manual control of load synchro 65L-1, either through circuits B, C or B, E respectively. In either case, speed synchro 65S goes to full position through circuit M.

4. All manual operation and selection of RAISE/LOWER automatically switches to 65L-1.

5. After the system has been placed in the base load mode, pushing either the RAISE or LOWER button causes grabbing manual control of 65S after the load synchro reaches full output through circuit C. When it reaches this position, and the RAISE or LOWER button is pushed, relay TSLX is energized through circuit Q, and consequently either 65SL or 65SR is energized through circuit I when the TSLX contacts there close. This permits manual raising or lowering of load on speed control. When the turbine is at base, peak or system reserve load level, and the MIN button is pushed, synchro 65L-1/65L-2 automatically goes to the MIN level, due to energization of 65LL through circuit E.

6. At the same time, 65S stays up at its full level. This action permits automatic load reduction to the low limit. If manual control of 65L-1/65L-2 has been previously obtained (by pushing MIN to get manual control of 65L), and then MIN is pushed, no change in the position of 65L takes place. If it is desired to return to MIN load, this must be done manually. Once minimum load is reached, 65S goes to full output, if not already there.

7. If the turbine is on base, peak or system reserve control, and 65L is at full output, and then either the RAISE or LOWER button is pushed, manual control of 65S is obtained through circuit I, since contacts TSLX are then closed. 65L stays at full output, since 196X is open in circuit C.

8. When under manual control of 65S, and the MIN button is pushed, 65L automatically goes to the MIN position through circuit E, and is stopped when contacts 37LX open at MIN level (10%). Synchro 65S stays where it was. This permits unit to be held at 10% load.

9. When under manual control of 65S, and MIN is momentarily pushed and then base is re-pushed, 65L is already at full output (see 5 above), and stays there. 65S automatically goes to full where it is limited by the opening of contacts 194 through circuit M, thereby putting the turbine in base temperature limit control.

10. When under manual control of 65L, and base is pushed, 65S is already at full, and 65L automatically goes to full through circuit C, to get to base temperature limit control.

11. When at base load, and either the RAISE or LOWER button is pushed after also pushing MIN, (see 6 above), 65L starts to lower until either 65LX or 65RX are closed in circuit P, thereby energizing MSLX and opening contacts MSLX in circuit E, thereby de-energizing 65L-1 to hold load at this level.

12. When in the base mode (65S and 65L are at full positions), and the normal shutdown button (NSC) is pushed, 65L automatically returns to MIN through circuits D, E to prepare for shutdown. 65S stays where it is until after shutdown.

13. When normal shutdown is pushed from any other position but base, 65L automatically goes back to the MIN position through circuits D, E, and 65S stays where it was until after shutdown, or until it is manually changed through circuits J, L, or where the automatic synchronizer grabs it through circuit L.

14. If the shutdown cancel (NSC) is pushed at circuit Y, shutdown is interrupted due to the opening of contacts 130 in circuit D.

15. If the generator circuit breaker opens on base, peak, system reserve or MIN mode, thus opening contacts 52, 65S returns to resync and reload, while 65L stays at full position.

The use of the speed-load control subsystem in operation can now be described. The selectable options for load provision may be described as follows:

A. Minimum—Initial 10% load step and manual load control from 0 to base load. This position is used to hold load independent of system frequency change.

B. Base Load—Initial 10% load step and ramp to preset base line as a function of combustor pressure and turbine exhaust temperature. Part load operation can be had by reducing the speed reference and automatically removing the machine from temperature control to speed control by use of the speed/load lower button (after the unit has reached temperature control as sensed by the loading synchro reaching full position).

C. Peak Load—Initial 10% load step and ramp to preset peak line as a function of combustor pressure and turbine exhaust temperature. Part load operation can be had by reducing the speed reference and automatically removing the machine from temperature control to speed control by use of the speed/load lower button (after the unit has reached temperature control as sensed by the loading synchro reaching full position).

D. System Reserve—Can only be selected after the generator breaker is closed, and permits the unit to ramp to a pre-set system reserve line as a function of combustor pressure and exhaust temperature. Part load operation can be had by reducing the speed reference and automatically removing the machine from temperature control to speed control by use of the speed/load lower button (after the unit has reached temperature control as sensed by loading synchro reaching full position).

In minimum control operation minimum load is selected by the operator. The 65S synchro motor is energized by the pressure switch at 50% speed, and proceeds until it is stopped at full output by a pressure switch 194. Operator control permits manual raise/lower control over synchro 65S to permit overspeed checkout of controls with the generator breaker open. At ready to load (98% speed) the synch circuit is armed. If the unit interlocks are ready for synchronizing, the autosynch raise/lower pulses begin on 65S to match speeds. When synchronizing conditions are met, the generator breaker is automatically closed. Solenoid 187 (circuit W) is energized to permit the 10% step to the minimum power level, whatever has been selected to accommodate a dead load pickup, within 25% of machine capability. Synchro motor 65S drives to full position and de-energizes. The turbine is now under constant load control, with the power output holding roughly constant with changing ambient temperature and line frequency, even though speed varies to the low frequency or low speed limit.

While under minimum control, if higher or lower load is required, the subsystem provides for requesting a new setpoint by use of the common raise/lower push buttons. Change in load is accomplished by energizing 65L to a raised or lower output, the maximum output being limited by base load temperature control and the minimum limited only by reverse power limitation.

If it is desired to establish the turbine on temperature control, the operator, as in the earlier described embodiment, places the turbine in either base, peak or system reserve mode of operation. On the command for one of the above load modes, 65L is driven automatically to its full position and deenergized. A temperature light corresponding to the selected control mode is illuminated. The selection of a temperature control mode nullifies load control and, after the load synchro reaches full position, permits manual speed control reduction of the load.

When in base, peak or system reserve operation, if it is desirable to reduce load or to put the unit on speed control for load sharing from the temperature control mode, it can be accomplished by lowering mode control temperature via the common "LOWER" button until the control signal output is less than the temperature limit, thereby selecting speed control as the controlling variable. The control acts to identify this mode of operation by causing the speed control light to be lighted.

If it is desirable to return to the MIN position for maintenance of "Spinning Reserve", it is only necessary to reselect MIN position by selecting that button. At that time, the base, peak or system reserve light will be extinguished and the MIN position button lighted. The control system drives 65L to the MIN load position, where it is de-energized by 37LX. The 65S synchro remains at its pre-set condition and can serve as a load limiter. If it is desired to go above it, the operator may position to base and the 65S synchro will then auto wind-out to full position.

Normal shutdown is achieved by selection of the normal shutdown button, which drives 65L to the minimum load. If the operator receives a charge from the dispatcher calling for load while programming back to MIN load, he may depress the "cancel" normal shutdown button. The control will then re-ramp 65L to its full position, or can be stopped at the discretion of the operator.

A unique feature built in to the control permits the operator by visual inspection to inhibit auto load decrease or increase from either temperature control (B, P, SR) to minimum (load control) or from MIN to base (speed control), simply by depressing the raise or lower button to stop the auto movement of the required synchro (65L load control, 65S speed control).

The auto lock circuitry then anticipating manual control will permit manual change in setpoint. Request for reautomation if in MIN is permitted by pushing for Base, Peak or System Reserve.

If while operating at load the generator breaker trips, the machine is then only sensitive to "SPEED CONTROL". At this point, the unit generator breaker will trip and the 65S synchro is returned by the auto synchronizer to the synchronous speed condition. Deactivation of the auto synchronizer will require that the operator return speed from 105% to the idle position for the next manual synchronizing.

As discussed above, there are two operator selectable automatic loading and unloading rates, normal and fast. However, when the raise/lower buttons are pushed, the fast rate is automatically selected for manual load or speed control to give fast response from the push buttons. The loading or unloading of the machine is at the operator's discretion. This ability to change at any time the loading rates (65L-1, 65L-2) is due to the tracking feature described hereinabove.

If the unit is on speed control at part load (i.e., less than 100%) under manual control, the TSLX relay will be energized to inhibit the automatic circuitry of 65S for manual over-riding. From this position the operator may return the unit to base, peak or system reserve limit by manually depressing the raise push button to cause 65S to drive to its full position. The travel of the 65S synchro can be completed in as short as (20) seconds by the operator, but the load rate limiter will schedule load to the (2) minute loading rate.

The temp locking relay will remain energized and sealed until minimum load is selected or the breaker trips.

If it is desirable to release the lock relay and permit the unit to reload automatically to base, peak or system reserve, it is only necessary to momentarily push the MIN button and then the desired loading button (B, P, SR). This action releases the TSLX lock and engages the auto circuit to drive the 65S synchro to its full position (as accomplished above on manual).

If the unit is on load control at part load under manual control, the MSLX relay will be energized to inhibit the automatic circuitry of 65L for manual over-riding.

From this part load position, the operator may raise the unit to base temperature limit manually by depressing the raise button to cause 65L to drive to its full position. If it is desired to release the lock relay and permit the unit to load automatically to base, peak, or system reserve, it is only necessary to momentarily push the desired selection button. This will cause release of the MSLX lock and engage the 65L synchro to its full position (as accomplished above on manual).

Return to MIN load automatically from any partial load can be accomplished by pushing base, peak, or system reserve momentarily, and then re-pushing MIN position to cancel the TSLX lock and re-engage the 65L synchro drive.

Figure 23B:
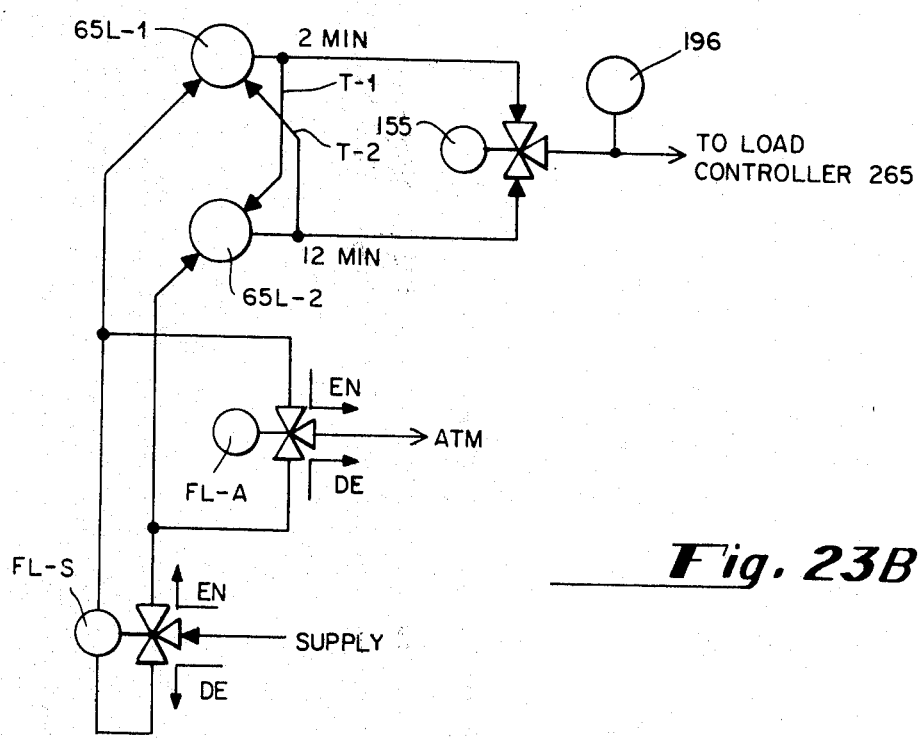
FIG. 23B shows a modification of the embodiment of FIG. 23A, adapted to be used with the speed/hold load and lock subsystem of FIGS. 22A and 22B.

As discussed hereinabove, the load control path of the control system of this invention may be either open loop or closed loop. FIG. 23A illustrates the essential components of the load and speed control paths, for the closed loop system. Pressure switches 196 and 194 limit the outputs of load synchro 65L and speed synchro 65S respectively. FIG. 23B shows a modification of the apparatus for providing the reset signal to load controller 265, where the closed loop load control is used with the speed/load hold and lock system. In this case, the load synchro 65L is replaced with two load synchros, 65L-1 and 65L-2, each adapted to track the selected one, and providing 2 minute and 12 minute ramps respectively. Air is supplied to the selected load synchro through solenoid valve FL-S, and the tracking synchro input is shunted from the air supply by valve FL-A, which vents the input of the tracking synchro to atmosphere. Thus, when 65L-1 is chosen, both FL-S and FL-A are de-energized, such that air is supplied to 65L-1 and the input to 65L-2 is vented to atmospheric pressure. When 65L-2 is chosen, both FL-S and FL-A are energized. However, the tracking inputs T-1, T-2 enable the non-selected synchro to track the chosen synchro, such that switch-over from one to the other can be effected immediately.

Operation of the closed loop load and speed control, combined with the speed/load hold and lock system described hereinabove, provides substantially infinite adjustability of load on either speed or load control. When minimum load is called for, manual control of 65L-1 in either ascending or descending direction is obtainable. Correspondingly, when base load is called for by pushing the base switch, manual control 65S is obtainable. The maximum points of 65S and 65L-1, 65L-2 are interlocked by contacts 194 and 196 respectively.

H. MONITORING SYSTEM

The turbine power plant of this invention has, as a necessary adjunct to the control system, a monitoring system which provides display, alarm and shutdown functions. Portions of such monitoring system have been described hereinbefore. In particular, with regard to the two shot feature described hereinabove, reference was made to monitoring bearing temperature and exhaust temperature. A disclosure has also been made of the means provided for displaying which control path is generating the low select signal. Table 2 below presents a partial list of alarm and shutdown functions carried out by the turbine monitoring system of this invention:

TABLE 2

| | ALARM AND SHUTDOWN FUNCTIONS | | | | | |
|---|---|---|---|---|---|---|
| NAME | LOCAL START RUN | REMOTE START RUN | 2 SHOT | 1 SHOT | | ALARM SETTING |
| BP START OT #1* | SD | SD | — | X | | |
| | | | | | X | 1300° F. |
| BP START OT #2* | SD | SD | — | X | | |
| BP RUN* | SD   SD | SD   SD | X | | | |
| | | | | | X | 1080° F. |
| BP RUN* | SD   SD | SD   SD | X | | | |
| BP DIFF | | | | | X | 100° F. |
| TURB EXH.* | SD   SD | SD   SD | X | | X | 1050° F. |
| TURB EXH.* | SD   SD | SD   SD | X | | | |
| TURB EXH. DIFF | A   A | A   A | | | | 100° F. |
| DISC CAVITY | A   A | A   A | | | X | |
| LOW LUBE | SD   SD | SD   SD | X | | X | |
| HI GAS PRESS | | Permissive | | | X | |
| LOW GAS PRESS | SD   SD | SD   SD | X | | | |
| TURB OVERSPD | SD   SD | SD   SD | X | | X | |
| 110 VDC | SD   SD | SD   SD | X | | X | |
| VB1-S VIBRATION (5M) | A | SD   — | X | | X | |
| VB1-R ABOVE 95% N (3M) | — A | — SD | X | | X | |
| VB1-O OPEN P.V. (for each monitored position) | A   A | A   A | | | X | |
| BEARING | SD   SD | SD   SD | | X | X | 200° F. |
| BEARING | SD   SD | SD   SD | | X | X | 230° F. |
| BEARING | SD   SD | SD   SD | | X | X | 230° F. |
| BEARING | SD   SD | SD   SD | | X | X | 230° F. |
| BEARING | SD   SD | SD   SD | | X | X | 170° F. |
| BEARING | SD   SD | SD   SD | | X | X | 170° F. |

TABLE 2-continued

| | ALARM AND SHUTDOWN FUNCTIONS | | | | | | |
|---|---|---|---|---|---|---|---|
| | LOCAL | | REMOTE | | 2 | 1 | |
| NAME | START | RUN | START | RUN | SHOT | SHOT | ALARM SETTING |
| LUBE LEVEL | A | A | SD | SD | X | X | — |
| BRG. OIL TEMP | A | A | SD | SD | X | X | 140° F. |
| SPD SYST FAILURE | A | A | A | A | | X | 5% Diff. |
| 7A OUTFIRE* | SD | SD | SD | SD | X | X | (option 1, 2,3 tries) |
| 8A OUTFIRE* | SD | SD | SD | SD | X | | |
| 7B OUTFIRE* | SD | SD | SD | SD | X | X | |
| 8B OUTFIRE* | SD | SD | SD | SD | X | | |

*Takes one to alarm; two to shut down.

From inspection of Table 2, it is seen that control can be maintained by the operator at either a local or remote station. Depending upon the point of control, alarm and/or shutdown functions may be scheduled differently. In addition, any given function may be subject to one-shot, two-shot, or n-shot control, where n is any number of shots that the user may want to have available. The system provides complete flexibiity in providing which functions are to be subject to 2-shot or n-shot control. Further, the alarm and shutdown functions may be made dependent upon predetermined ranges of operation. As shown in the Table, the alarm and shutdown functions may be varied depending upon whether the turbine is in the start mode of operation or run mode. This may be accomplished either by plural sensing circuits, or sensing circuits which are switchable upon passage of the turbine from one operating point to a next, such that the alarm or shutdown loop is switched from the single shot to two shot form of operation, or vice versa.

The design philosophy of the control system and the monitoring system of this invention is that of providing "load availability", i.e., to make every effort to continue supplying power. To meet this need it is imperative that turbine shutdown occur only in response to actual shutdown conditions, and be prevented unless damage is probable. It is also necessary that the control scheme alert the operator, without causing shutdown, when it is the monitoring system or control system itself which is malfunctioning, i.e. when sensor or component failures cause the alarm. In such cases, it is highly desirable to provide a maximum amount of information to the operator without interrupting load availability.

Two basic approaches to obtaining reliability in a monitoring circuit are seen in examples set forth in this disclosure. The design illustrated in the exhaust and blade path circuits, FIG. 6A, involves plural hardware paths with auctioneering selection of designated direction of failure for the final output signal. This approach is based upon the premise that, when the hardware fails, it fails in a designated direction. Specifically, the high pressure select element effectively eliminates the path containing a failure, and selects the high signal path which presumably does not contain a failure. It is understood that this approach, by its nature, is not a "fail safe" approach, since both paths may be producing erroneously low signals. In the "fail safe" type of design, the monitored condition must be properly sensed by a plurality of sensors, and if any one of the sensor paths fails, failure is indicated. Reliability of this approach can be improved by complete redundancy of each given sensor function. Thus, in the disc cavity protection circuit of this turbine control system thermocouple pairs are utilized with paralleling of the final output contacts. The parallel contact pairs are in turn connected in series so that, if any one of the thermocouple pairs fails open, shutdown is caused. However, there remains a great requirement for a compromise design between the non-fail safe drive direction arrangement which negates any possible shutdown, and the fail safe arrangement which causes shutdown, and therefore non-availability Referring now to FIG. 26A and 26B, there is illustrated a unique apparatus and method which achieves the desired compromise, and which clearly distinguishes the existence of an alarm condition from a condition of component or thermocouple failure, without causing shutdown. In the embodiment shown, there is provided an operational amplifier 404 having inputs connected to a thermocouple (designated T/C). The input to the operational amplifier is adjusted by positioning variable resistor 401, and the downdrive (thermocouple open) input is connected at terminal 403. The output of the operational amplifier is connected to a pair of comparators 409 and 410 having setpoint adjustment resistors 406 and 407 respectively connected between their inputs and ground. The output of the comparators are connected to relays 411 and 412 respectively. In addition, the output of comparator 409 is connected through normally closed contacts 411-1 to an indicator 414, and the output of comparator 410 is connected through normally closed contacts 412-1 to indicator 415. Normally open output contacts 411-2 and 412-2, operated by relays 411 and 412 respectively, provide the alarm (or shutdown) outputs.

Figure 26A:
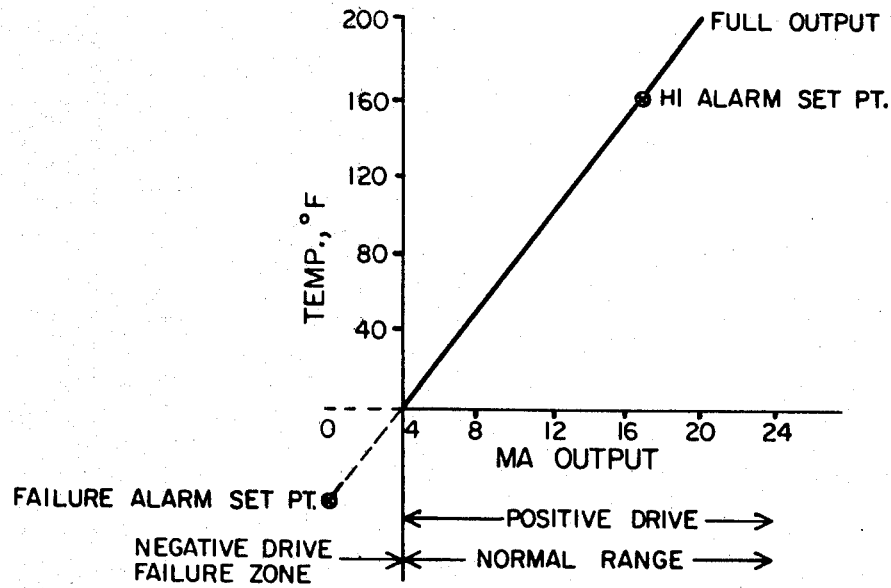
FIG. 26A shows a representation of the operating ranges of a thermocouple used in the novel protection circuit of this invention.
Figure 26B:
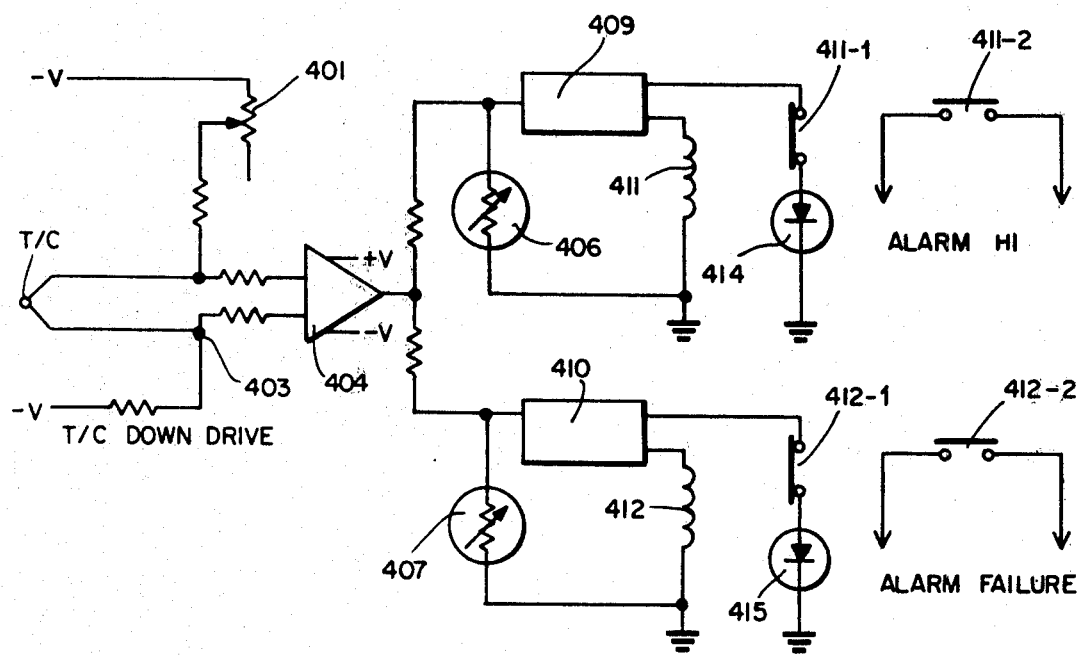
FIG. 26B shows a schematic diagram of the novel alarm/failure protection circuit of this invention.

The operation of the arrangement of 26B is understood in conjunction with FIG. 26A, showing a typical characteristic of a thermocouple. When an actual alarm condition is reached, e.g., over temperature in a bearing protection circuit, the high alarm setpoint is reached, causing an output at comparator 409. This energizes relay 411, thus opening contacts 411-1 and turning off light 414, and closing contacts 411-2 to provide the alarm signal. This alarm signal is unequivocal, and represents a high alarm condition.

In the event of thermocouple open, or failure elsewhere in the electronic circuitry, the operational amplifier is driven to negative saturation. The setpoint adjustment resistor 407 is set to a temperature equivalent of −50° F., to establish a "non-reasonable" condition that is distinct from the high setpoint alarm condition, and which would not reasonably be reached under operating conditions since −50° F. is out of the normal range of expected temperature. Consequently, utilization of this setpoint does not subject the control arrangement to nuisance alarming which would be the expected response from any typical temperature control having a setpoint in the operating range. Upon thermocouple or component failure, the output of operational amplifier 404 drops below the −50° F. setpoint, causing an output from comparator 410. This in turn energizes relay 412 and opens contacts 412-1, thus turning off the indicator light 415. In addition, contacts 412-2 are closed, providing the alarm failure. When this alarm failure occurs, the operator can see that light 414 remains on, and that consequently the high condition has not been reached but that there is thermocouple or other component failure. The circuit thus provides an unambiguous representation of the type of failure which has been sensed, and provides the desired compromise between the fail safe and non-fail safe type of monitoring arrangements.

From the above, it is seen that there is disclosed a gas turbine electric power plant having a control system which possesses a logic capability comparable to digital computer-controlled systems, but having reliability and adaptability features which are an improvement over present digital control systems. In the turbine control system of this invention, each of the separate control paths has a continuously operating and independent turbine-control system interface. The control system is structured with a modularity that permits great flexibility in design and provides for an enhanced visual output, or indication to the operator of system conditions. Thus, while the preferred embodiment of the control system as illustrated is pneumatic, the entire system, or discrete portions thereof, may be constructed in alternate forms, e.g., solid state electronic hardware. Each of the illustrated control loops, as well as the temperature reset starting control subsystem, wherein function generators are utilized, can be adapted to use solid state components, if desired. As used herein to describe portions of the control system, the term modular means that the portion as a unit (or module) can be replaced with a unit which is different structurally, but which performs the same function, and without impairment of the control system display.

It is also to be noted that many of the unique features of the control system of this invention may be incorporated in digital, or software form. Thus, the logic and scheduling steps of the illustrated bearing protective subsystem may be carried out by a programmed digital computer, with suitable conventional interface between the turbine and the subsystem. In a similar manner, the "pop and glide" sequence control and the "two shot" method of automatic restart after shutdown can be carried out with equivalent software means. The speed-load hold and lock system has likewise been described in an electronic-pneumatic form, but may be embodied in software form.

What is claimed is:

1. A gas turbine electric power plant comprising:
a. a gas turbine having a compressor, and combustion and turbine elements;
b. a fuel system for supplying fuel to said gas turbine combustion element;
c. means for operating said fuel system under control, to provide a controlled flow of fuel to said combustion element;
d. means for generating an actual ambient temperature signal, a blade plate temperature signal and a combustor shell pressure signal, a control system having a plurality of control paths each of which produces a respective control path signal, said plurality including a backup blade path temperature control independent of any surge limit control included in said control system and having means for generating a limit signal as a function of both of said temperature signal generating means and said pressure signal generating means, said control system having means for continuously selecting one of the signals produced by said control paths on a predetermined basis; and
e. means for operatively connecting said selected signal to said operating means.

2. The gas turbine electric power plant as set forth in claim 1, wherein each of said control paths is adapted to produce a pneumatic signal, and said selecting means selects the lowest of said signals.

3. The gas turbine electric power plant as set forth in claim 1, wherein each of said control paths is adapted to produce a pneumatic signal, and said selecting means selects the highest of said signals.

4. The gas turbine electric power plant as set forth in claim 2, wherein said blade path temperature control contains a pneumatic function generator, and said ambient temperature signal generating means and for being coupled to said function generator as a setpoint signal during a predetermined tubine operating period.

5. The gas turbine electric power plant as set forth in claim 1, wherein means are provided in said blade path temperature control for generating an output signal which is continuously variable throughout a predetermined range of ambient temperatures.

6. The gas turbine electric power plant as set forth in claim 5, wherein each of said plurality of control paths is continuously connected to continuously monitor a respective turbine operating condition and continuously produces a signal which is a function of such operating condition.

7. A gas turbine electric power plant comprising:
a. a gas turbine having a compressor, and combustion and turbine elements;
b. a fuel system for supplying fuel to said gas turbine combustion element;
c. means for operating said fuel system under control, to provide a controlled flow of fuel to said combustion element;
d. a control system for generating a control signal for controlling said fuel system operating means, said control system including temperature limit control means for controlling the relationship of the discharge pressure of said compressor element and the temperature of a predetermined portion of said turbine element independent of any surge limit control included in said control system, and means for varying said relationship as a function of power plant ambient temperature.

8. The gas turbine electric power plant as described in claim 7, wherein each of said control paths includes pneumatic elements to produce a pneumatic signal, and said selecting means selects the lowest of said signals.

9. The gas turbine electric power plant as described in claim 7, wherein each of said control paths includes pneumatic elements to produce a pneumatic signal, and said selecting means selects the highest of said signals.

10. The gas turbine electric power plant as described in claim 8, wherein said temperature path contains a pneumatic function generator, and means for producing a signal representative of ambient temperature and for coupling said ambient temperature signal to said function generator as a setpoint signal during a predetermined turbine operating period.

11. The gas turbine electric power plant as described in claim 7, wherein means are provided in said temperature control for generating an output signal which is continuously variable throughout a predetermined range of ambient temperatures.

12. The gas turbine electric power plant as described in claim 11, wherein each of said plurality of control paths is continuously connected to continuously monitor a respective turbine operating condition and continuously produces a signal which is a function of such operating condition.

* * * * *